United States Patent
Gagnon et al.

(10) Patent No.: US 8,073,955 B1
(45) Date of Patent: Dec. 6, 2011

(54) METHOD AND APPARATUS FOR TUNING USED IN A BROADCAST DATA SYSTEM

(75) Inventors: Gregory J. Gagnon, Torrance, CA (US); Henry A. Hughes, Jr., San Diego, CA (US); Linda Feaster, Escondido, CA (US); Brian Gunn, San Diego, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3134 days.

(21) Appl. No.: 10/119,202

(22) Filed: Apr. 9, 2002

Related U.S. Application Data

(63) Continuation-in-part of application No. 09/238,330, filed on Jan. 27, 1999, now Pat. No. 6,522,342.

(51) Int. Cl.
 G06F 15/16 (2006.01)
 G06F 3/00 (2006.01)
 H04N 7/173 (2006.01)

(52) U.S. Cl. ............ 709/227; 709/203; 725/38; 725/39; 725/86

(58) Field of Classification Search .................. 709/227, 709/203; 725/38, 39, 86
 See application file for complete search history.

(56) References Cited

U.S. PATENT DOCUMENTS

| | | | |
|---|---|---|---|
| 3,825,674 A | 7/1974 | Justice | |
| 4,598,317 A | 7/1986 | Yu | |
| 4,660,096 A | 4/1987 | Arlan et al. | |
| 5,047,867 A | 9/1991 | Strubbe et al. | |
| 5,103,313 A | 4/1992 | Chan et al. | |
| 5,161,012 A | 11/1992 | Choi | |
| 5,194,953 A | 3/1993 | Chan et al. | |
| 5,231,493 A | 7/1993 | Apitz | |
| 5,278,829 A | 1/1994 | Dunlap | |
| 5,343,250 A | 8/1994 | Iwamura | |
| 5,371,549 A | 12/1994 | Park | |
| 5,398,074 A | 3/1995 | Duffield et al. | |
| 5,422,674 A | 6/1995 | Hooper et al. | |
| 5,430,486 A | 7/1995 | Fraser et al. | |
| 5,434,624 A | 7/1995 | Ishimura | |
| 5,442,398 A | 8/1995 | Koshiro et al. | |
| 5,452,012 A | 9/1995 | Saitoh | |

(Continued)

FOREIGN PATENT DOCUMENTS

EP 0 598 576 A2 5/1994

(Continued)

OTHER PUBLICATIONS

1997 Hometime Video Publishing Inc., "Welcome to Hometime®" (undated), 1 page.

(Continued)

*Primary Examiner* — Ranodhi Serrao

(57) ABSTRACT

A method for tuning used in a broadcast data system having a receiving station with a memory, wherein the receiver station files data and real-time data is disclosed. The method includes storing the memory in a table having tuning information corresponding to a plurality of IP addresses and ports, receiving a download request based on a user input, and using the download request to identify download information including an IP address and a port. The method further includes using the identified IP address and port to open a connection to a socket, using the table to determine tuning information corresponding to the identified IP address and port, and using the tuning information to tune the receiver station to the identified IP address and port.

35 Claims, 32 Drawing Sheets

U.S. PATENT DOCUMENTS

| | | | |
|---|---|---|---|
| 5,523,796 A | 6/1996 | Marshall et al. | |
| 5,557,724 A | 9/1996 | Sampat et al. | |
| 5,596,373 A | 1/1997 | White et al. | |
| 5,603,115 A * | 2/1997 | Ku | 455/254 |
| 5,621,456 A | 4/1997 | Florin et al. | |
| 5,623,542 A | 4/1997 | Schneider et al. | |
| 5,633,683 A | 5/1997 | Rosengren et al. | |
| 5,655,214 A * | 8/1997 | Mullett | 725/78 |
| 5,666,293 A | 9/1997 | Metz et al. | |
| 5,757,370 A | 5/1998 | Amro et al. | |
| 5,812,937 A * | 9/1998 | Takahisa et al. | 455/66.1 |
| 5,815,145 A | 9/1998 | Matthews, III | |
| 5,835,156 A | 11/1998 | Blonstein et al. | |
| 5,854,901 A | 12/1998 | Cole et al. | |
| 5,886,690 A | 3/1999 | Pond et al. | |
| 5,900,868 A | 5/1999 | Duhault et al. | |
| 5,940,073 A | 8/1999 | Klosterman et al. | |
| 5,950,112 A * | 9/1999 | Hori et al. | 725/148 |
| 6,005,563 A | 12/1999 | White et al. | |
| 6,018,767 A | 1/2000 | Fijolek et al. | |
| 6,025,837 A | 2/2000 | Matthews et al. | |
| 6,028,643 A | 2/2000 | Jordan et al. | |
| 6,047,329 A | 4/2000 | Horikawa et al. | |
| 6,049,826 A | 4/2000 | Beser | |
| 6,100,936 A | 8/2000 | Jordan et al. | |
| 6,101,180 A * | 8/2000 | Donahue et al. | 370/352 |
| 6,108,706 A | 8/2000 | Birdwell et al. | |
| 6,112,085 A * | 8/2000 | Garner et al. | 455/428 |
| 6,122,514 A | 9/2000 | Spaur et al. | |
| 6,147,714 A | 11/2000 | Terasawa et al. | |
| 6,154,203 A | 11/2000 | Yuen et al. | |
| 6,172,677 B1 | 1/2001 | Stautner et al. | |
| 6,172,972 B1 | 1/2001 | Birdwell et al. | |
| 6,177,931 B1 | 1/2001 | Alexander et al. | |
| 6,181,333 B1 | 1/2001 | Chaney et al. | |
| 6,184,803 B1 | 2/2001 | Burrell, IV | |
| 6,191,781 B1 | 2/2001 | Chaney et al. | |
| 6,208,335 B1 | 3/2001 | Gordon et al. | |
| 6,223,222 B1 | 4/2001 | Fijolek et al. | |
| 6,243,142 B1 | 6/2001 | Mugura et al. | |
| 6,263,501 B1 | 7/2001 | Schein et al. | |
| 6,266,814 B1 | 7/2001 | Lemmons et al. | |
| 6,295,284 B1 | 9/2001 | Maggenti | |
| 6,295,646 B1 | 9/2001 | Goldschmidt Iki et al. | |
| 6,351,773 B1 | 2/2002 | Fijolek et al. | |
| 6,442,755 B1 | 8/2002 | Lemmons et al. | |
| 6,505,255 B1 | 1/2003 | Akatsu et al. | |
| 6,522,342 B1 | 2/2003 | Gagnon et al. | |
| 6,526,577 B1 | 2/2003 | Knudson et al. | |
| 6,654,367 B1 * | 11/2003 | Kaufman | 370/356 |
| 6,742,042 B1 | 5/2004 | Holden et al. | |
| 6,857,128 B1 | 2/2005 | Borden, IV et al. | |
| 7,412,715 B2 | 8/2008 | Kim et al. | |
| 7,496,946 B1 | 2/2009 | Wehmeyer et al. | |
| 2002/0087981 A1 | 7/2002 | Daniels | |

FOREIGN PATENT DOCUMENTS

| | | |
|---|---|---|
| EP | 0905984 A2 | 3/1999 |
| EP | 0933940 A1 | 8/1999 |
| JP | 05-049016 | 2/1993 |
| JP | 06-006773 | 1/1994 |
| WO | WO 94/14282 | 6/1994 |
| WO | WO 98/00975 | 1/1998 |
| WO | WO 98/26584 | 6/1998 |
| WO | WO 98/38831 | 9/1998 |
| WO | WO 98/56172 | 12/1998 |
| WO | WO 01/35660 A1 | 5/2001 |

OTHER PUBLICATIONS

1997 Hometime Video Publishing Inc., "Hometime's Past Shows" (undated), 1 page.

IETF RFC 2327 entitled "SDP: Session Description Protocol", Apr. 1998, pp. 1-37.

Society of Cable Telecommunications Engineers, Inc., "IP Multicast for Digital MPEG Networks", Oct. 16, 2000, pp. 1-17.

Plummer, David C., "An Ethernet Address Resolution Protocol", Nov. 1982, pp. 1-9.

G. Eitz, "Zukunftige Informations-und Datenangebote beim digitalen Fernsehen", Rundfunktechnische Mitteilungen, Jahrg. 41 (1997) H.2.

Non-final Office Action dated Dec. 23, 2008 in U.S. Appl. No. 10/215,234, filed Aug. 8, 2002 by Gregory J. Gagnon et al.

Notice of Allowance dated Mar. 16, 2010 in U.S. Appl. No. 10/215,234, filed Aug. 8, 2002 by Gregory J. Gagnon et al.

Non-final Office Action dated Apr. 1, 2009 in U.S. Appl. No. 10/137,249, filed Apr. 30, 2002 by Michael A. Dolan et al.

Final Rejection dated Jun. 19, 2009 in U.S. Appl. No. 10/215,234, filed Aug. 8, 2002 by Gregory J. Gagnon et al.

Non-final Office Action dated Aug. 24, 2009 in U.S. Appl. No. 10/215,234, filed Aug. 8, 2002 by Gregory J. Gagnon et al.

* cited by examiner

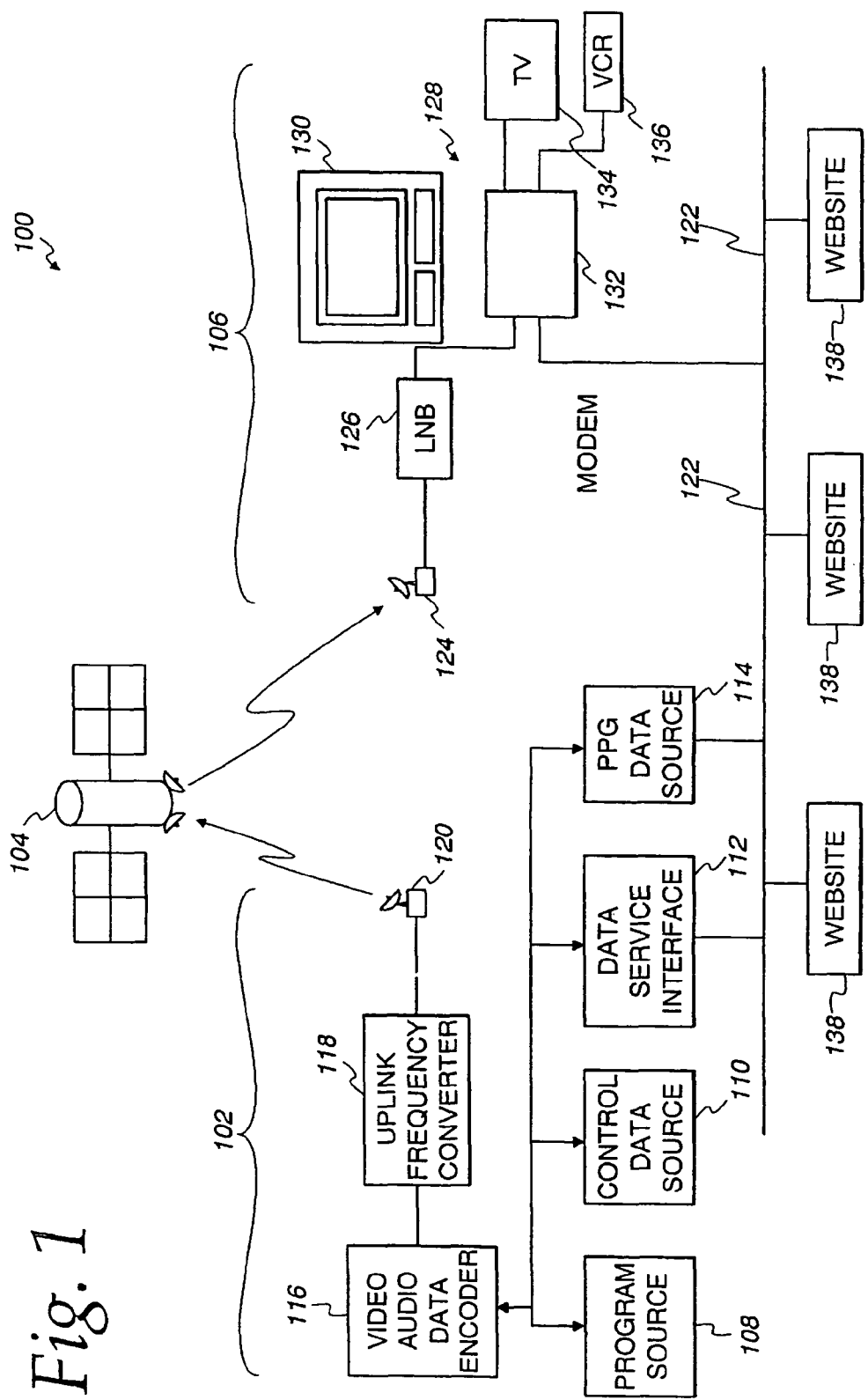

Fig. 27

BFDP HEADER 626

| SYNC. | ID | VERSION | FILENAME | MODIFIED | COUNT | NUMBER | SIZE |
|---|---|---|---|---|---|---|---|
| 4 BYTES | 4 BYTES | 4 BYTES | 64 BYTES | 4 BYTES | 4 BYTES | 4 BYTES | 4 BYTES |

Fig. 28

UDP HEADER 628

| SOURCE PORT | DEST. PORT | UDP LENGTH | UDP CHECKSUM |
|---|---|---|---|
| 2 BYTES | 2 BYTES | 2 BYTES | 2 BYTES |

Fig. 29

IP PACKET HEADER (VERSION 4) 632

| VERSION | HEADER LENGTH | TYPE OF SERVICE | TOTAL LENGTH | IDENTIFICATION | FLAGS |
|---|---|---|---|---|---|
| 4 BITS | 4 BITS | 1 BYTE | 2 BYTES | 2 BYTES | 3 BITS |

| FRAGMENT OFFSET | TIME TO LIVE | PROTOCOL | HEADER CHECKSUM | SOURCE IP ADDRESS |
|---|---|---|---|---|
| 13 BITS | 1 BYTE | 1 BYTE | 2 BYTES | 4 BYTES |

| DESTINATION IP ADDRESS | OPTIONS |
|---|---|
| 4 BYTES | |

Fig. 30A

MPT START PACKET 730

| FLAGS | SOF | EOF | SUB-SCID ADDRESS | FRAME TYPE | DATA |
|---|---|---|---|---|---|
| 6 BITS | 1 BIT | 1 BIT | 6 BYTES | 2 BYTES | 118 BYTES |

Fig. 30B
MPT MIDDLE PACKET(S) 740

| FLAGS | SOF | EOF | DATA |
|---|---|---|---|
| 6 BITS | 1 BIT | 1 BIT | 126 BYTES |

Fig. 30C
MPT END PACKET 750

| FLAGS | SOF | EOF | DATA | CRC |
|---|---|---|---|---|
| 6 BITS | 1 BIT | 1 BIT | 122 BYTES | 4 BYTES |

Fig. 30D
MPT ONLY PACKET 760

| FLAGS | SOF | EOF | SUB-SCID ADDRESS | FRAME TYPE | DATA | CRC |
|---|---|---|---|---|---|---|
| 6 BITS | 1 BIT | 1 BIT | 6 BYTES | 2 BYTES | 114 BYTES | 4 BYTES |

Fig. 31A

BARP HEADER

| VERSION | CHANGE NUMBER | RECORD COUNT | RESERVED |
|---------|---------------|--------------|----------|
| 1 BYTE  | 1 BYTE        | 2 BYTES      | 4 BYTES  |

Fig. 31B

BARP ADDRESS RECORD

| IP ADDRESS | TRANSPONDERS | SCID    | CHANNEL | SERVICE TYPE | RESERVED |
|------------|--------------|---------|---------|--------------|----------|
| 4 BYTES    | 4 BYTES      | 2 BYTES | 2 BYTES | 1 BYTE       | 3 BYTES  |

Fig. 32A

Example Ticker SDP+ Record
v=0
o=DTV 0001 17 DSS IP4
s=Announcement Dump
c=DSS IP4 233.17.43.6/1
t=0 0
m=data 3287 UDP STREAM
a=key:1
a=run:consoleticker
a=keywds:tsetup

Fig. 32B

Example in File Download SDP+ Record
v=0
o=DTV 0008 17 DSS IP4
s=Data Catalog
c=DSS IP4 233.17.43.3/1
t=3079382400 3155745600
r=10m 10m 0
m=data 3335 UDP BFDP
a=key:8
a=fsz:980000
a=mandatory
a=run:cataloginstall.exe

Fig. 32C

Example Webcast SDP+ Record
v=0
o=DTV 900 17 DSS IP4
s=CNN
i=Research financial markets worldwide, get stack quotes, and calculate your mortgage payments - all on-line. Read the "hot stories" of the week in the financial world. Complete listing of CNN's Financial Network television broadcasts.
u=http:/www/cnn/com/index.htm
c=DSS IP4 233.17.43.7/1
t=0 0
m=data 3334 UDP WEBCAST
a=cat:News
a=key:900
a=fsz:16000000
a=display:type=1, priority=8
a=img:cnn.gif

Fig. 32D

Example data enriched video SDP+ record
v=0
o=DTV0201 17 DSS IP4
s=CNBC
c=DSS IP4 233.26.24.24/1
t=0 0
m=data 6500 UDP INTERCAST
a=key:201
a=channel:775

METHOD AND APPARATUS FOR TUNING USED IN A BROADCAST DATA SYSTEM

I. CROSS-REFERENCE TO RELATED APPLICATION

This application is a continuation-in-part of U.S. patent application Ser. No. 09/238,330, entitled "Graphical Tuning Bar for a Multi-Program Data Stream," filed on Jan. 27, 1999 now U.S. Pat. No. 6,522,342.

II. BACKGROUND OF THE INVENTION

A. Field of the Invention

The present invention relates in general to entertainment broadcast systems that transmit and receive a wide variety of video, audio, software and other types of data. More particularly, it relates to a multi-channel broadcast system that transmits a video/text/graphic-based program guide data stream that is used at viewer stations to generate a user interface that facilitates a user's selection of various programs and services.

B. Description of Related Art

The use of electronic communications media to provide access to large amounts of video, audio, textual and data information is becoming more frequent. For example, the public switched telephone network (PSTN) is routinely used to transmit low speed digital data to and from personal computers. Cable television infrastructure is used to carry, via coaxial cable, analog or digital cable television signals, and may also be used to provide high speed Internet connections. In general, cable television infrastructures include many head end or transmission stations that receive programming from a variety of sources, then distribute the programming to local subscribers via a coaxial cable network. Large Direct-to-Home (DTH) satellite communications systems transmit directly to viewers over one hundred fifty audio and video channels, along with very high speed data. DTH systems typically include a transmission station that transmits audio, video and data to subscriber stations, via satellite.

One particularly advantageous DTH satellite system is the digital satellite television distribution system utilized by the DIRECTV® broadcast service. This system transports digital data, digital video and digital audio to a viewer's home via high-powered Ku-band satellites. The various program providers send programming material to transmission stations. If the programming is received in analog form, it is converted to digital. The transmission stations compress the digital video/audio programming (if needed), encrypt the video and/or audio, and format the information into data "packets" that are multiplexed with other data (e.g., electronic program guide data) into a plurality of bitstreams, which include identifying headers. Each packetized bitstream is modulated on a carrier and transmitted to a satellite, where it is relayed back to earth and received and decoded by the viewer's receiver station. The receiver station includes a satellite antenna and an integrated receiver/decoder (IRD). The IRD may be connected to appropriate output devices, typically including a video display.

In general, DTH satellite(s) broadcast on several frequencies from multiple transponders at differing polarizations (e.g., left and right hand circular polarization), and each transponder bitstream includes the video and audio data packets (in a compressed format) for several different programs (or "viewer channels"). For example, transponder ONE may broadcast the digital video and audio data packets for ESPN, TNT, AMC, A&E, E!, STARZ and USA, in a statistically multiplexed fashion. Satellites or other distribution systems which require separate input processing (e.g., satellites at two separated locations requiring different antennas) may also be used. Accordingly, in order to receive a desired viewer channel, the receiver station must know the transponder frequency and the polarization at which the desired signal information is being broadcast by the satellite, along with the identifying header information for those data packets on that transponder that relate to the desired program to permit its isolation from the multiplexed bitstream.

Each satellite transponder broadcasts a program guide data stream, which typically includes not only broadcast schedule data, but also the aforementioned information that the receiver station needs in order to tune to a particular channel. The program guide data stream is broadcast on all satellite transponders so that channel selection information is always available to the IRD regardless of the channel to which the IRD is tuned.

The data packets are distinguished from one another by their header information, which is referred to as the packet's "service channel ID" (SCID). For example, if a viewer instructs the IRD to display ESPN, the IRD, via the tuning information in the program guide data stream, determines the transponder frequency and polarization at which the ESPN programming is broadcast, along with the SCIDs of the data packets that are needed to generate and display the video, audio, and data content of the ESPN program.

The scheduling data in the program guide data packets also provide channel and program-attribute information that is used by the IRD to construct and output as a viewable display (which may be a full or a partial screen) a text-based listing of programming channels, times, titles, descriptions, ratings, etc. In operation, a program guide display is typically presented as a grid having channels listed along the left, times across the top, and program titles shown within the grid squares. Users can scroll through the grid, either up and down (by channel) or to the left and right (by time). Channels can be selected by inputting the channel number directly using the number keys on a user's remote control, or channels may be selected from the program guide display by highlighting and selecting a currently broadcast program that is listed in the grid. In either case, the IRD tunes to the chosen channel by accessing the channel's transponder (frequency), polarization, and SCID information denoted by the program guide data stream.

An extension of known IRD equipment is a PC-based system that allows users to receive, directly into their PC's, the same digital video, audio, and related information signals received in conventional DTH systems. The receiver station in this PC-based system includes a local satellite receiver dish similar to that of a conventional IRD system, but the IRD functions are implemented within the PC architecture through the use of one or more circuit boards that are inserted into the PC. The decoded outputs from these boards are displayed on the PC's monitor, or may be output to a conventional video display (e.g., a television set) and/or other mass storage medium such as magnetic tape, digital video disk (DVD), optical or magnetic disk, video recorder (VCR), etc. Because the receiver station includes a personal computer, a large number of additional data and software-related services can also be downloaded directly to the PC, thereby offering a variety of services, including broadcast programming, pay-per-view events, audio programming, data services, webcasting, software downloads and other data or software-related services.

While known program guides have advantages, there is still room for improvement, particularly when considering the large number of data, software, video, audio, pay-perview and other programming services available through present and future DTH satellite broadcast services. For example, the viewable display generated from electronic program guide data tends to be presented primarily as text laid out in a grid. The processing power of currently available IRD's, while appropriate for current DTH programming services, inherently limits how the program guide can be displayed, how much information can be incorporated into the guide, and how quickly and efficiently a user can move through the guide. These program guides are therefore essentially limited to conveying program availability and tuning information, and do not have the organization and flexibility to effectively support other services such as software downloads, webpage links and downloads, data services, and other functions.

Accordingly, for broadcast systems having a large number of services that deliver a large amount of data to relatively sophisticated receiver stations (e.g., a PC), there is a need for a broadcast electronic program guide and an associated viewable display format and content that significantly enhances how the program guide can be displayed, how much information can be incorporated into the guide, and how quickly and efficiently the user can move through the guide.

III. SUMMARY OF THE INVENTION

The present invention provides a method and apparatus for efficiently and effectively transmitting, receiving, organizing and selecting transmitted data. The method and apparatus of the present invention is preferably embodied in a user interface and related data protocols and procedures. The user interface may be implemented in the context of a wireless distribution system for securely, reliably and inexpensively distributing video, audio, data service, software and other services to geographically remote receiver stations. The wireless distribution system is preferably a DTH digital satellite television distribution system, though other systems (e.g., terrestrial wire, cable, or wireless broadcast) may also be used in other embodiments. A typical DTH digital broadcast system includes a transmission station, a satellite relay, and a receiver station. At the transmission station, video and audio programming signals are digitized in known manners, multiplexed with other data signals (such as the data needed to construct a program guide display according to the present invention), compressed (if required), encoded, mated with error correction codes, modulated on carriers, and uplinked to a geosynchronous satellite. The satellite receives the uplinked signals and rebroadcasts them over a footprint that preferably covers a predetermined geographical area, for example, the continental United States. Receiver stations, which are typically located at the user's home or business, receive the satellite signals. The receiver stations each include an antenna, which preferably is in the form of a satellite dish, along with an integrated receiver/decoder (IRD). The antenna feeds the received satellite signal to the IRD unit which recovers the originally transmitted digital video, audio, and data. Other receiver station equipment (e.g., cable decoder units) may be used with other distribution systems in other embodiments, as is well known in the art.

The present invention is particularly applicable to a receiver station having sufficient processing power to process and generate a program guide display and associated features that goes beyond conventional video/text/grid program guides. The processing power may be incorporated directly into the IRD, for example, by adding a more powerful microprocessor, more memory, and associated software to the conventional IRD circuitry. Alternatively, the receiver station IRD may be replaced with a PC having circuit cards that perform the (RD functions. A PC-based system significantly increases the receiver station's processing power, along with the number of services (e.g., data services and software) the receiver station can receive and use. Accordingly, the features of the present invention are most advantageously utilized by a PC-based (or comparable) receiver station.

A PC-based receiver station suitable for use with the present invention includes an antenna, which preferably is in the form of a satellite dish, along with a PC which, like the above-described IRD, recovers the originally transmitted digital video, audio, and data. The digital broadcast data received from the satellite dish is coupled directly into a transport circuit board within the PC. The PC's transport circuit board also performs initial circuit functions on the signal coupled in from the antenna, including tuning, demodulation, and forward error correction (FEC). The transport circuit board within the PC also performs similar functions to that of the IRD's transport circuit, including channel de-multiplexing, decryption and access determination. The received digital broadcast data is sent from the transport circuit to video/audio decoder circuits, which may be on the same or separate circuit board. The video/audio decoder circuit board decompresses and/or decodes the received compressed broadcast signal.

In one embodiment of the present invention, the transmission station transmits to the receiver stations program selection data/information that is used at each receiver station to construct an electronic program guide and associated display format and content (i.e., a user interface) that, in contrast to known video-based and/or text/video/icon-based electronic program guides, significantly enhances how the program guide can be displayed, how much information can be incorporated into the guide, and how quickly and efficiently the user can move through the guide. The viewable display format, according to the present invention, incorporates moving picture video, still pictures, text, links to external data sources, graphics and other features that facilitate the selection of various programs and services.

The electronic program guide features of the present invention further provide a novel channel-selection process in the form of a graphical representation of a "tuning bar." The tuning bar includes a movable slider that shows current tuning information (channel number and call sign) for the programming or service that is being shown in a main viewing area of the display. Moving the slider (typically using a mouse-controlled click and drag operation) changes the tuning which changes what is displayed in the main viewing area. Moving a cursor over any portion of the bar "pops up" the channel/call-sign associated with that portion of the bar. The received data that provides tuning information to the tuning bar is automatically scaled to accommodate the number of channels that are available at that station, so that the channels are evenly spread out along the bar (without gaps) regardless of the number of channels to which the user subscribes. Also, incremental "up" one channel and "down" one channel buttons are preferably provided.

The electronic program guide features of the present invention incorporate still another novel channel-selection procedure wherein a replica of a conventional remote control unit is provided as part of the display. The remote control display has graphical push-buttons that correspond to those found on actual remote controls used for conventional stereos, video recorders, televisions, DTH, or cable television systems. In embodiments wherein the receiver station includes a personal computer (PC), this feature gives the user the option of a "simulated remote control" interaction that the user may find more comfortable than using a mouse or keyboard alone. In an important embodiment, the button selections that make up the remote control display graphic change to fit the options available in the current screen, providing a context sensitive operation. Also, the receiver station may provide a remote control display having a shape and button layout that corresponds to a particular manufacturer's physical remote control. If, for example, the user's television and other peripherals are from RCA®, the system may display a remote control graphic having a shape and button layout that corresponds to the actual remote control for the user's RCA® TV, VCR and/or IRD.

The electronic program guide features of the present invention incorporate still another novel display presentation in connection with web-related services such as a "Best-of-Web" broadcast service, wherein website data is cached at the receiver station for convenient future access and/or links are provided for a real-time connection. When the user attempts to access this service, a list is generated and displayed showing the different websites and webpages that are available. In addition to the displayed list, the system maintains and stores a status list (or hash table) that may include an indication of the medium through which the page/site is available and, in the case of data subject to being cached, the status of the cache (i.e., whether or not the data is cached at the receiver station's memory). Moving the cursor over one of the entries of the displayed table/list, prompts the system to automatically search the information in the status list and determine whether or not the page is available locally. For example, some webpages on the displayed list are cached in the receiver station's memory, some are available through a future broadcast, while others can only be retrieved via direct access to the Internet. For data that is to be cached, the user interface/display, via supporting software, immediately checks the status list and determines whether that webpage is presently cached, and generates a pop up graphic (e.g., the universal "no" symbol) that communicates to the user immediately whether or not that webpage is presently cached. This can be done in essentially real time because the receiver station maintains the status list of the cached webpages and searches that status list when the user moves the cursor over a webpage selection, without need to determine whether the actual webpage exists on the system or the main system memory.

In accordance with another aspect of the present invention, broadcast (or "webcast") webpages may be archived on a user's PC for later viewing. A webcast is a constant and repeating download of specially selected web content. The content is usually grouped by domain. Minimal scheduling is required for downloading webcast information. Multiple groups of content may be identified by the same identifier, thereby creating a one-to-many relationship among the items of interest.

As webpage information is received by the subscriber unit it is stored for later use. Preferably, the broadcast system uses an archiving scheme based on the ZIP format to group domain information. However, other alternative archiving formats may be used so long as both the sender and the receiver have a common set. If the archived files are compressed, the files are preferably extracted or decompressed using so-called "extractor" software, an example of which is sold under the tradename PKWare™, which is a data compression library (DCL) compatible extractor. If, however, the files are not compressed, any ZIP extractor may be used to extract and view the files. Preferably, the filenames of the compressed files used in the webcast archive are the uniform resource identifier (URI).

Webcast archive files may have a dedicated filename extension convention. On any given data carousel, the contents of which are repeatedly broadcast, there must be exactly one main file for each webcast. This file contains a snapshot of the entire website. According to the present invention, update archive files are used to replace portions of the main file on the carousel. The subscriber unit stores all archive files in a subdirectory corresponding to the session ID of the webcast. When a main file is received that is newer than the current main file in that directory, all other files in that directory will be removed and any links in the proxy server's cache map file for this webcast will be replaced with the URIs in the new main file.

The invention itself, together with further objects and attendant advantages, will best be understood by reference to the following detailed description, taken in conjunction with the accompanying drawings.

IV. BRIEF DESCRIPTION OF THE DRAWINGS

FIG. 1 is a diagram of a direct-to-home (DTH) transmission and reception system capable of broadcasting and utilizing data streams embodying the present invention;

FIG. 27 is a representation of a BFDP header;

FIG. 28 is a representation of a UDP header;

FIG. 29 is a diagram of a version 4 IP packet header;

FIGS. 30A-30D are block diagrams representing MPT packets;

FIGS. 31A and 31B are diagrams representing a BARP header and a BARP address record, respectively; and FIGS. 32A-32D are sample SDP+ records for various information services that may be used with the present invention.

V. DESCRIPTION OF THE PREFERRED EMBODIMENT

Figure 2A:
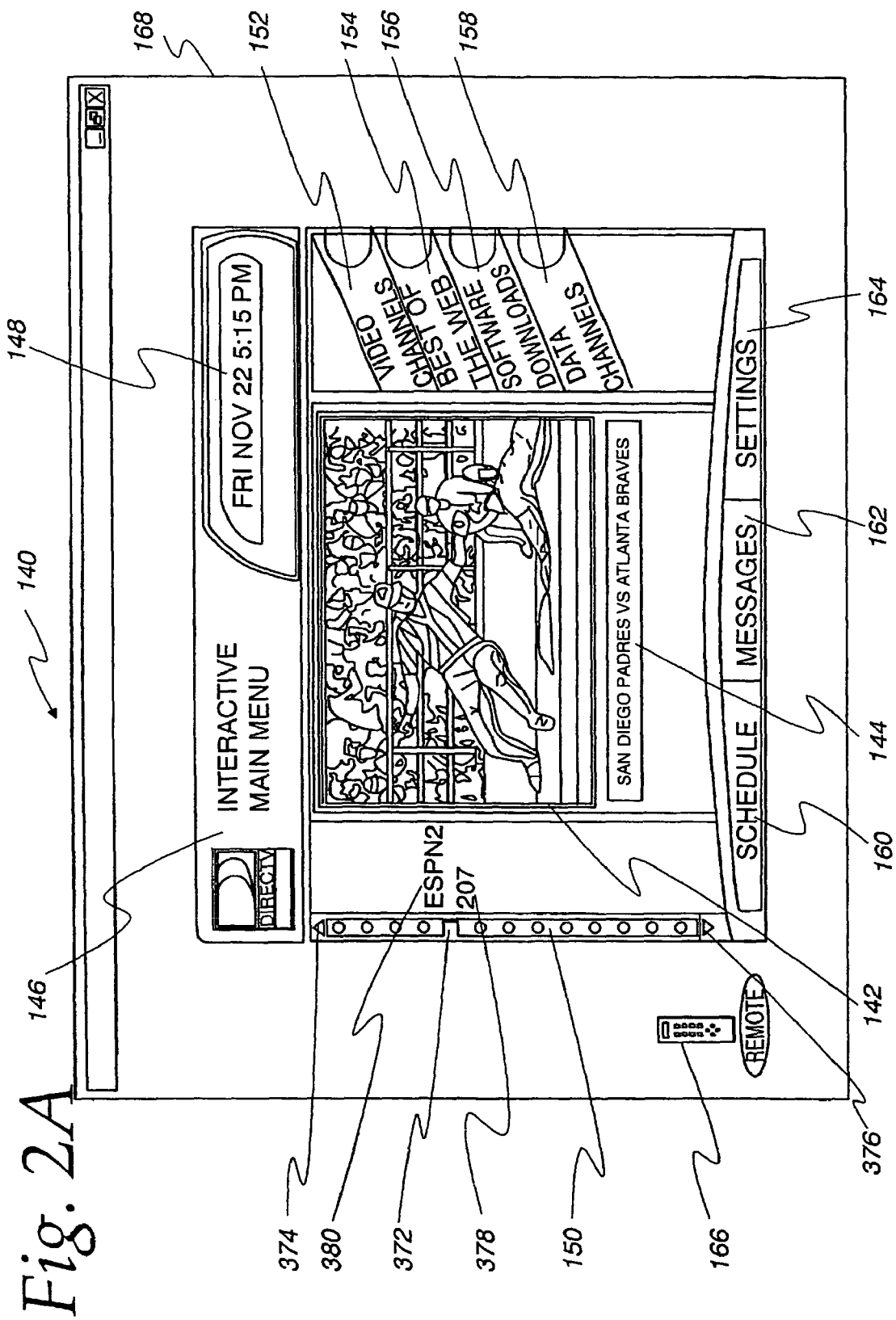
FIG. 2A illustrates a representative main menu page of a graphical user interface embodying aspects of the present invention.

To facilitate review and understanding of the invention and the preferred embodiments, the present disclosure has been organized in accordance with the headings and sub-headings shown below.

A. System Overview
B. Graphical User Interface (GUI)
  1. Description of the Main Menu
  2. Description of the Page Template for Pages Underlying the Main Menu
  3. Description of Pages and Links Underlying the Main Menu
    a. Best of the Web
    b. Software Downloads
    c. Data Channels
    d. Video Channels
    e. Function Pages
  4. Tuning Interface
    a. Tuning Bar
    b. Pop-Up Remote Control
C. Receiver Station Generally
D. Receiver Station Architecture
E. Data Packet
F. Audio/Video Processing
G. Data Processing
  1. Protocol Stack/Broadcast File Download Protocol (BFDP)
  2. Broadcast Address Resolution Protocol (BARP)
H. SDP+ Records
I. Webcast
J. Conclusion
A. System Overview By the way of example only, the method and apparatus of the present invention is disclosed in connection with a system that broadcasts, via satellite, video programming, data services and multimedia data (e.g., webpages). It should be understood, however, that any system requiring intuitive interactive program and/or service selection may alternatively employ the techniques shown herein. Such systems might include other broadcast communications techniques not traditionally associated with video programming or the Internet. For example, paging or cellular systems delivering news or other information could benefit from certain aspects of the method and apparatus of the present invention.

Generally, however, the techniques of the present invention are best used by broadcast video and data systems having a large number of available programs, data and services, thereby benefiting from the simplification of programming organization and selection provided by the present invention. A preferred broadcasting system is the satellite-based system utilized by the DIRECTV® broadcast service. Such embodiments of the present invention employ a satellite receiving antenna to acquire real-time video broadcasts and periodic data broadcasts used to construct a program guide display. It should be understood, however, that many other delivery systems are readily applicable to alternate embodiments of the present invention. Such systems include wired or cable distribution systems, UHF/VHF radio frequency systems or other terrestrial broadcast systems (e.g., MMDS, LMDS, etc.), and fiber optic networks.

FIG. 1 illustrates a typical Direct-to-Home (DTH) PC-based satellite communication system 100 capable of utilizing the present invention. The system 100 includes a transmission station 102, a satellite/relay 104, and a plurality of receiver stations, one of which is shown at reference numeral 106. Wireless communications are provided between the transmission station 102, the satellite/relay 104, and the receiver station 106. The transmission station 102 includes programming sources 108, a control data source 110, a data service source 112, one or more program guide data sources 114, a video/audio/data encoding system 116, an uplink frequency converter 118, and an uplink antenna 120. The data service source 112 receives data service information and webpages made up of text files, graphics, audio, video, software, etc. from a network 122 (e.g., the Internet, a LAN or a WAN). The satellite/relay 104 is preferably at least one geo-synchronous or geo-stationary satellite. The receiver station 106 shown in FIG. 1 includes a reception antenna 124 connected to a low-noise-block (LNB) 126, and an integrated receiver/decoder (IRD) embodied in a personal computer (PC) 128 having a monitor 130 and a computing unit 132. Other devices, such as another video display device (e.g., television) 134 and a video recorder 136 (e.g. VHS, DVHS, DVD, etc.), may also be supported, if desired.

In operation, the programming sources 108 receive video and audio programming from a number of sources, including satellites, terrestrial fiber optics, cable, or tape. The received programming signals, along with data signals from the control data source 110, the data service source 112, and the program guide data sources 114, are sent to the video/audio/data encoding system 116 where they are digitally encoded into information data streams that are multiplexed into a packetized data stream or bitstream using a number of conventional algorithms. Each data packet within the packetized data stream includes a header that identifies the contents of the data packet and a service channel identifier (SCID) that identifies the data packet. In a conventional manner, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104. The satellite/relay 104 receives the modulated, encoded bitstream and re-broadcasts it downward toward an area on earth that includes the receiver station 106. The reception antenna 124 of the receiver station 106 receives the signal, which is typically shifted from, for example, the Ku-band signal down to, for example, an L-band signal by the LNB 126. The LNB output is then provided to the PC 128, the television 134 and/or the video recorder 136. As noted above, the PC 128 includes conventional IRD functions (provided, for example, by plug-in circuit cards (boards). Thus, when the user commands the PC 128 to tune to a particular program, the PC 128 associates the user's program selection with a transponder and SCID number and tunes the IRD to receive data packets from the appropriate transponder and to select data packets having the appropriate SCID number from the multi-program data stream.

Although not necessary for proper operation of the disclosed system, the receiver station 106 may optionally incorporate a connection (e.g., Ethernet circuit or modem) to the network 122 for transmitting requests and other data back to the transmission station 102 or other location (or a device managing the transmission station 102 and overall flow of data in the system 100) and for communicating with network devices 138 (e.g., websites) that may be on the network 122.

In general, the software executed by the PC 128 includes many conventional PC operations used to generate a graphical user interface (GUI) having a mouse-controlled cursor or the like, windows, dialogue boxes, buttons, pull-down menus, and other such features that facilitate user selection of various options. The GUI of the present invention is assembled using two basic types of external data: (1) real-time broadcast data (e.g. streaming data), and (2) file data (i.e., data that is periodically downloaded and stored). Real-time data includes conventional program guide data (e.g., program attribute data, tuning data, etc.), ticker data (e.g., stocks, sports scores, etc.), some SDP+ records, and announcements (e.g., updates to the webcast data catalog, etc.). File data includes information that is updated periodically such as still pictures, moving video clips, webpages, data catalog (webcast schedule), links to other internal or external sources of information, and various discrete software downloads. The GUI of the present invention organizes and simplifies the presentation of real-time broadcast data and file data by providing, inter alia, a plurality of pages, wherein each page has a display with several distinct segments. For example, a given page type may simultaneously provide still pictures, moving videos, text, graphics, audio, and data within separate segments.

The GUI of the present invention requires the presence of appropriate data at the receiver station 106. One method of generating appropriate data and reliably transferring it to the receiver station 106 using a hardware configuration as shown in FIG. 1, is disclosed in detail below in section G (Data Processing) of this disclosure. Generally, the method set forth in section G includes a data transfer technique, referred to herein as broadcast file download protocol (BFDP), that operates in a one-way broadcast communication link. BFDP breaks large data files for transmission into numerous small data packets, which are labeled in a sequential manner at the transmission station 102 and broadcast to the receiver station 106. BFDP facilitates the assembly of the labeled data packets back into the large data file and enables identification of missing or corrupt data packets at the receiver station 106. Any missing or corrupt data packets at the receiver station 106 can be obtained and inserted into their correct locations in the large data file during subsequent transmissions of the large data file. Thus, if during the transmission of a large data file a number of its data packets are missing or corrupt, only the missing or corrupt data packets need be reacquired during a subsequent re-broadcast of the large data file, and not the entire large data file.

A method for resolving an Internet protocol (IP) address into a physical address is also described in section G of this disclosure. This method is referred to herein as a broadcast address resolution protocol (BARP). BARP is necessary because all file data (for example a large file transferred using BFDP, as discussed above) transferred to the receiver station 106 are identified by IP addresses and, as previously noted, the receiver station 106 requires a transponder and SCID to tune to receive the broadcast file data. Accordingly, BARP allows the receiver station 106 to rapidly resolve an IP address for a desired program or service into a transponder and SCID.

Figure 3:
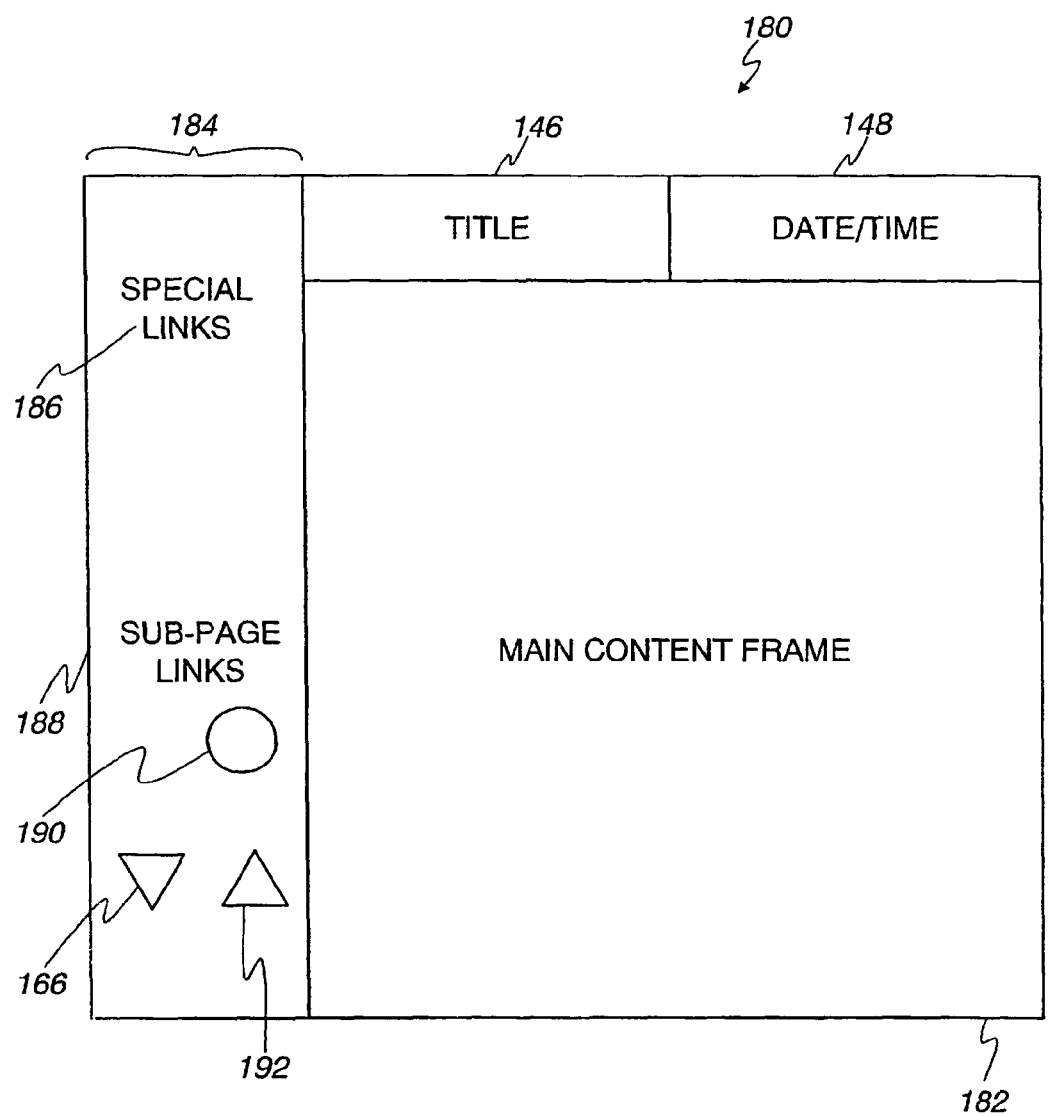
FIG. 3 illustrates an exemplary page template used to generate pages underlying the main menu, in accordance with the present invention.

To inform the user of when and on what IP address the large file mentioned above will be broadcast, session description protocol plus (SDP+) records are periodically broadcast by the transmission station 102. SDP+ records are processed by the receiver station 106 to produce a schedule of all data service information that will be broadcast by the transmission station 102. Additionally, the SDP+ records are used by the PC 128 to build GUI pages using selected information resident within the PC system (e.g., a basic page template 180 as shown in FIG. 3) and selected dynamic data that is received from the satellite or an Internet connection. When the user launches the interface into another state or page, the GUI builds the destination page as instructed by the SDP+ records and displays it on the user's PC system monitor 130. More details about the SDP+ records are provided in Section I of this disclosure in connection with the descriptions of FIGS. 32A-32D.

B. Graphical User Interface (GUI)

1. The Main Menu

Now turning to FIG. 2A, an example of a main menu page 140 for a preferred embodiment of the GUI of the present invention is illustrated. The main menu page 140 includes a central video window 142, a video title 144, a page title 146, a date/time display 148, a video channel tuning bar 150, a Video Channels service link 152, a Best-of-Web (BOW) data service link 154, a Software Downloads service link 156, a Data Channels service link 158, a schedule function link 160, a messages function link 162, a settings function link 164, and a pop-up remote control link 166. In the embodiment shown these are all implemented with a standard PC system Windows' application window 168, as shown.

The main menu page 140 provides graphical "buttons" that may be selected to launch, or provide links to, four services. The Video Channels service link 152 launches the GUI into a video and text-based electronic program guide. The Best-of-Web data service link 154 launches the GUI into a service for pre-selecting, previewing, and viewing various Internet websites that may be broadcast to the receiver station 106 via the satellite/relay 104. The Software Downloads service link 156 launches the GUI into a service for selecting and scheduling software for downloading to the user's PC 128 of the receiver station 106. The Data Channels service link 158 launches the GUI into a service for selecting and scheduling various types of streaming data for downloading to the PC 128 of the receiver station 106.

The main menu page 140 also provides graphical "buttons" that may be selected to launch, or provide links to, three "functions": (1) the schedule function link 160, (2) the messages function link 162 and (3) the settings function link 164. All functions are represented by graphical buttons that, when selected by the user, launch the GUI into the schedule, messages, and settings functions, respectively. The schedule function provides a graphical multi-row scrolling grid-based guide that shows video/audio programming that is scheduled for viewing and software files that re schedule for downloading. The massages function provides textual promotional and status information related to the video, BOW, Data Channels, and Software Downloads services. For example, a message may be provided to the user that a requested software download was successfully completed, or that a new software title will be available at a particular time. The settings function allows the user to program or configure the various operational modes of the receiver station 106 with respect to the video, BOW, Data Channels, and Software Downloads services. The layout and content for each type of function page display of the present GUI depends on what service has been selected on the function page. Thus, the function pages of the present GUI change with the current service page context. For example, the layout and content of a settings function page changes as the user changes the function page type from Video Channels to Software Downloads. A more detailed description of each of the function pages and associated links are discussed below in section 3.e. in connection with FIGS. 13-16.

2. The Page Template for Pages Underlying the Main Menu

Turning now to a more detailed description of the GUI, illustrated in FIG. 3 is the basic page template 180 that may be stored within a local memory of the PC 128, and which may be used to build many of, but not necessarily all, the various GUI pages underlying the main menu page 140 of the present invention. The basic page template 180 includes a main content frame 182, the page title 146, the date/time display 148, and a control panel 184, all arranged as shown. The main content frame 182 displays information of primary interest as the user navigates through the various pages of the GUI. The main content frame 182 may contain live video/audio programming, webpages, links to webpages or services, links to ticker data, program guide information, or links to any other information taken from streaming or file data that the user is interested in and which is consistent with the current page selected by the user. The page title 146 contains the name of the current GUI page or state. The date/time display 148 continuously displays current date and time information that is received from the broadcast data stream and is corrected by the GUI software to reflect the local date and time for the PC's location.

Figure 12:
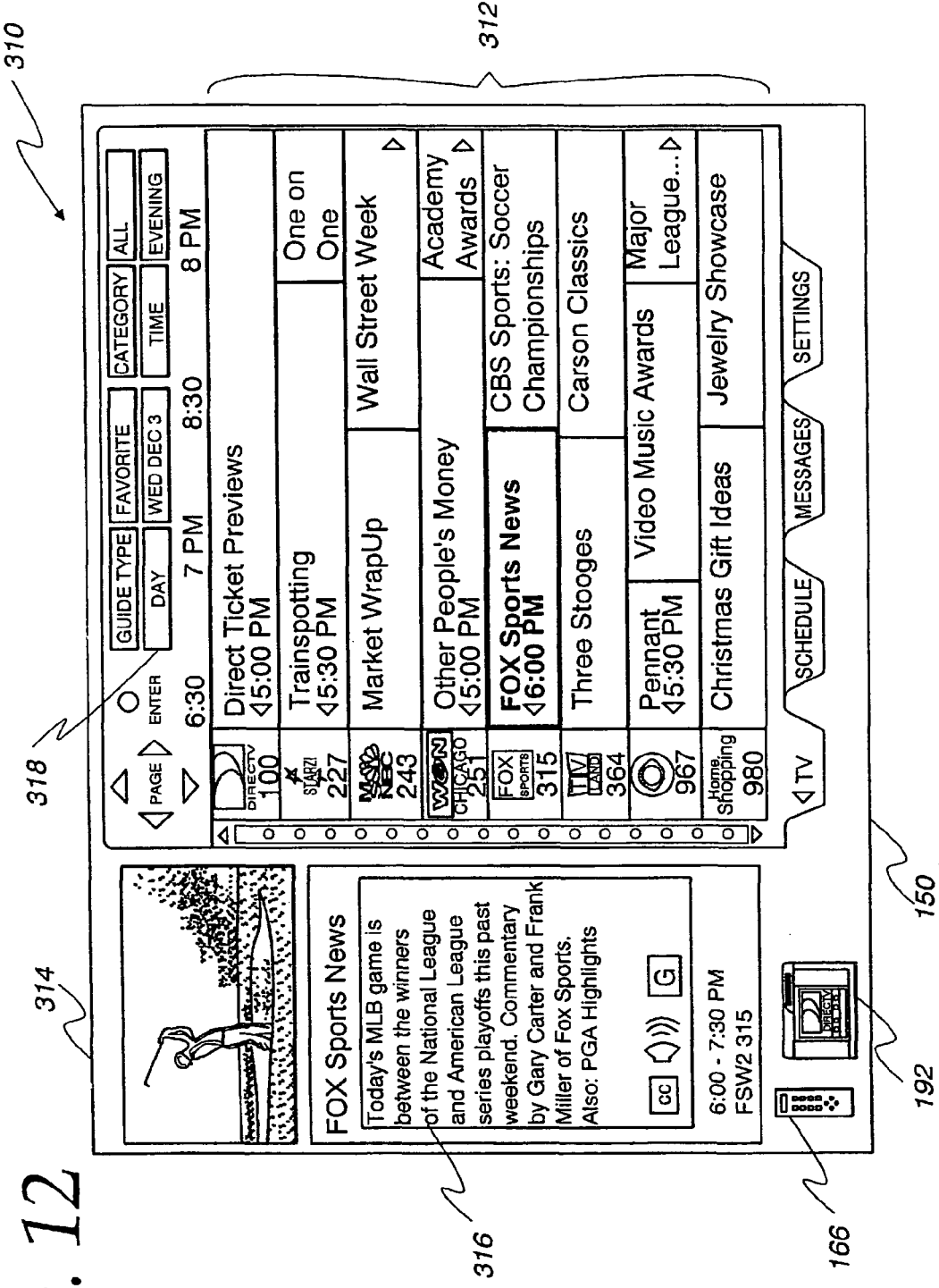
FIG. 12 illustrates an example of a Video Channels service page embodying aspects of the present invention.

The control panel 184 may further include a special links segment 186, a sub-page links segment 188, a functions toggle 190, the pop-up remote control link 166, and a main menu link 192. The special links segment 186 may contain a plurality of graphics representing programs and services of special interest to the user (e.g. websites, software titles available for download, etc.). Using conventional mouse-controlled point and click operations or the like, the user may select one or more of the special links graphics to launch the GUI directly into the selected service, program, etc. The sub-page links segment 188 typically contains graphic buttons representing other GUI pages that are linked to the current GUI page. The user may launch the GUI into one of the linked pages by selecting one of the graphic buttons in the sub-page links segment 188. The functions toggle 190, when selected by the user, launches the GUI into a modified display state having tabbed function pages within the main content frame 182 (e.g., as shown in FIG. 12) that are layered underneath the service page from which the functions toggle 190 was selected. The pop-up remote control link 166 contains a graphic representing a pop-up remote control. The user may select this graphic to overlay a context sensitive (i.e., page dependent) simulated remote control (shown, e.g., in FIGS. 20 and 21) over a portion of the display. The format and operation of this context sensitive simulated remote control is discussed in section 4.b. (Pop-Up Remote Control) of this disclosure. The main menu link 192 contains a graphic representing a link to the main menu page (shown in FIG. 2A). The user may select this graphic to launch the GUI from a current page displaying the graphic back into the main menu page 140.

3. Pages and Links Underlying the Main Menu a. Best of the Web

As previously mentioned, webpage and/or website information may be downloaded to the PC 128 and stored within the computing unit 132 for display on the monitor 130. This information is best accessed and presented using the GUI of the present invention. For example, the BOW data service described below allows the user to select various websites for downloading and storage on his or her receiver station 106.

Figure 4:
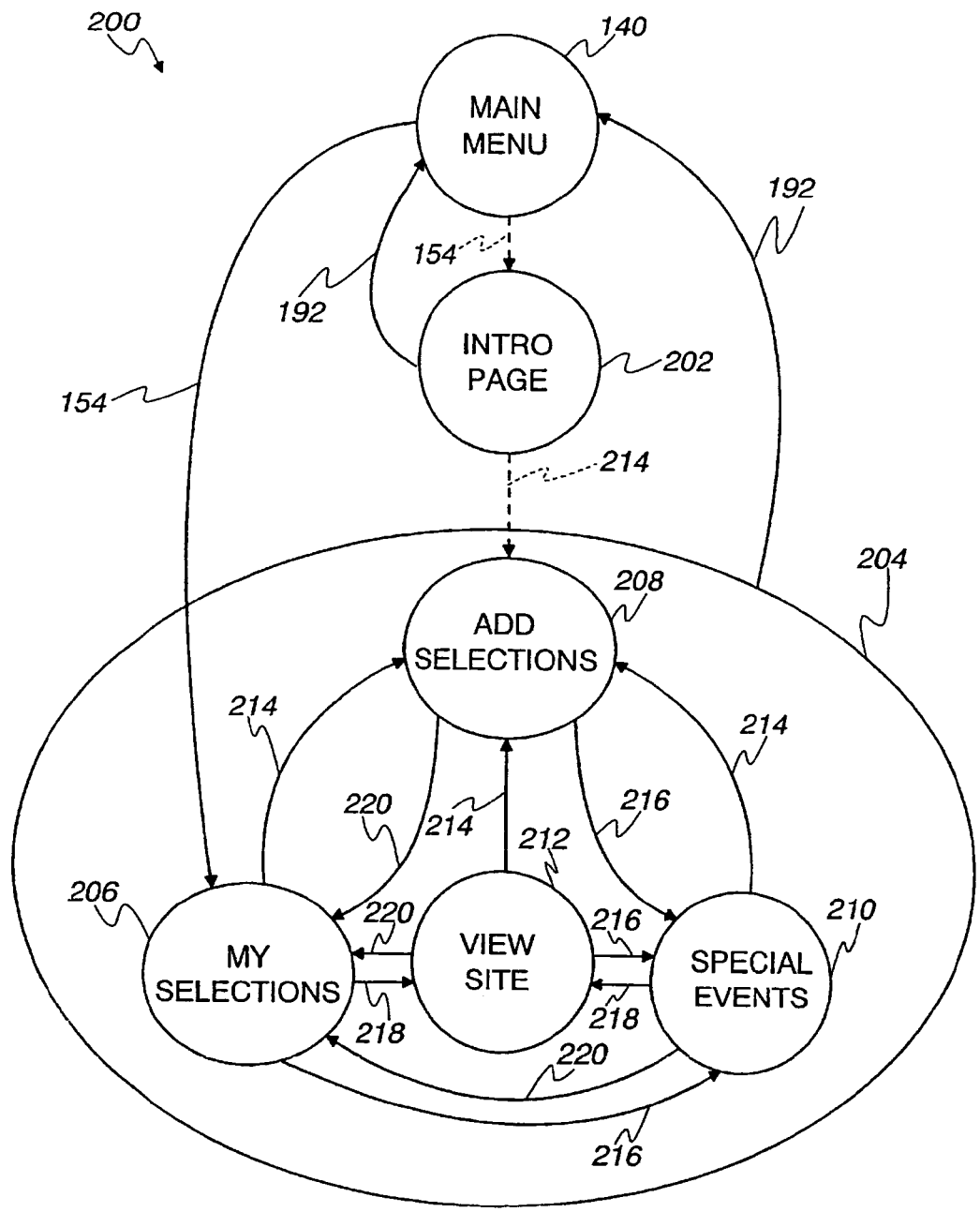
FIG. 4 is a state diagram illustrating aspects of the Best-of-Web (BOW) features of the present invention.

As previously set forth, webpage information may be downloaded and stored in the receiver station 106. Accordingly, the GUI of the present invention is adapted to handle webpage information through a service referred to as Best-of-Web (BOW). Illustrated in FIG. 4 is a state diagram depicting a BOW data service 200. The BOW data service 200 includes the main menu page 140, the Best-of-Web data service link 154, the main menu link 192, and a BOW introduction page 202 that includes basic information for the user on how to use the BOW data service 200. Additionally, the BOW introduction page 202 includes a status bar (not shown) that indicates the progress of a program guide download to the user's PC 128, and a linked group of BOW sub-pages 204. The linked group of BOW sub-pages 204 includes a My Selections sub-page 206 that allows a user to review and deselect websites for downloading from a personal library of websites, an Add Selections sub-page 208 that allows a user to preview and select or deselect available websites for regular download to the personal library of websites, a Special Events sub-page 210 that includes a group of topical or special interest mandatory websites (i.e., websites that are downloaded to the PC 128 whether or not they are requested by the user) that may be selected for viewing by the user, and a View Site sub-page 212 that allows a user to display selected websites.

The pages and sub-pages of the BOW data service 200 are linked together as shown in FIG. 4. The arrows represent directional links that, when selected by a user on a given page, launch the GUI along the direction of the arrow into another state or page. In the preferred embodiment, the links are represented by graphical buttons or logos that, when selected by the user, invoke the associated link and launch the GUI into the corresponding page display/state. The BOW data service 200 is invoked by selecting the Best-of-Web data service link 154 from the main menu page 140. The first time the user launches the GUI along the Best-of-Web data service link 154, the GUI displays the BOW introduction page 202. From the BOW introduction page 202, the user may enter the Add Selections sub-page 208 by invoking a link 214, or may return to the main menu page 140 from the BOW introduction page 202 by invoking the main menu link 192. After the first use of the BOW data service 200, selection of the Best-of-Web data service link 154 directly launches the GUI into the My Selections sub-page 206. From the My Selections sub-page 206, the user may launch the GUI into the Add Selections sub-page 208 by invoking an Add Selections link 214, into the Special Events sub-page 210 by invoking a Special Events link 216, or into the View Site sub-page 212 by invoking a View Site link 218. From the Add Selections sub-page 208 the user may launch the GUI into the My Selections sub-page 206 by invoking a My Selections link 220 or the Special Events sub-page 210 by invoking the Special Events link 216. From the Special Events sub-page 210 the user may launch the GUI into the My Selections sub-page 206 by invoking the My Selections link 220, into the Add Selections sub-page 208 by invoking the Add Selections link 214, and into the View Site sub-page 212 by invoking the View Site link 218. From any page within the group of BOW sub-pages 204 the user may launch the GUI back to the main menu page 140 using the main menu link 192.

Figure 5:
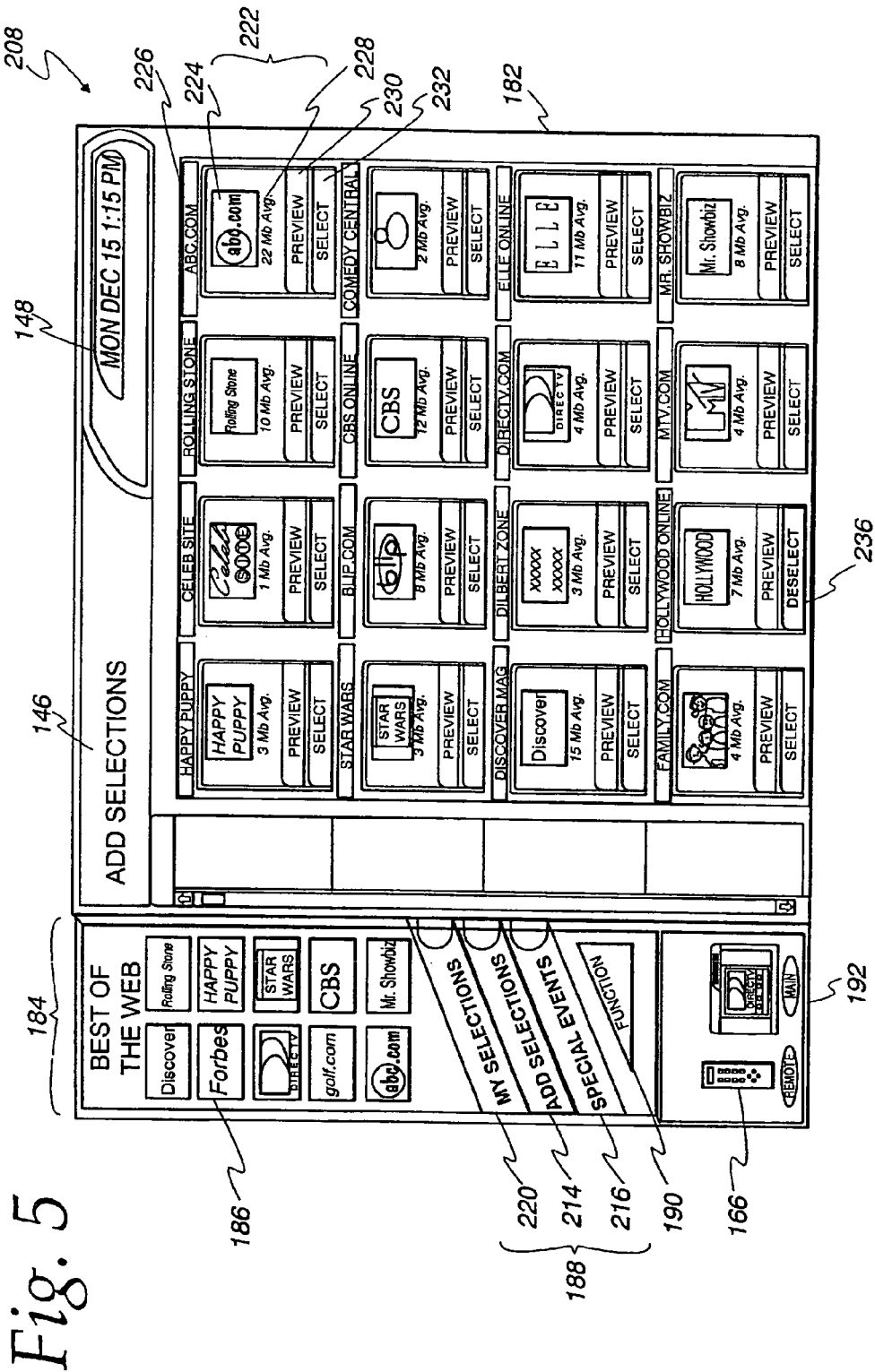
FIG. 5 illustrates an example of a Best-of-Web data service page embodying aspects of the present invention.
Figure 7:
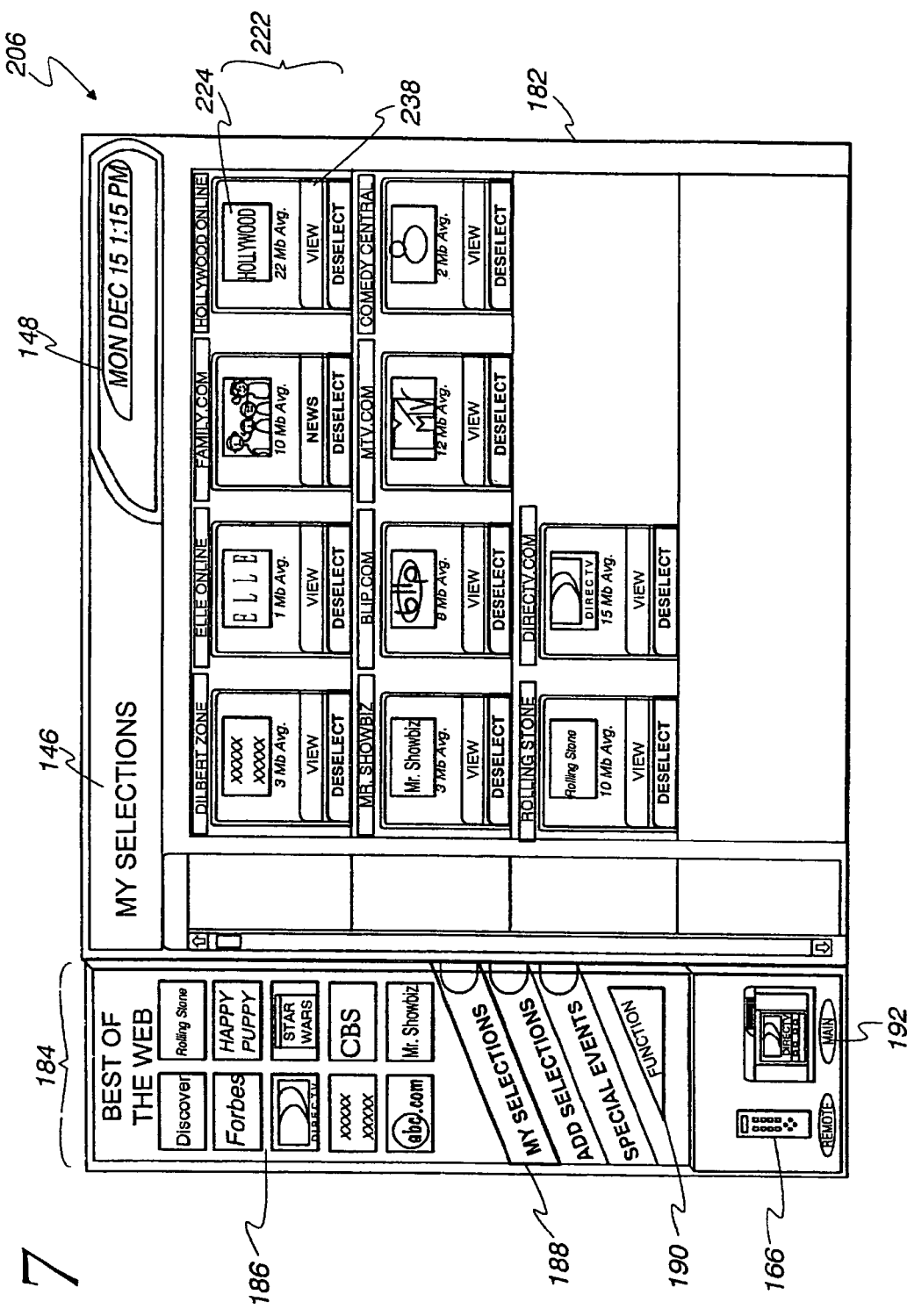
FIG. 7 illustrates yet another example of a Best-of-Web data service page embodying aspects of the present invention.

The sub-pages of the BOW data service 200 are constructed in accordance with the basic page template 180 (shown in FIG. 3). Illustrated in FIGS. 5 and 7 are examples of the Add Selections sub-page 208 and the My Selections sub-page 206 displays, respectively. As shown in these figures, the special links segment 186 contains a plurality of graphics or logos that represent topical, or otherwise noteworthy websites that are mandatory download websites. Mandatory download websites are regularly/periodically downloaded and stored in the local memory of the user's PC 128 regardless of whether the user requests a download of any mandatory sites. When the user selects one of these graphics the GUI launches directly, via the View Site link 218, into the View Site sub-page 212 and displays the contents of the selected site to the user. The control panel 184 further includes the sub-page links segment 188. The sub-page links segment 188 contains a plurality of page links represented by graphic buttons. The graphic buttons have labels that indicate the page the GUI will be launched into when they are selected by the user. The sub-page links segment 188 includes graphic buttons representing the My Selections link 220, the Add Selections link 214, and the Special Events link 216. At the base of the control panel 184 are the pop-up remote control link 166 and the main menu link 192.

The content of the main content frame 182 varies with the particular sub-page in which the GUI currently resides. For example, when the GUI is in the Add Selections sub-page 208 (as shown in FIG. 5) the main content frame 182 contains a matrix of graphic sub-segments representing a library of available websites. The website sub-segments are preferably arranged alphabetically within predetermined categories. Categories may be general areas of user interest such as Entertainment, Finance, Lifestyle, News, and Sports. Each of the website sub-segments 222, further includes a website logo 224 representing the website, a website title header 226, a website size indicator 228, a preview button 230, and a select button 232 or a deselect button 236. The user can preview a website by selecting either the website logo 224 or the preview button 230, which invokes the View Site link 218 and launches the GUI into the View Site sub-page 212. Selecting a website preview invokes a "pop-up" preview child window 234 (shown in FIG. 6) that contains a general description of the contents of the particular website and a selection of media graphics.

Website sub-segments 222 that have been selected for download to the PC 128 have a highlighted (e.g., red) deselect button 236. Website segments that have not been selected for download have an alternately highlighted (e.g., gray) select button 232. By selecting the select button 232 or the deselect button 236 the user toggles the website between select and deselect conditions. The website selection/deselection process may invoke the appearance of several child windows (not shown, but similar to the child window 234 shown in FIG. 6). For example, when the user "clicks on" the select or deselect buttons, the system produces a pop-up child window that prompts the user to confirm the selection or deselection of the website. The user may additionally have the options of confirming/accepting the requested selection/deselection, canceling the selection/deselection and returning to the page display that initiated the child window, and disabling future appearances of the interposing child window.

Alternatively, if the GUI is in the My Selections sub-page 206, as shown, for example, in FIG. 7, then the main content frame 182 includes a matrix of graphic sub-segments representing a library of user selected websites that are arranged, organized, and represented in a similar manner to those in the Add Selections sub-page 208 described above. The user may similarly view a website by either selecting the website logo 224, or a view button 238, which invokes the View Site link 218 and launches the GUI into the View Site sub-page 212. In the View Site sub-page 212, the main content frame 182 displays the selected website's pages. From the My Selections sub-page 206, the user may also deselect a site so that it is removed from the group of sites that are downloaded to the local memory of the PC 128. A pop-up child window confirming the requested deselection is preferably presented to the user. The logos for sites that are scheduled for removal from the satellite transmission system are displayed with a news button (not shown) rather than a view button. When the user selects the news button, an interposing pop-up child window warns of the pending discontinuation of the website from the satellite system and allows the user to launch into the View Site sub-page 212.

If the GUI is in the Special Events sub-page 210 (not shown, but similar to the Add Selections sub-page 208), then the main content frame 182 displays rows of graphic sub-segments representing a group of topical or special interest mandatory download websites (not shown). As with the Add Selections sub-page 208 and My Selections sub-page 206 the website sub-segments are preferably arranged alphabetically within predetermined categories. Categories may be Hot Topics, Sites of the Month, or other similar topical headings. Each website sub-segment includes a logo representing the website, a website title header, a view button, and a preview description. The preview description provides a brief textual overview of the contents of the site. The user can view a site by selecting either the logo or the view button, which invokes the View Site link 218 and launches the GUI into the View Site sub-page 212.

The GUI of the present invention allows for the rapid determination and display of the availability of selected information. A web cache status (i.e., whether or not a webpage is stored on the PC 128) is conveyed automatically to the user from various pages of the GUI. Within the Add Selections sub-page 208, the My Selections sub-page 206, and the Special events sub-page 210 a cursor rollover of any webpage logo/sub-link will indicate to the user whether that particular webpage is locally cached or not. To perform this function rapidly enough to present the status to the user in real time, the system maintains a hash table of all the webpages that are cached in local memory (e.g., RAM or hard disk). A hash table of all the embedded links is created for each displayed frame of the GUI pages that include website logos. The system then makes a single request from the system's proxy server to retrieve the cached state of each link. The cached status for each embedded link is then stored in the hash table. Thus, as the user moves the cursor over a website logo/link, the system can rapidly determine cached status and display this status to the user via an appropriate graphic (e.g. a finger/no finger graphic may be used as a universal yes/no indication).

b. Software Downloads

One type of file data that may be downloaded to the receiver station 106 and stored in the computing unit 132 is commercially-available software (e.g., Quicken™). The receiver station 106 generally includes a memory that stores a table with tuning information and download information. The table may be, but is not limited to, a broadcast address resolution protocol (BARP) table with a plurality of address records including tuning information and download information. Typically, each address record includes tuning information corresponding to download information for a software title. Download information generally includes information associated with a software title such as an Internet Protocol (IP) address and a port. Tuning information may include, but is not limited to, a transponder and a service channel identifier (SCID) number that corresponds to the IP address and the port. Accordingly, in one embodiment, the table stored in the memory includes a plurality of transponders and SCID numbers corresponding to a plurality of IP addresses and ports.

Typically for a software download, the receiver station 106 receives a download request for a software title based on a user input from a user input device such as a keyboard or a mouse. The download request is used to identify download information for the software title. The receiver station 106 opens a connection to a socket based on the download information to receive file data associated with the software title. The receiver station 106 uses the table stored in the memory to determine tuning information corresponding to the download information of the software title. Accordingly, the tuning information is used to tune the receiver station to download information to receive file data for the software title through the socket.

Figure 8:
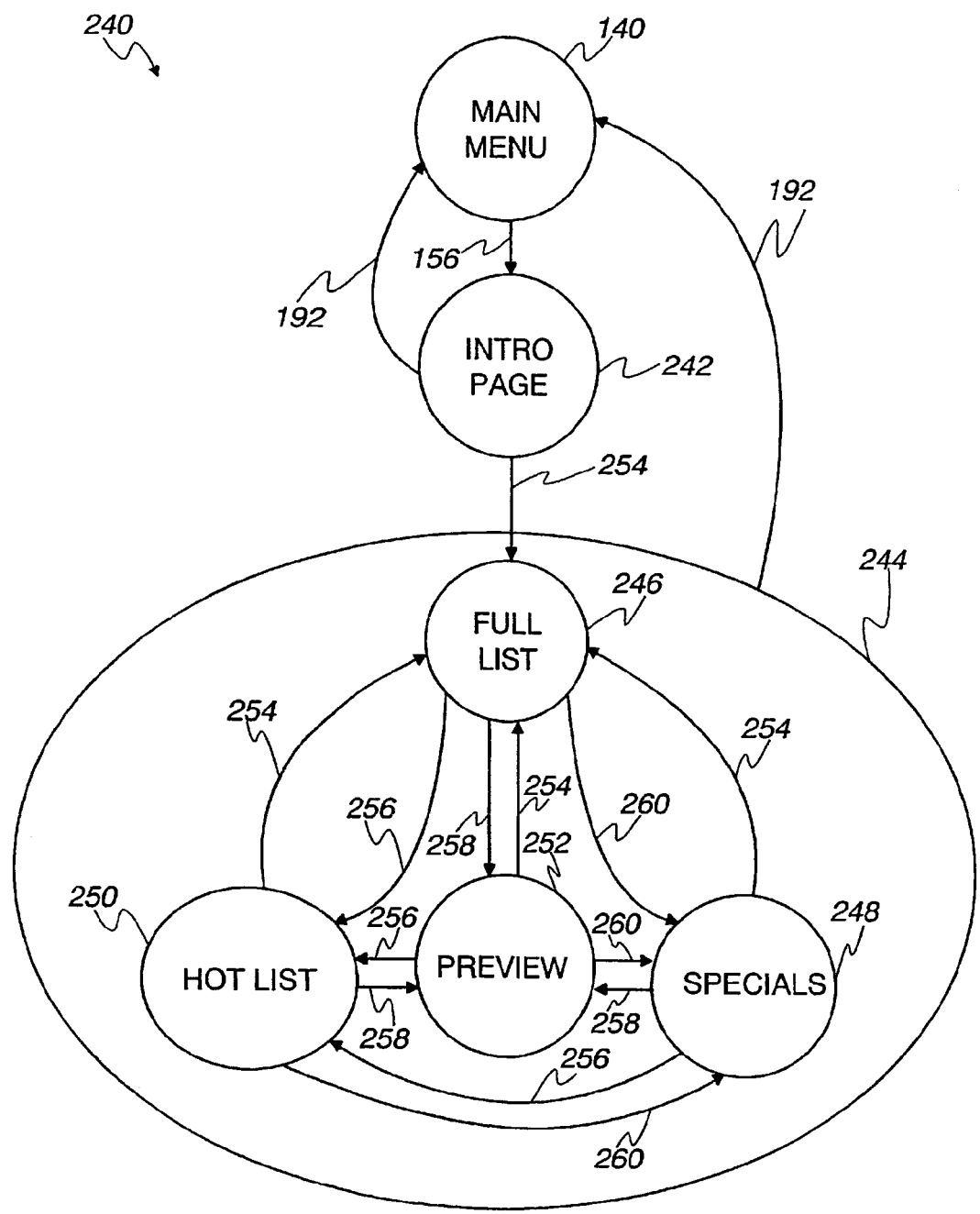
FIG. 8 is a state diagram illustrating the Software Downloads features of the present invention.

Illustrated in FIG. 8 is a state diagram depicting a Software Downloads data service 240. The Software Downloads data service 240 includes the main menu page 140, the Software Downloads service link 156, the main menu link 192, a Software Downloads introduction page 242, and a linked group of Software Downloads sub-pages 244. The Software Downloads introduction page 242 includes basic text information for the user on how to use the Software Downloads data service 240.

The Software Downloads sub-pages 244 further include a Full List sub-page 246 that displays all software available for downloading, a Specials sub-page 248 that displays promotional software available for downloading, a Hot List sub-page 250 that displays popular software available for downloading, and a software preview sub-page 252 that contains a general text description of the user selected software. The pages of the Software Downloads data service 240 are linked together as shown in FIG. 8. The Software Downloads data service 240 is invoked by selecting the Software Downloads service link 156 from the main menu page 140. Once invoked, the Software Downloads data service 240 displays the Software Downloads introduction page 242. From the Software Downloads introduction page 242 the user may either return to the main menu page 140 via the main menu link 192, or may launch the GUI into the Full list sub-page 246 by invoking a Full list link 254. From the Full list sub-page 246, the user may launch the GUI into the Hot List sub-page 250 by invoking a Hot list link 256, into the software preview sub-page 252 by invoking a preview link 258, or into the Specials sub-page 248 by invoking a Specials link 260. From the Hot List sub-page 250, the user may launch the GUI into the Full List sub-page 246 by invoking the Full List link 254, into the software preview sub-page 252 by invoking the preview link 258, or into the Specials sub-page 248 by invoking the Specials link 260. From the Specials sub-page 248 the user may launch the GUI into the Full List sub-page 246 by invoking the Full list link 254, into the software preview sub-page 252 by invoking the preview link 258, and into the Hot List sub-page 250 by invoking the Hot list link 256. From the software preview sub-page 252 the user may launch the GUI into the Hot List sub-page 250 by invoking the Hot List link 256, into the Full List sub-page 246 by invoking the Full List link 254, or into the Specials sub-page 248 by invoking the Specials link 260. The user may launch the GUI back to the main menu from any of the pages of the Software Downloads data service 240 using the main menu link 192.

Figure 9:
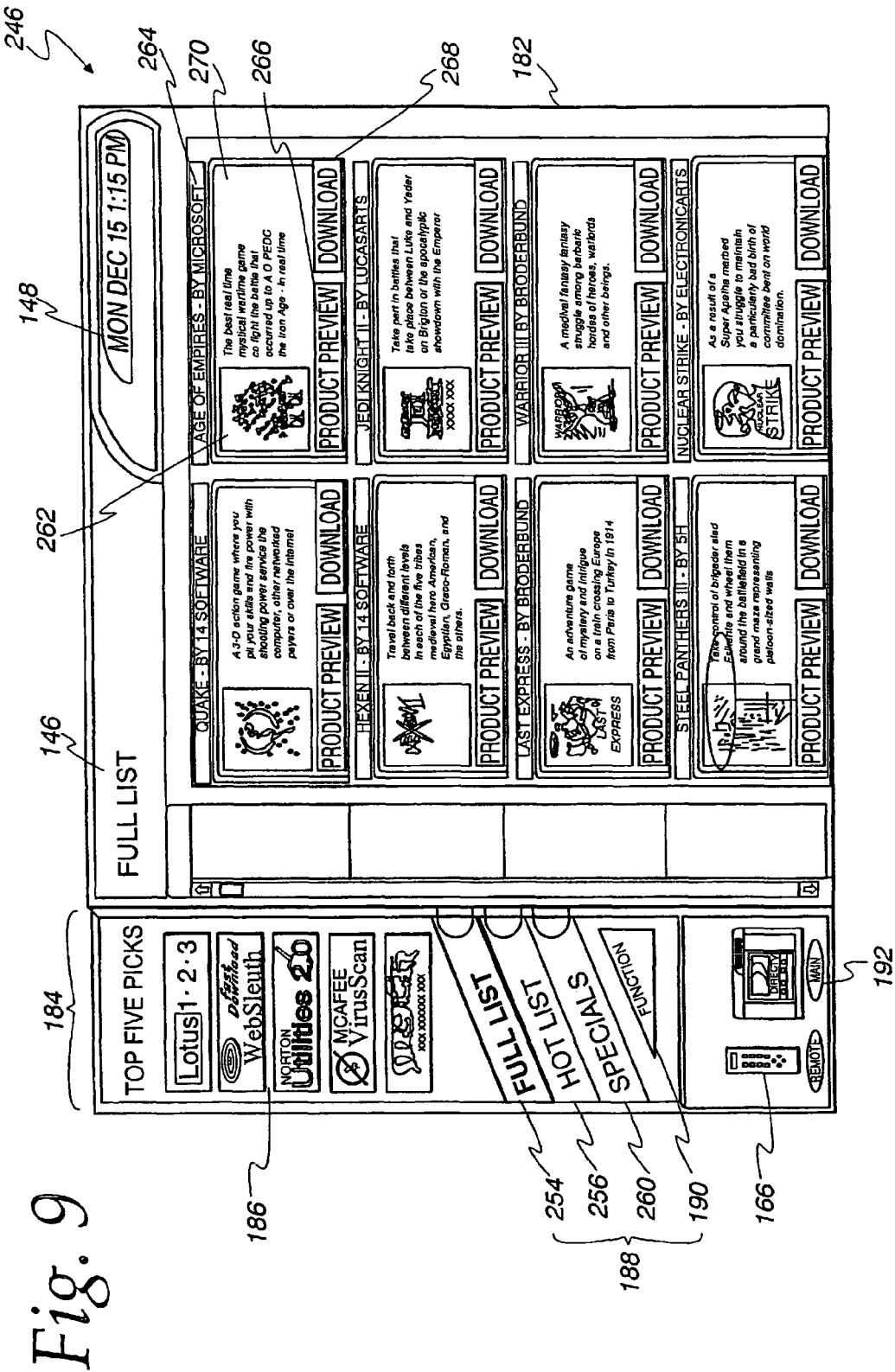
FIG. 9 illustrates an example of a Software Downloads data service page embodying aspects of the present invention.

The pages of the Software Downloads data service 240 are constructed in accordance with the basic page template 180 (shown in FIG. 3). Illustrated in FIG. 9 is an example of the Full list sub-page 246. As shown in FIG. 9, the special links segment 186 contains a plurality of graphics or logos representing the five most popular software titles that are available for downloading. When a user selects one of these logos/graphics the GUI is launched into the software preview sub-page 252 from which the user is given a general textual description of the selected software. The control panel 184 further includes the sub-page links segment 188. The sub-page links segment 188 includes a plurality of page links represented by graphic buttons having labels that correspond to the page the GUI will be launched into when they are selected by the user. The sub-page links segment 188 includes graphic buttons that represent the Full List link 254, the Hot List link 256, and the Specials Link 260. Thus, by selecting the graphic button labeled "Hot List" the GUI will be launched via the Hot List link 256 into the Hot List sub-page 250. At the base of the control panel 184 are the pop-up remote control link 166 and the main menu link 192.

As previously noted, the content of the main content frame 182 varies with the particular sub-page in which the GUI currently resides. When the GUI is in the Full List sub-page 246 (as shown in FIG. 9), the main content frame 182 contains a matrix of graphic sub-segments representing a library of software titles that are available for download. Each software sub-segment further includes a software logo 262 representing the particular software title, a software title header 264, a software preview button 266, a download button 268, and a textual software description 270. The user can preview a software title by selecting either the software logo 262 or the software preview button 266. Selecting either the software logo 262 or the software preview button 266 invokes the preview link 258, which launches the GUI into the software preview sub-page 252. In the software preview sub-page 252 the user is given a more detailed textual description of the selected software title. The user may download a software title by selecting the title using the download button 268 on the Full List sub-page 246 or from the software preview sub-page 252.

If the user selects the download button 268 for a particular software title, he/she is presented with a set of choices for available download date/times for that title. The GUI may display for the user a confirmation that he or she is about to schedule the download of a software title and may additionally provide other information pertinent to the download such as software version options. If the user selects one of the available download date/times then a download is scheduled for that date/time. At the scheduled date/time for a download, the receiver station 106 opens a connection based on an IP address and a port in any known or desired manner. In particular, the receiver station 106 opens an IP socket based on the IP address and the port to download file data associated with the selected software title. The receiver station 106 tunes to the proper transponder/feed for the download by determining a transponder and a SCID number corresponding to the IP address and the port in a data structure stored in a memory. The data structure may be a BARP table listing a plurality of transponders/SCID numbers that correspond to a plurality of IP addresses and ports. In particular, the BARP table may include a plurality of BARP address records as illustrated in FIG. 31B, which is further discussed in section IV.G.2. of this disclosure. A BARP address record identifies a transponder and a SCID number for a particular IP address and port. Therefore, the BARP table allows the receiver station 106 to rapidly determine a transponder and a SCID number that corresponds to the IP address and the port for the selected software title. For example, a broadcast of Quicken '98™ software may be broadcast on the IP address 1.2.3.4 and port six. According to the BARP table, the IP address 1.2.3.4 and port six may correspond to tuning information indicating transponder two and SCID five. A message is sent with success/fail information for the download, which is rescheduled if necessary.

In an alternate embodiment, real-time data in the form of an announcement is sent to the receiver station 106 indicating that a software title is available at a download date/time. The receiver station 106 receives download information for the software title included in the announcement. In particular, the download information includes the IP address and the port associated with the software title. If the user selects the download button 268 or a software logo then the receiver station 106 proceeds to download file data associated with the software title during the download date/time as described above.

Figure 33:
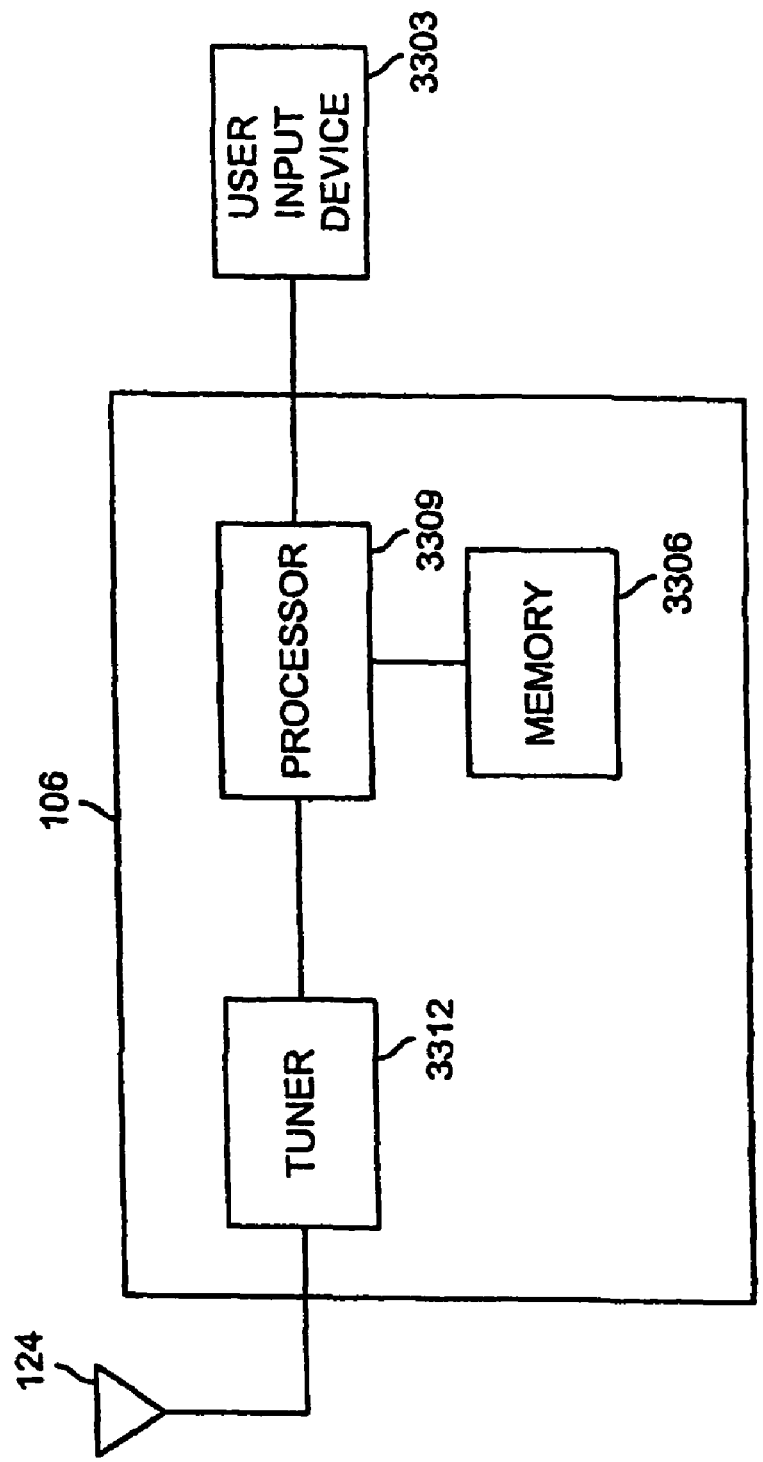
FIG. 33 is a block diagram of an example receiver station.

As illustrated in FIG. 33, the receiver station 106 is coupled to a user input device 3303, which may be a keyboard or a mouse. The receiver station 106, which is further discussed in sections IV.C. and IV.D. of this disclosure, generally includes a memory 3306, a processor 3309, and a tuner 3312 operatively coupled as is well known. The memory 3306 stores tuning information and download information in a BARP table as described above. The processor 3309, which is coupled to the memory 3306 and the tuner 3312, executes a program or a set of operating instructions to tune to an IP address and a port as described above for the Software Downloads data service 240. A computer readable medium stores the program or operating instructions executed by the processor 3309. The computer readable medium may be, but is not limited to, paper, a programmable gate array, application specific integrated circuit (ASIC), erasable programmable read only memory, read only memory, random access memory, magnetic media, and optical media. The tuner 3312 is coupled to the processor 3309 and the antenna 124.

The receiver station 106 receives a download request based on a user input for a software title from the user input device 3303 and uses the download request to identify download information. The download information includes an IP address and a port associated with the selected software title. The processor 3309 uses the IP address and the port to open a connection to an IP socket. In addition, the processor 3309 uses the BARP table stored in the memory 3306 to determine the tuning information corresponding to the IP address and the port of for the selected software title. As noted above, the tuning information includes a transponder and a SCID number. The tuner 3312 uses the tuning information to tune the receiver station 106 to the IP address and the port for the selected software title. Accordingly, the receiver station 106 receives the file data associated with the selected software title through the IP socket from the antenna 124.

The Hot List sub-page 250 is similar to the Full List sub-page 246 except the software titles shown are selected based on their popularity. The Specials sub-page 248 is also similar to the Full List sub-page 246 except the available software titles are selected for promotional purposes. Both the Hot List sub-page 250 and the Specials sub-page 248 allow the user to download software either directly via the download button 268, or through the software preview sub-page 252.

c. Data Channels

Figure 10:
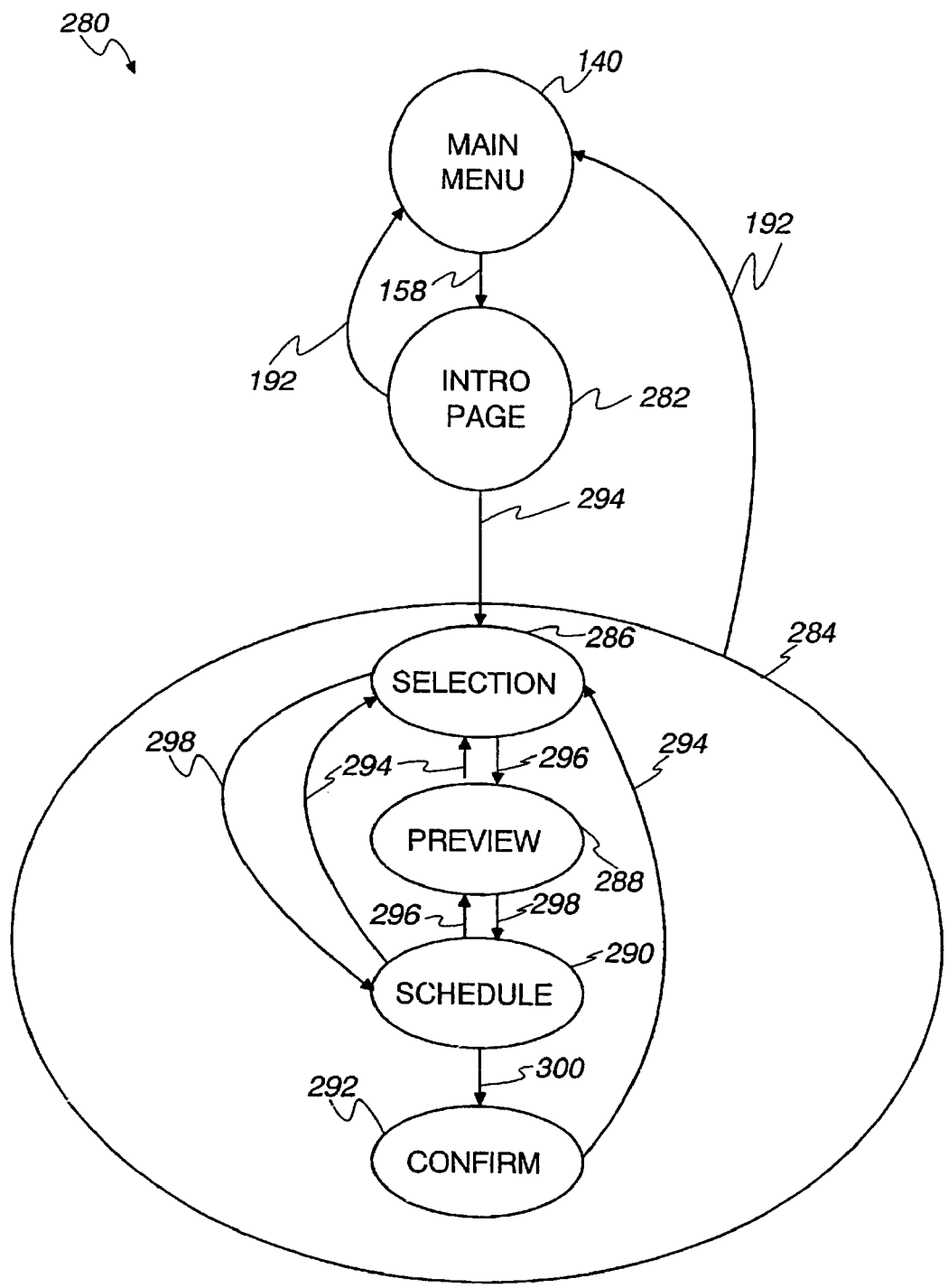
FIG. 10 is a state diagram illustrating the Data Channels features of the present invention.

Illustrated in FIG. 10 is a state diagram depicting a Data Channels data service 280. The Data Channels data service 280 includes the main menu page 140, the Data Channels service link 158, the main menu link 192, a Data Channels introduction page 282 that includes basic textual information for the user on how to use the Data Channels data service 280, and a linked group of Data Channels sub-pages 284. The linked group of Data Channels sub-pages 284 further includes a Selection sub-page 286 that presents to the user the data services available, a Data Channels preview sub-page 288 that allows a user to preview a selected data service, a Schedule sub-page 290 that contains download information such as price, available software options and download schedule details, and a Confirmation sub-page 292 that acknowledges a newly downloaded data service for the user.

The pages and sub-pages of the Data Channels data service 280 are linked together as shown in FIG. 10. The Data Channels data service 280 is invoked by selecting the Data Channels service link 158 from the main menu page 140. By selecting the Data Channels service link 158, the GUI launches into the Data Channels introduction page 282. From the Data Channels introduction page 282 the user may go back to the main menu page 140 by selecting the main menu link 192 or may launch into the Selection sub-page 286 by invoking a Selection page link 294. From the Selection sub-page 286 the user may launch into the Schedule sub-page 290 by invoking a Schedule page link 298 or may launch into the Data Channels preview sub-page 288 by invoking a preview page link 296. From the Data Channels preview sub-page 288 the user may launch into the Selection sub-page 286 by invoking the Selection page link 294 or may launch into the Schedule sub-page 290 by invoking the Schedule page link 298. From the Schedule sub-page 290 the user may launch into the Data Channels preview sub-page 288 by invoking the preview page link 296 or may launch into the Confirmation sub-page 292 by invoking a Confirm page link 300. From the Confirmation sub-page 292 the user may return to the Selection sub-page 286 by invoking the Selection page link 294. Additionally, the user may return to the main menu from any of the sub-pages by selecting the main menu link 192.

Figure 11:
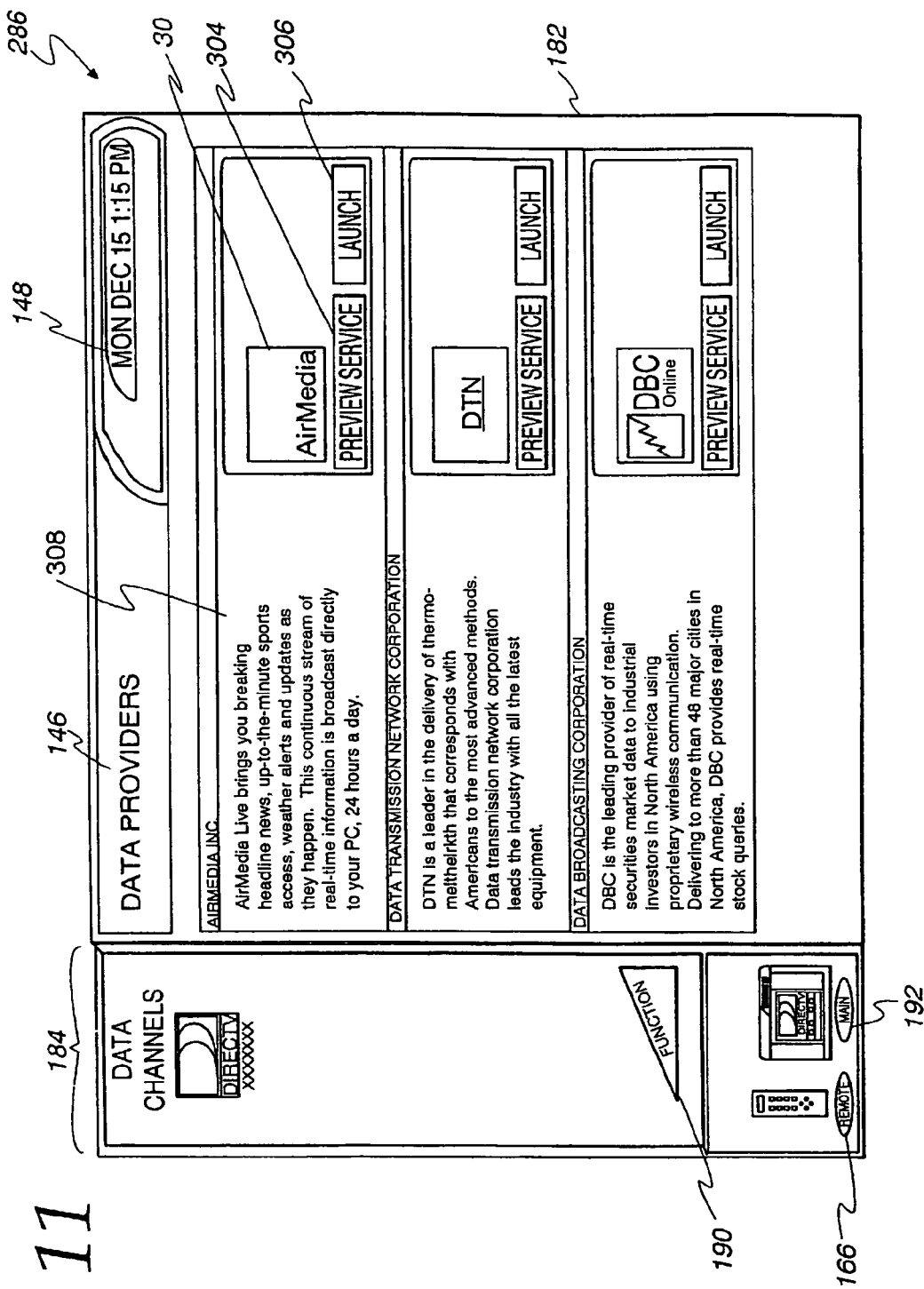
FIG. 11 illustrates an example of a data Channels service page embodying aspects of the present invention.

The sub-pages of the Data Channels service 220 are constructed in accordance with the basic page template 180 (shown in FIG. 3). Illustrated in FIG. 11 is an example of the Selection sub-page 286. The control panel 184 of the Selection sub-page 286 contains only the functions toggle 190, the pop-up remote control link 166, and the main menu link 192. The main content frame 182 of the Selection sub-page varies with the particular sub-page in which the GUI currently resides. For example, when the GUI is in the Selection sub-page 286 (as shown in FIG. 11), the main content frame 182 contains a plurality of sub-segments representing the various data channel services that are available. Each data channel sub-segment contains a data channel logo 302, a data channel preview button 304, a data channel launch button 306, and a data channel description 308.

d. Video Channels

Selection of the Video Channels service link 152 (FIG. 2A) launches the GUI into a multi-segment electronic program guide 310 shown in FIG. 12. The electronic program guide 310 includes a grid-based channel guide 312, the channel tuning bar 150 (also displayed in the main menu page 140), the pop-up remote control link 166, the main menu link 192, an active video window 314, a program description 316, and an electronic program guide configuration header 318.

The grid-based channel guide 312, uses a Gantt chart style layout with time of day along one axis and channels along the other. The user can tune to a desired channel by selecting a particular row/column of the grid-based channel guide 312, using the channel tuning bar 150 or the pop-up remote control link 166. Both the channel tuning bar 150 and the pop-up remote control link 166 are described in more detail later in this disclosure under sections 4.a. (Tuning Bar) and 4.b. (Pop-Up Remote Control), respectively.

The active video window 314 displays programming from the currently selected channel. The program description 316 may include a variety of program information such as an abstract of the program, the time slot, the rating, and the availability of closed captioning for a currently highlighted grid guide program. The electric program guide configuration header 318 allows the user to filter the contents of the program grid based on the day, the kind of program, the time slot, or according to predefined categories.

As described earlier, the GUI of the present invention provides several function pages that work to improve the GUI's flexibility, and assist the user in filtering and managing the large amount of information available. These function pages may be launched from the main menu page 140 (shown in FIG. 2A) via the function links 160, 162, 164, from a service page by selecting the functions toggle 190, or from the grid-based channel guide by selecting the tabs at the bottom of the guide.

e. Function Pages

Figure 13:
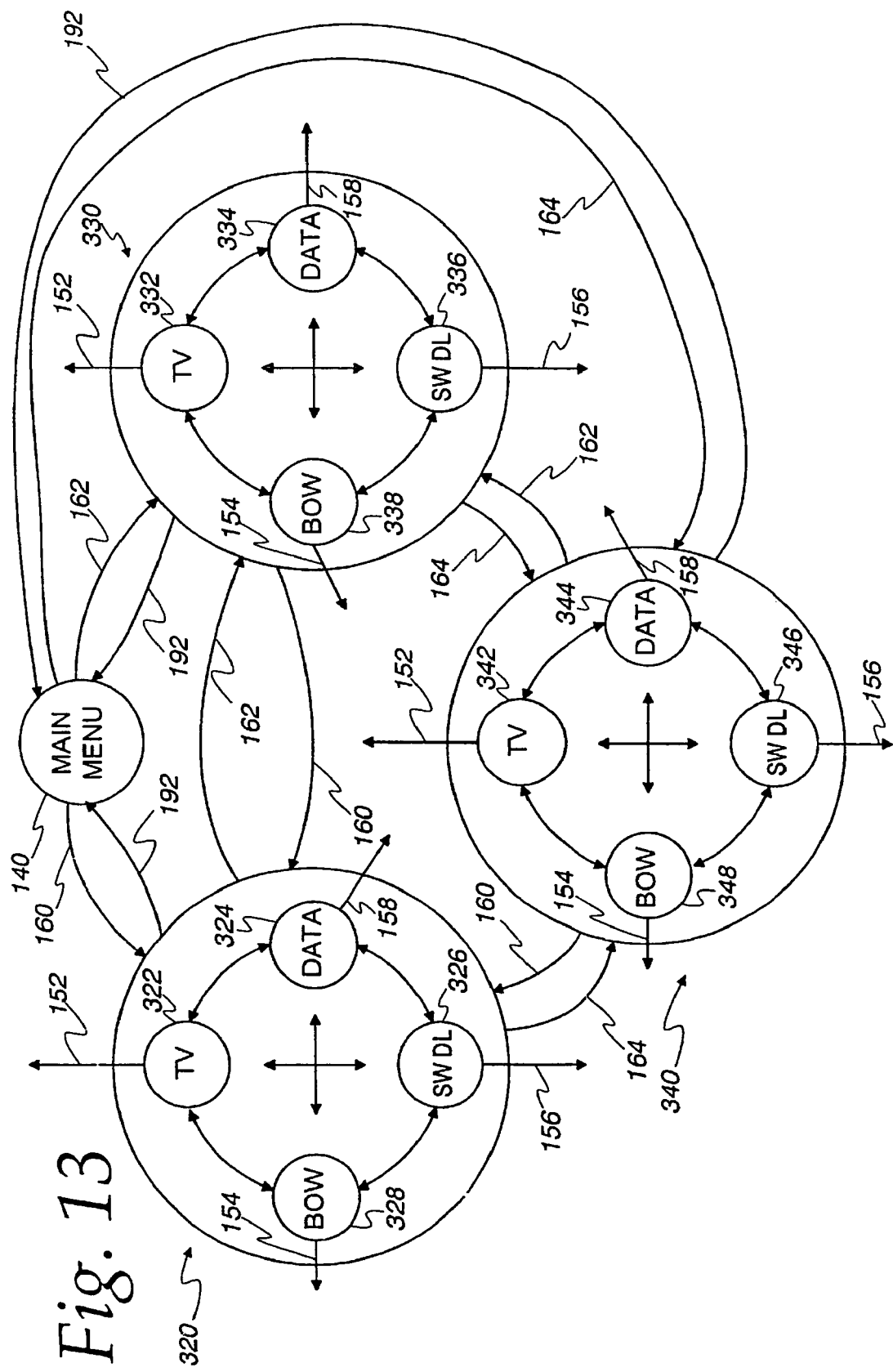
FIG. 13 is a state diagram illustrating the "settings," "messages," and "schedule," functions of the present invention.

Illustrated in FIG. 13 is a state diagram depicting the organization of the function pages that are associated with the main menu page 140. From the main menu page 140, the user may invoke the schedule function link 160 to launch the GUI into an interlinked group of schedule sub-pages 320, the messages function link 162 to launch the GUI into an interlinked group of messages sub-pages 330, or the settings function link 164 to launch the GUI into an interlinked group of settings sub-pages 340. The schedule sub-pages 320, messages sub-pages 330, and the settings sub-pages 340 are further interlinked via the schedule function link 160, the messages function link 162, and the settings function link 164 as shown in FIG. 13. The main menu link 192 may be invoked from any sub-page to go back to the main menu page 140.

The various function pages illustrated in FIG. 13 may also be accessed from the various service pages by selecting the functions toggle 190. In the preferred embodiment, if the user has selected a function page from within a data service (using the functions toggle 190), in order to link to another data service the user must also exit the function pages via the data service from which the functions toggle was selected. Thus, the user can freely navigate between the various function pages associated with the available data services once the function pages have been linked to via the main menu or from within a data service page, but he/she cannot navigate between data services from within the function pages. In other embodiments, it may, however, be desirable to allow the user to freely navigate between the various data services from within any state of the GUI.

The schedule sub-pages 320 include a TV schedule page 322, a Data Channels schedule page 324, a Software Downloads schedule page 326, and a Best-of-Web schedule page 328. These sub-pages 320 are all interlinked as shown. Additionally, the GUI may be launched from any schedule sub-page into a corresponding data service. From the TV schedule page 322 the GUI may be launched, via the Video Channels service link 152, into the electronic program guide 310 (shown in FIG. 12). From the Data Channels schedule page 324 the GUI may be launched, via the Data Channels service link 158, into the Data Channels data service 280 (shown in FIG. 10) if that service is currently active/selected, from the Software Downloads schedule page 326 the GUI may be launched, via the Software Downloads service link 156, into the Software Downloads data service 240 (shown in FIG. 8) if that service is currently active/selected, and the from the Best-of-Web schedule page 328 the GUI may be launched, via the Best-of-Web data service link 154, into the BOW data service 200 (shown in FIG. 4) if that service is currently active/selected.

Figure 14:
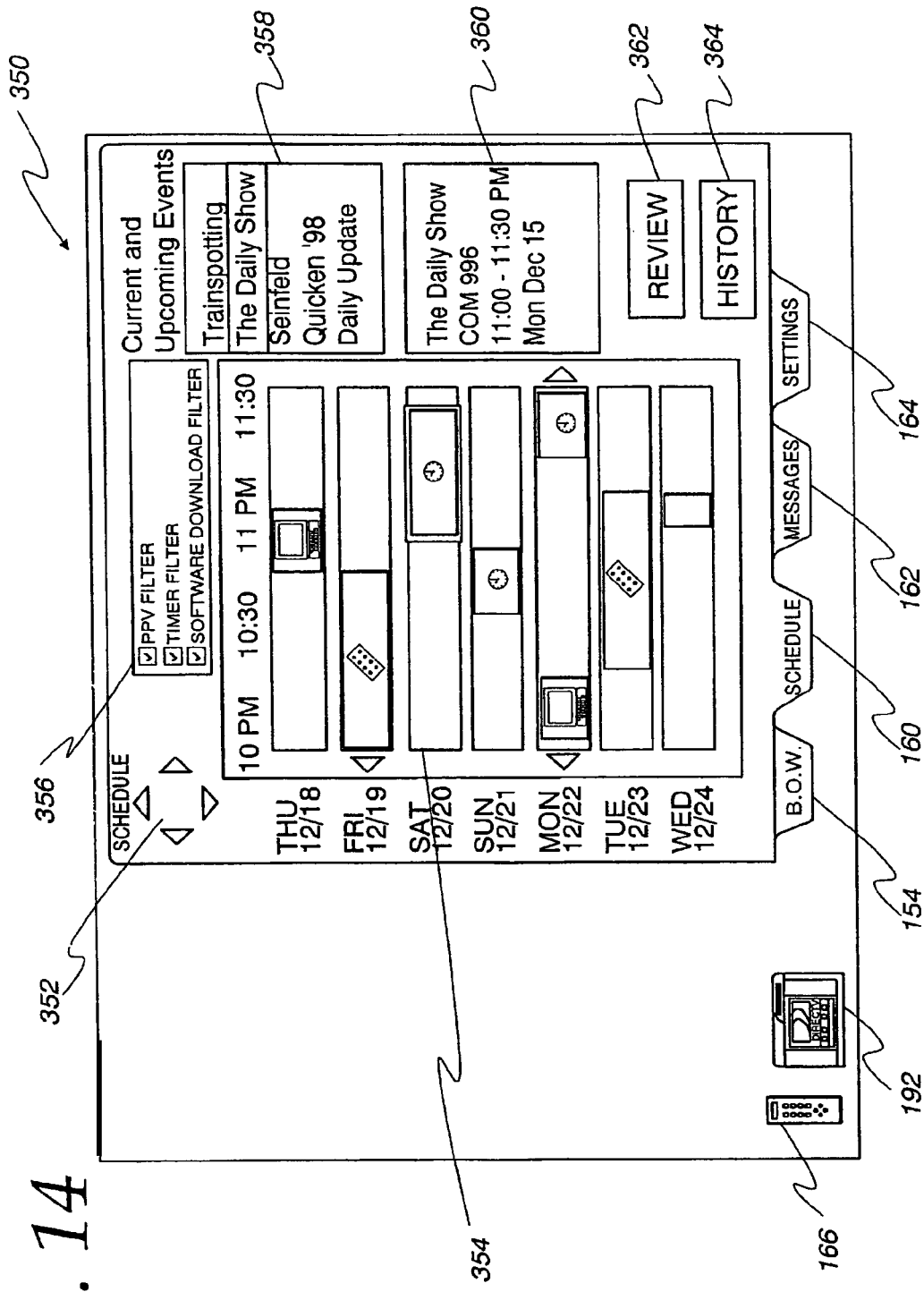
FIG. 14 illustrates an example of a schedule function page embodying aspects of the present invention.
Figure 15:
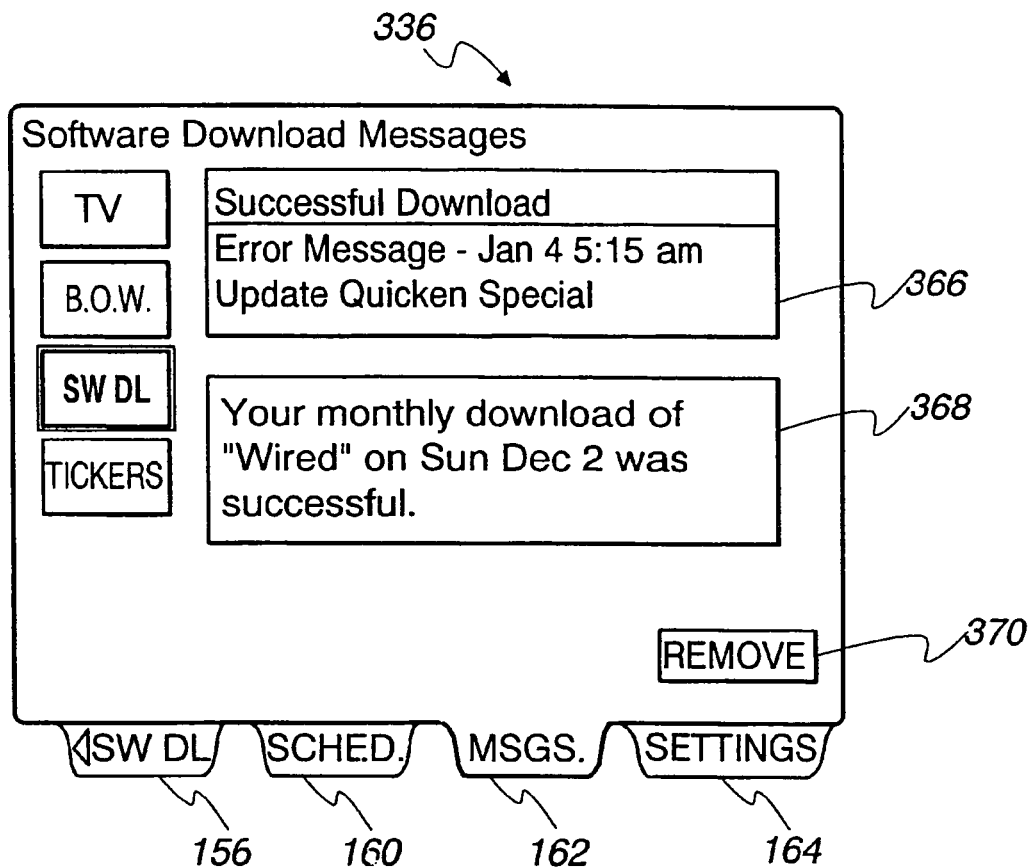
FIG. 15 illustrates an example of a message function page embodying aspects of the present invention.
Figure 16:
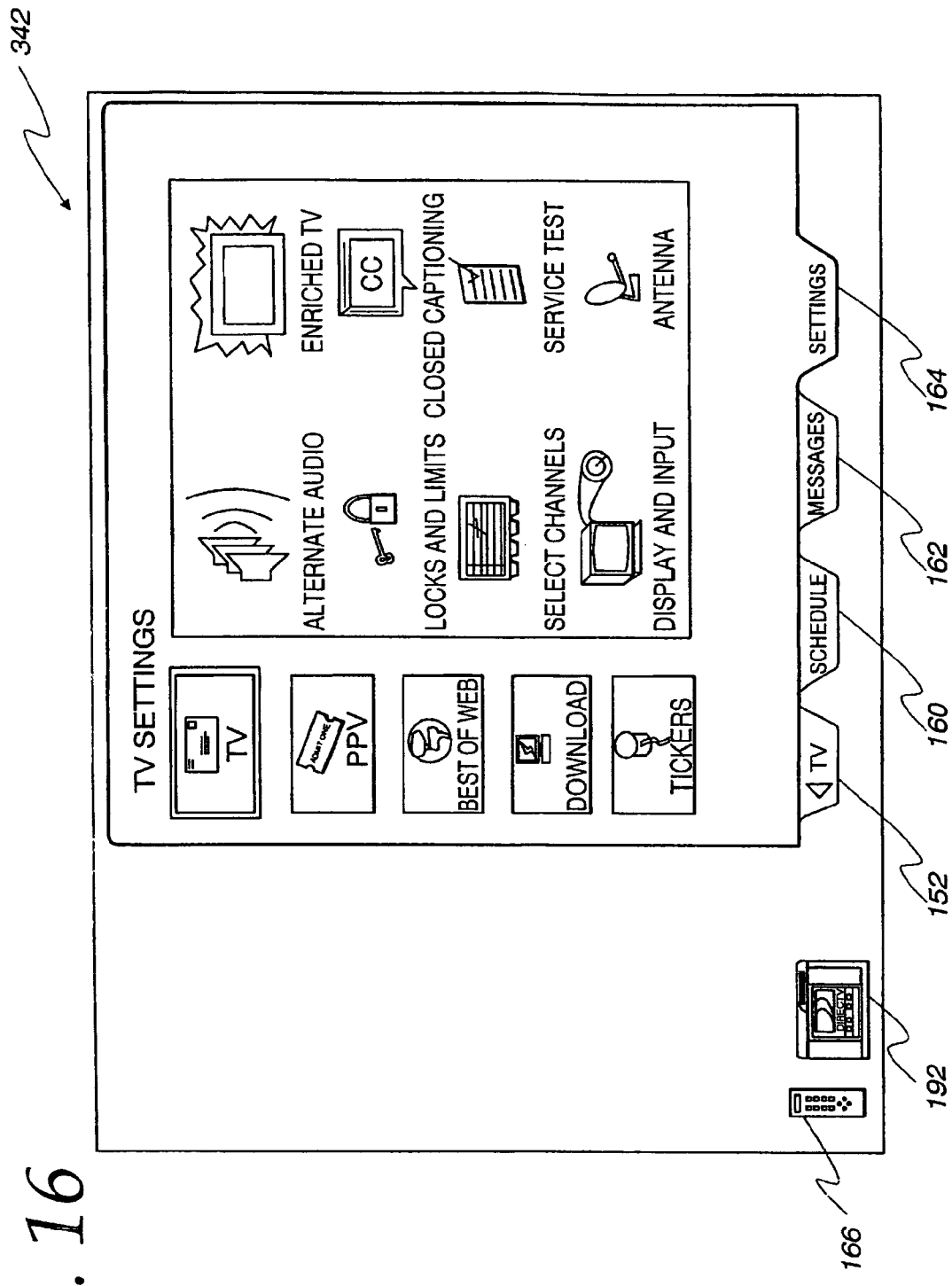
FIG. 16 illustrates an example of a settings function page embodying aspects of the present invention.

The schedule sub-pages 320 provide a user-defined multi-day event calendar 350 (shown, e.g., in FIG. 14). From the event calendar 350, the user can review upcoming events (e.g. TV shows, software downloads, etc.), remove scheduled events, or may review past events. The multi-day event calendar 350 includes scroll arrows 352 that allow the user to adjust a central schedule view 354 up/down by days or left/right by hours. A filter section 356 allows the user to selectively filter what programs appear in the central schedule view 354. For example, the user may adjust the filters to display only scheduled software downloads. A current/upcoming events section 358 displays a textual list of scheduled events, such as a television show, a software download, a special/topical television program, etc. When the user highlights one event from the list of the events in the current/upcoming events section 358 an events text box 360 displays additional information to the user associated with the highlighted event. A review button 362, when selected, allows the user to review details of a particular scheduled event. For example, the date and time for a software download can be reviewed, modified to an alternative date and time, or may be canceled. A history button 364, when selected, allows the user to review past software downloads and television programs.

The messages sub-pages 330 include a TV messages page 332, a Data Channels messages page 334, a Software Downloads messages page 336, and a Best-of-Web messages page 338. The messages sub-pages 330 are all interlinked as shown in FIG. 13. From the TV messages page 332 the GUI may be launched, via the Video Channels service link 152, into the electronic program guide 310 (shown in FIG. 12) if that service is currently active/selected. From the Data Channels messages page 334 the GUI may be launched, via the Data Channels service link 158, into the Data Channels data service 280 (shown in FIG. 10) if that service is currently active/selected, from the Software Downloads messages page 336 the GUI may be launched, via the Software Downloads service link 156, into the Software Downloads data service 240 (shown in FIG. 8) if that service is currently active/selected, and the from the Best-of-Web messages page 338 the GUI may be launched, via the Best-of-Web data service link 154, into the BOW data service 200 (shown in FIG. 4) if that service is currently active/selected. All the messages sub-pages allow a user to view promotional and status text messages related to the current service page type. For example, the Software Downloads messages page 336 (shown, e.g., in FIG. 15) includes textual, promotional and status messages related to available or scheduled software downloads. A messages summary 366 provides one-line text summaries describing the various messages that can be selected for viewing by the user. A message body 368 is displayed for the currently highlighted message. A remove button 370, when selected, eliminates the currently highlighted message from the display.

The settings sub-pages 340 include a TV settings page 342, a Data Channels settings page 344, a Software Downloads settings page 346, and a Best-of-Web settings page 348. The settings sub-pages 340 are all interlinked as shown in FIG. 13. Additionally, from the TV settings page 342 the GUI may be launched, via the Video Channels service link 152, into the electronic program guide 310 (shown in FIG. 12) if that data service is currently active/selected. From the Data Channels settings page 344 the GUI may be launched, via the Data Channels service link 158, into the Data Channels data service 280 (shown in FIG. 10) if that service is currently active/selected, from the Software Downloads settings page 346 the GUI may be launched, via the Software Downloads service link 156, into the Software Downloads data service 240 (shown in FIG. 8) if that data service is currently active/selected, and the from the Best-of-Web settings page 348 the GUI may be launched, via the Best-of-Web data service link 154, into the BOW data service 200 (shown in FIG. 4) if that data service is currently active/selected.

The TV settings page 342 (shown, e.g., in FIG. 16) allows a user to configure audio tracks (i.e. choice of language), select or lock-out satellite and broadcast channels, configure inputs (e.g. antenna, cable, HRC, IRC), set spending limits for pay-per-view selections, set ratings limits, modify display dimensions, configure the antenna (i.e. enter the antenna coordinates), activate closed captioning, service test the system, and configure an enriched TV mode (i.e., set the maximum cache size for enriched TV in kilobytes). The Software Downloads settings page 346 allows the user to set the download directory in which download files will be stored. The Best-of-Web settings page 348 allows a user to modify Internet settings (e.g., cache size), change webcast settings, and define the proxy server and browser specific settings.

4. Tuning Interface a. Tuning Bar

Figure 2B:
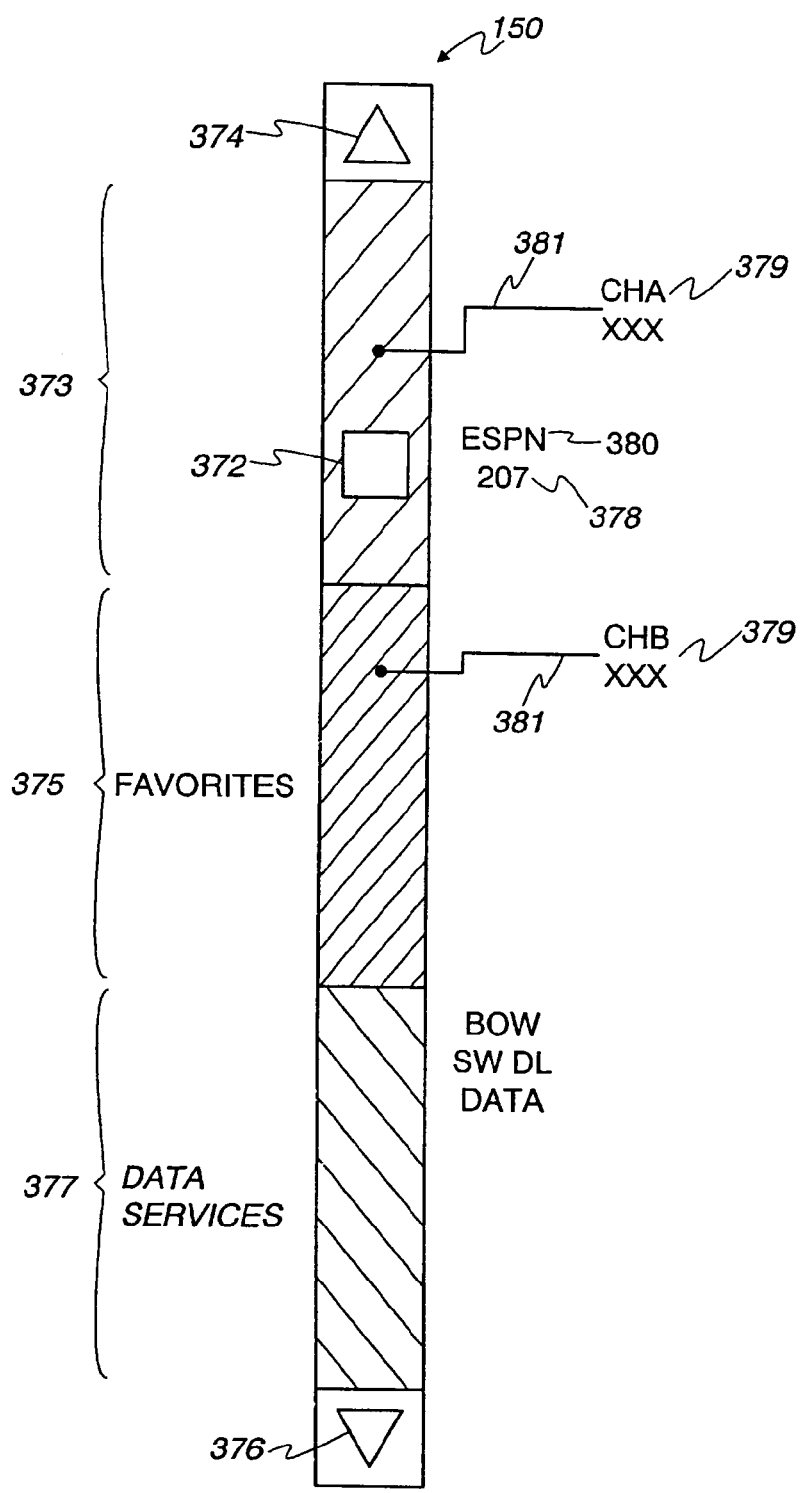
FIG. 2B illustrates a graphical tuning bar in accordance with the present invention.

An important aspect of the present invention is the graphical channel tuning bar 150. As shown in FIGS. 2A and 2B, the channel tuning bar 150 has a slider 372, an up arrow 374, a down arrow 376, a channel number 378, and a channel call-sign 380. The channel tuning bar 150 is automatically scaled so that the channels a particular user is entitled to see are evenly distributed along the vertical length of the channel tuning bar 150. In operation, the vertical position of the slider 372, the channel number 378, and the channel call-sign 380, all correspond to the incoming video/audio programming that is currently being selected by a tuner 426 and a transport functional processing block 432 (shown in FIG. 22), and routed to and optionally displayed in the central video window 142. The user can change the current video channel selection in four ways. First, the user may increment or decrement the selected video channel by selecting the up arrow 374 or the down arrow 376, respectively. Second, the user can move the slider 372 directly to a desired vertical position or channel by grabbing the slider with the cursor and dragging it along the channel tuning bar 150. Third, the user can move the cursor to point to a specific vertical position along the channel tuning bar 150, and fourth, the user may enter numeric, alpha, or alphanumeric information related to a new channel directly via the PC's keyboard.

Holding the cursor over any portion of the channel tuning bar 150 produces a pop-up window that displays to the user the channel number and call-sign of the channel associated with that location on the channel tuning bar 150. Thus, when the user sees a desired channel number or call-sign in the pop-up window they may select that point along the tuning bar so that the slider 372 moves directly to the channel associated with that position. Once a new channel has been selected, the channel number 378, the channel call-sign 380, the vertical position of the slider 372, the video displayed in the central video window 142, and the video title 144 are updated to correspond to the newly tuned/selected channel.

In the disclosed embodiment, the channel tuning bar 150 is divided into a number of locations, or increments, equal to the number of available tunable channels, services or other available selections. It is known that individual users in high capacity DTH systems may subscribe to one or more available programming packages. Access to the available services is limited using conventional conditional access systems. Different users may subscribe to different channels, or a given subscriber may change its authorizations over time.

It is desirable, therefore, to accommodate changes in the channel authorizations so that channel tuning bar 150 has an evenly distributed display without any "dead zones" or gaps. The top-most position in the vertical channel tuning bar 150 could, for example, correspond to a first service (e.g. the lowest numbered channel that the particular user is authorized to receive), while the lowest position on the channel tuning bar 150 corresponds to the opposite extreme (e.g. the highest numbered channel the user is authorized to receive). Within this range, channels that the user is authorized to receive are dynamically distributed along the channel tuning bar 150 such that the spaces between each channel's "area" on the tuning bar is substantially equal, regardless of the number of channels available for viewing.

To achieve this result, processors within the PC's computing unit 132 (FIG. 2) that are responsible for generating the GUI (including the slider 372 and channel tuning bar 150) have access to stored information corresponding to the channel authorizations or a user defined subset of them. This local authorization information may be utilized to eliminate from the customer's grid display (FIG. 12) grid lines or rows corresponding to unavailable channels. Alternatively, some unsubscribed channels may be displayed for promotional purposes. In the same manner, the channel authorization data may be used to assemble a complete subset of available services or other functions for use in allocating locations along the channel tuning bar 150.

In the disclosed embodiment, the channel tuning bar 150 is initialized or configured for display in one of three ways: (1) when the GUI code is first executed within the PC 128, (2) when the system receives a Main Program Guide (MPG) update message, or (3) when a user changes program guide display options (e.g., by changing one or more parameters within the electronic program guide configuration header 318 shown in FIG. 12). The MPG contains the information needed to construct the electronic program guide 310 (shown in FIG. 12), and is stored in the local memory of the PC 128. In addition, the PC 128 receives, via the transmitted data stream, messages that instruct the GUI software to update the locally stored MPG using information parsed from the transmitted data stream.

Figure 17:
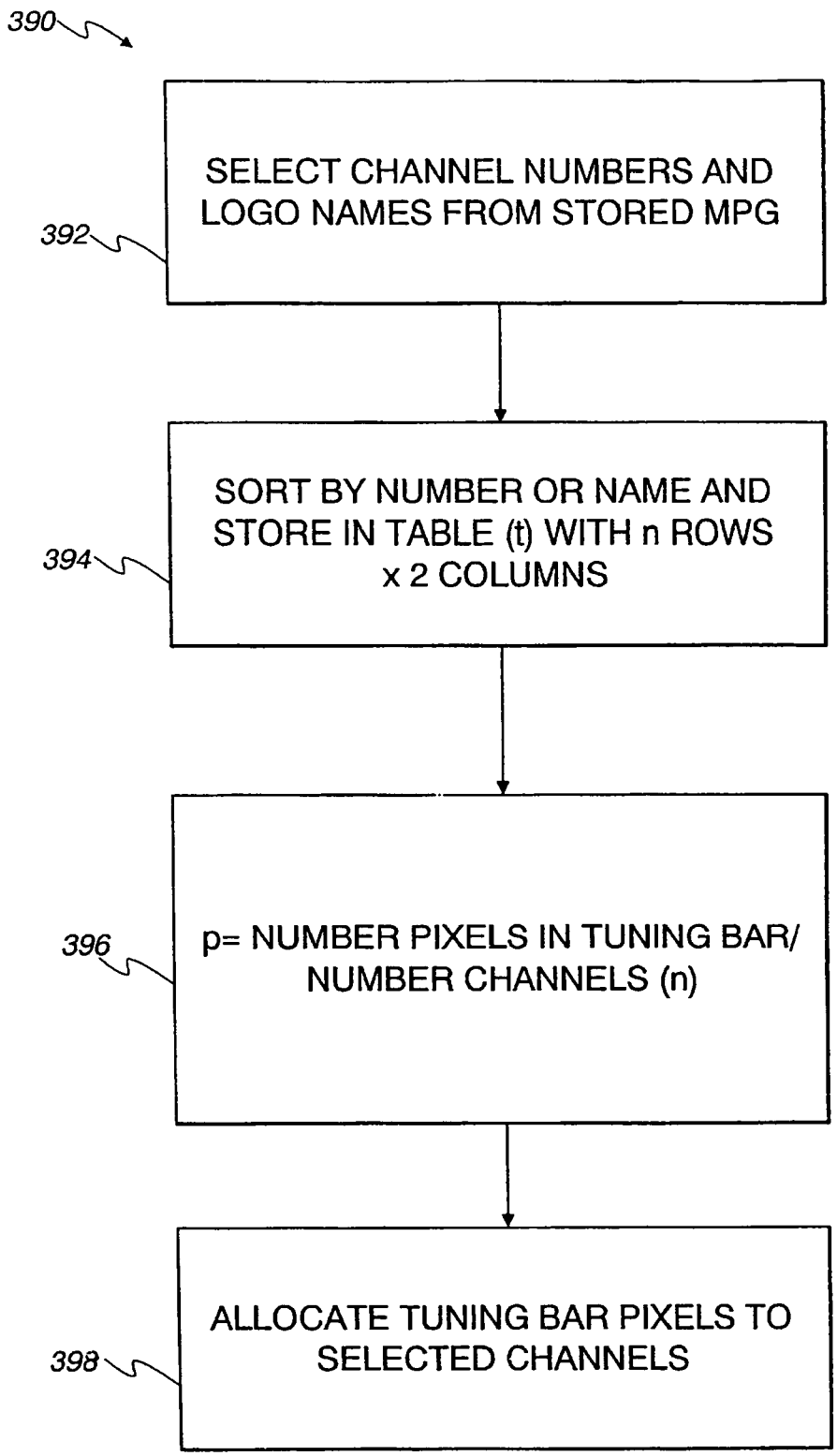
FIG. 17 is a flow diagram representing system initialization of the tuning bar in accordance with the present invention.

An initialization or configuration of the channel tuning bar 150 follows a procedure 390 illustrated in FIG. 17. In a first block 392, the system selects, from a copy of the MPG stored in memory, a list of the channel numbers and logo names that the user is entitled to view. In a second block 394, the selected channel numbers (n=number of selected channels) and their associated names are sorted either by number or name and are stored into the system's memory as a data structure or channel/services table comprising (n) rows and two columns. In a third block 396, the total number of pixels available to display the channel tuning bar 150 is divided by the number of selected channels (n) to determine how many display pixels may be allocated to each of the user's available channels. In a fourth block 398, the total length of the channel tuning bar 150 may then be divided between the number of available services or other functions. In certain embodiments, the allocations to each channel or function are equal. In others, however, it may be desirable to allocate a broader increment or region of the channel tuning bar 150 to certain channels, services, or other functions. This would have the effect of making these services more prominent, and easier to tune (e.g. requiring less precision in placement of the slider 372).

The displayed position of the slider 372 is tracked by the display generating software and compared to the calculated display pixel locations or increments for each channel, service, or action. The location or increment corresponding to each channel may then be correlated or mapped to tuning information. For example, a matrix or lookup table may correlate/map tuning bar display positions to corresponding information about that channel, which is required for display or tuning purposes. In other embodiments, pointers may include a data structure that correlate/map tuning bar increments so that the pointers point to tuning or other program guide information that correspond to the particular channel associated with the display position of the slider 372.

The channel tuning bar 150 is preferably implemented as an ActiveX™ control. Because the computer code used by the PC 128 employs an object oriented encapsulation design, the channel tuning bar 150 may be easily incorporated within, and interact with, a wide variety of page displays. In addition, computer code implementing the tuning bar functionality is modular and may easily interact with any page within the present GUI because the various page displays do not have to assimilate the exact computer code implementation contained within the encapsulated tuning bar object.

Figure 18:
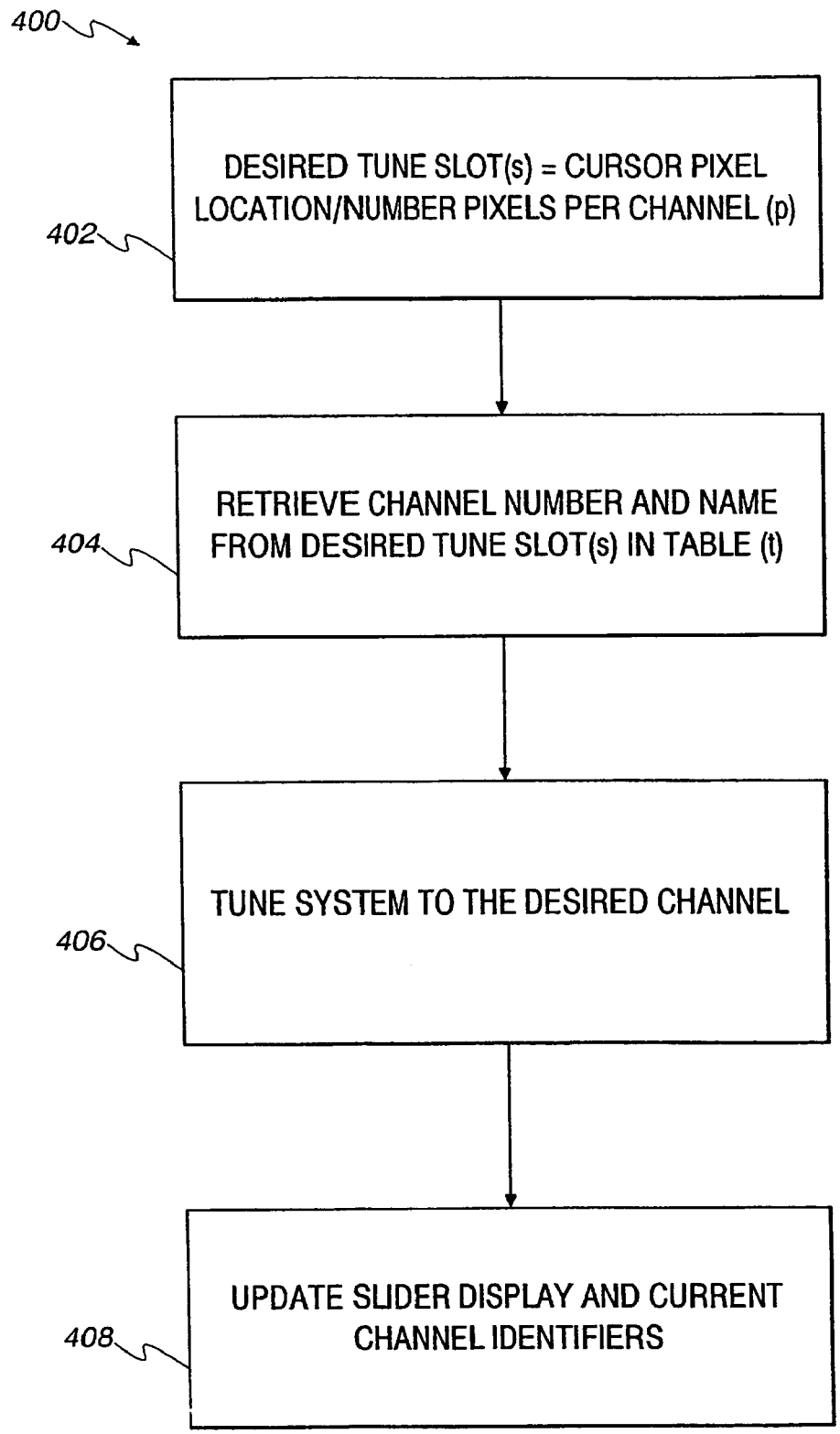
FIG. 18 is a flow diagram representing system processing of a "click" event in accordance with the present invention.

The computer code that generates the channel tuning bar 150 is responsive to several types of inputs that allow a user to change the displayed channel or service. One type of input allows a user to move the cursor graphic over a particular portion of the channel tuning bar 150 and then "click" on that portion to display the channel or service associated with that portion of the channel tuning bar 150. The system processes a "click" event by following a procedure 400 that is illustrated in FIG. 18. In a first block 402 the desired tune slot or row in the channel/services table is found by dividing the cursor's current pixel location by the total number of pixels allocated to each channel or service. In a second block 404 the channel number and name are retrieved from the calculated row or time slot in the channel/services table. In a third block 406, the tuning bar code requests the system to tune to the retrieved channel number. in a fourth block 408, the displayed position of the slider 372 is updated to correspond to the newly selected channel, and the associated channel number and name are displayed adjacent to the channel tuning bar 150.

As described above, holding the cursor over any portion of the channel tuning bar 150 produces a pop-up window containing the channel number and call-sign associated with that location. Thus, a user's selection of a channel can be greatly facilitated by these "rollover" events.

Figure 19:
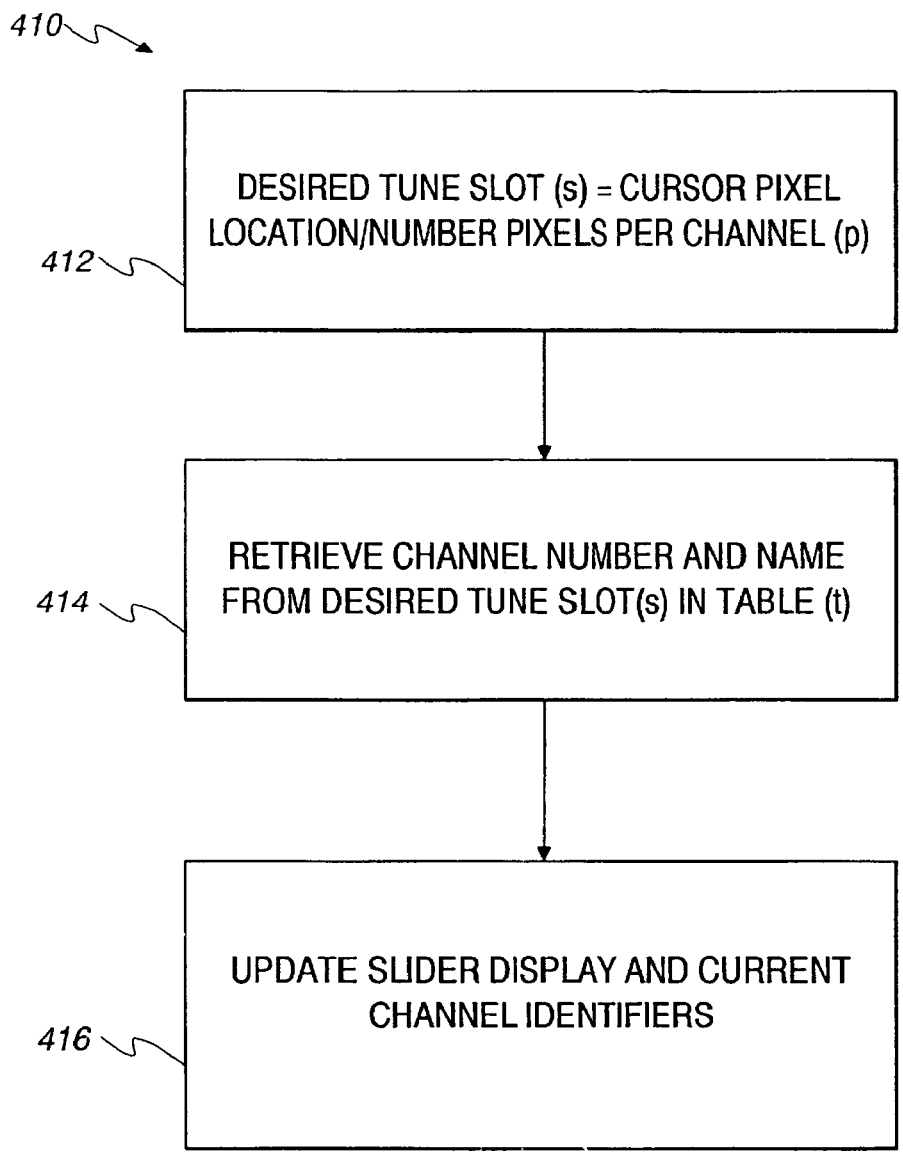
FIG. 19 is a flow diagram representing system processing of a "rollover" event in accordance with the present invention.

The system processes a "drag" event using a procedure 410 that is illustrated in FIG. 19. In a first block 412, the tune slot or row in the channel/services table is calculated by dividing the cursor's current pixel location by the number of pixels allocated to each channel or service. In a second block 414, the system retrieves the channel number and the associated name from the calculated row. In a third block 416, the slider position is updated and the channel identifiers are displayed adjacent to the corresponding location along the channel tuning bar 150. As a user moves the cursor along the channel tuning bar 150, a rapid succession of "rollover" events will be executed to produce an apparently seamless display of changing channel numbers and associated names that uniquely correspond to the changing position of the cursor.

User's may also change the displayed channel or service by moving the cursor over the slider 372, holding the primary mouse button and dragging the slider 372 to a desired location along the channel tuning bar 150. A user may "pick up" the slider 372 with the systems's mouse and move it along the channel tuning bar 150. As the slider 372 is dragged along the channel tuning bar 150, a rapid series of "drag" events are invoked within the system that are similar to the "rollover" events described above. Channels and their associated names are selected from the channel/services table based on the pixel location of the system's cursor. The slider 372 position is updated to correspond to the channel location along the tuning bar selected by the cursor. However, when the user releases the primary mouse button following a "drag" event, a "click" event is invoked to change the displayed channel/service and to update the slider position, the displayed channel number, and the displayed channel name or call-sign.

Alternatively, users may invoke a change in the displayed channel/service by entering numeric, alpha, or alphanumeric information via the system's keyboard. The system processes a displayed channel/service change received through the system's keyboard by first searching the channel/services table for a matching channel number or name. If a matching channel is found, the system initiates the logical equivalent of a "click" event (as described above and illustrated in FIG. 18) to complete the user requested change.

The channel tuning bar 150 is primarily directed to accommodating video and/or audio programming which is available on selectable channels of a DTH or similar system. However, it is also possible to allocate portions of the channel tuning bar 150 to other services or functions which can be launched from the tuning bar 150. For example, positions of the channel tuning bar 150 may be correlated to locally cached information. The matrix or other correlating data would then point to or otherwise select, for example, a subroutine for performing a local function, rather than accessing program guide/schedule information to initiate tuning. Portions of the channel tuning bar 150 may be reserved for linking the user to other functions of the system, such as other menu pages, for example, BOW, data services, etc. Links of this type could be grouped, for example, in a data services portion 377 of the tuning bar 150.

The channel tuning bar 150 may also be coded to intuitively convey selection information to the user. For example, several colors may be used to visually distinguish sections of the tuning bar that correspond to particular selection categories 373, 375, 377. If the lower portion of the bar is used for linking to alternative menus or functions, that portion of the bar may be shaded or colored in a distinct manner. Similarly, a user's favorite channels or other selected groupings of channels may be distinctly colored or shaded to facilitate their selection from along the length of the tuning bar. Selected channels along the tuning bar may be distinguished with lines 381, adjoining indicia 379, or some other indication in or adjoining the channel tuning bar 150. By way of example, the last three, five, or other number of previously tuned channels may be marked to facilitate returning to them. In other embodiments, a "favorites" list, maintained elsewhere in the system, may be used to highlight or otherwise emphasize those locations corresponding to the selected favorite channels of a particular user. It will be understood by those skilled in this art that many alternative presentations and embodiments are similarly possible without departing from the scope or spirit of the present invention.

Although a single channel tuning bar 150 is shown, it is understood that multiple tuning bars may alternatively be utilized. This may be particularly helpful where a large number of channels are present, which would otherwise cause the increment corresponding to each individual channel to be undesirably small and require excessive precision in positioning the slider 372. Although the channel tuning bar 150 is illustrated in a vertical position, it should be understood that other positions, or combinations of positions, are similarly possible. The channel tuning bar 150 may be straight, curved, or some combination thereof.

To further facilitate tuning in a high capacity system (i.e. many available channels and services) it may be desirable to provide a resolution function or acceleration function that adjustably varies the rate at which the slider 372 moves along the channel tuning bar 150. For example, large user movements of the slider 372 relative to the channel tuning bar 150 may cause a rapid movement through available channels. However, when the user pauses at a particular location, the system may switch to a second resolution that effectively decreases the position sensitivity of the slider 372 so that the user may more easily select a particular channel within a few channels of the position paused in. For example, the GUI may actively rescale the pixel allocations in the channel/services table so that the number of pixels allocated to channels immediately surrounding the cursor position is increased and the number of pixels allocated to channels that are not proximate to the cursor position are associated with relatively fewer pixels.

Those skilled in the art can immediately appreciate that video channel tuning using the channel tuning bar 150 described above will be highly intuitive and quick because users tend to make viewing selections based on memorized channel numbers and call-signs. Furthermore, users can directly select the desired channel for viewing without having to pass sequentially through all available channels, or having to key in a multi-digit channel number.

b. Pop-Up Remote Control

Figure 20:
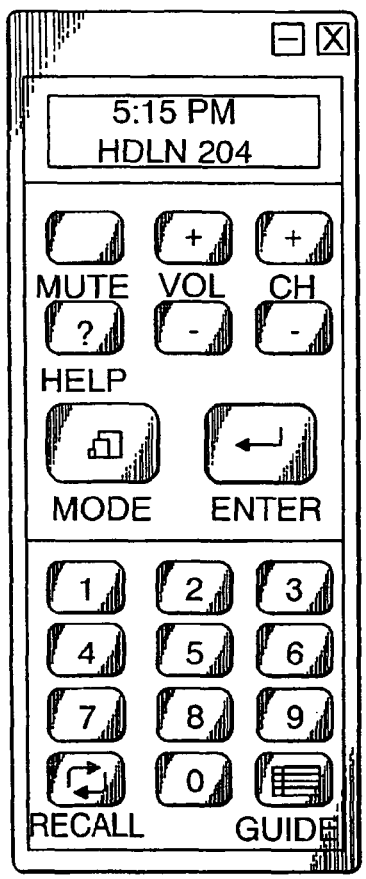
FIG. 20 is an enlarged view showing one variation of the pop-up remote control graphic overlay of the present invention.
Figure 21:
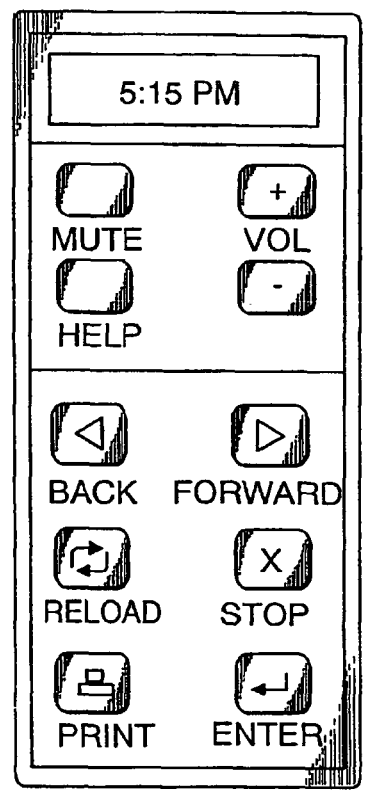
FIG. 21 is an enlarged view showing another variation of the pop-up remote control graphic overlay.

Another important aspect of the present invention is the pop-up remote control link 166, which can be selected by the user from several of the GUI pages to invoke the display of a graphic overlay that simulates a hand-held remote control unit. Illustrated in FIGS. 20 and 21 are two possible configurations for the pop-up remote. Other configurations are possible, and may be predefined so that the pop-up remote closely matches the appearance, button layouts and button functions of a particular type of remote control with which the user is familiar. For example, if the user has an RCA® television, a pop-up remote graphic that replicates the RCA® remote may be specified. Although the GUI of the present invention typically accepts user inputs from a PC system's keyboard or mouse, many users may be more comfortable with, and may find it more intuitive to use, the keyboard or the mouse to manipulate a simulated remote control to navigate through the pages of the GUI.

The functionality, configuration, and button layout of the pop-up remote may vary according to the service page that launched the pop-up remote control. This context sensitive combination of pop-up remote appearance and associated functionality may be accomplished in a variety of ways. For example, the system may associate a plurality of graphic files and function subroutines using a simple data structure (e.g., a lookup table, a matrix or pointers). Typically, the user is presented with a pop-up remote graphic having a plurality of buttons that initiate functions that are consistent with, or complementary to, the content of the current service page displayed. When the user launches into a page, pop-up remote graphic files and function subroutines associated with that particular page are used to build both the graphic display of the pop-up remote and to provide the functionality underlying the displayed configuration. When the user selects a location associated with a particular button, the system may, for example, associate the button's position on the screen with a particular block of executable code (e.g., a subroutine) and execute that code.

For example, the pop-up remote shown in FIG. 20 may be associated exclusively with video channel service pages, and the pop-up remote shown in FIG. 21 may be associated exclusively with BOW broadcast service pages. Thus, the pop-up remote may be customized to provide functions complementary to the service page that launched it. The pop-up remote's functions for the BOW service pages preferably include those commands that are required for webpage navigation forward/back a page, page load/stop load, page printing, and help. The remote's functions for the Software Downloads service pages preferably include commands for screen printing and help.

Screen locations in the GUI corresponding to the selectable buttons of the remote are correlated to executable routines. The corresponding routines, when executed, perform the associated control function on the related hardware (e.g., video card, satellite IRD card), such as causing the channel selection to increment up when a "change ^" arrow is selected. The correlations between control routines and screen locations may be contained in a selectable or predefined template file, and the remote graphic may be contained in a selectable or predefined graphic file.

A plurality of graphic files and associated template files may then be provided, wherein each graphic corresponds to a different configuration of remote control device that preferably correspond to the actual appearance/configuration of the remote utilized by one of many manufacturers. Typically, the user will be presented with a remote configuration/appearance that corresponds to one that they are familiar with (e.g., a remote which corresponds to their other equipment such as a television, or VCR).

C. Receiver Station Generally

As noted above, the GUI of the present invention is preferably implemented within a DTH PC-based satellite communication system 100 such as that depicted generally in FIG. 1. Discussed in more detail below is a preferred system and method for executing the GUI software of the present invention. In particular, a preferred receiver station 106 architecture is disclosed. In addition, preferred data transmission methods that facilitate the GUI's ability to receive and manage the large amount and variety of digital information that is broadcast within the DTH system 100 are disclosed.

Figure 22:
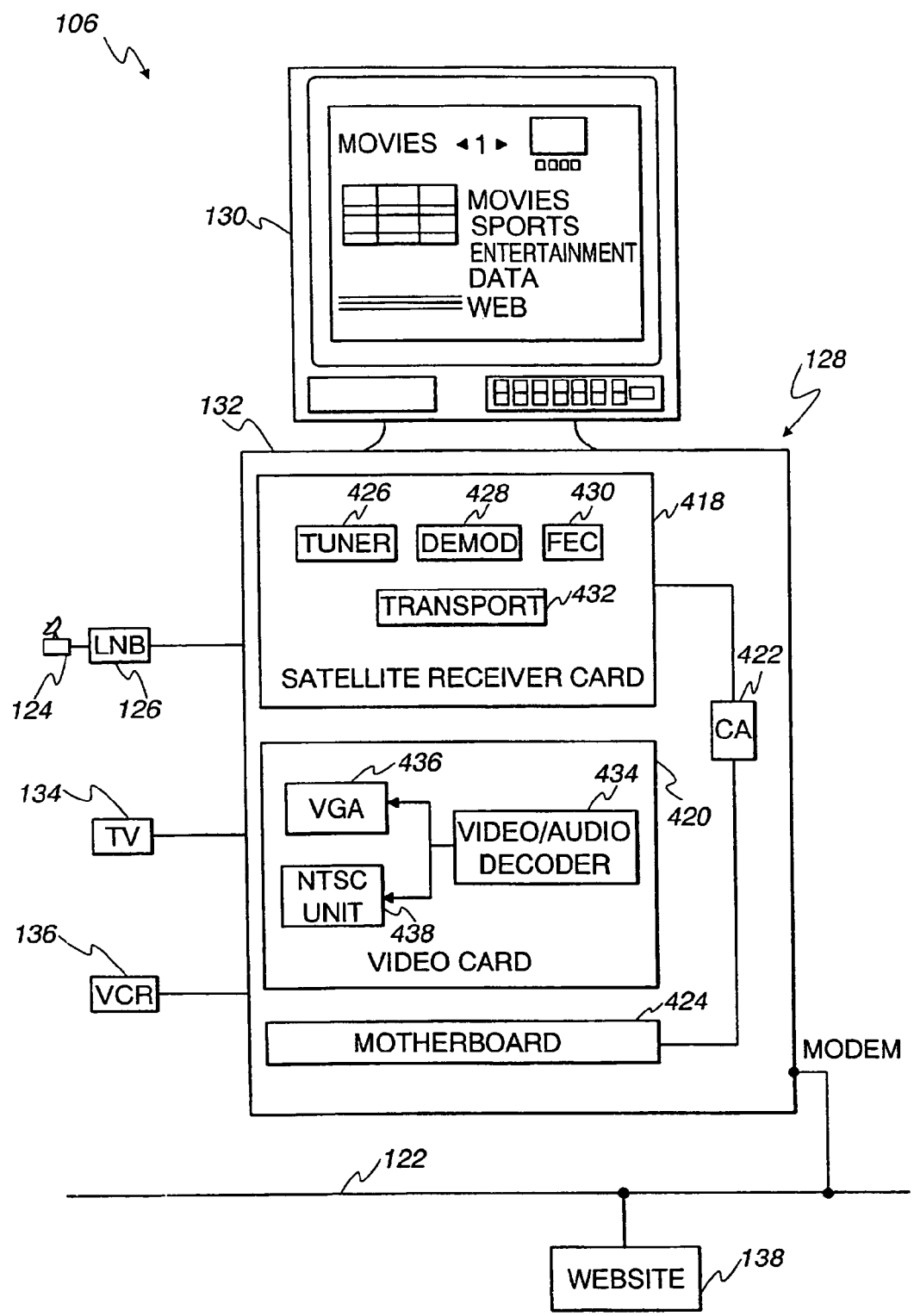
FIG. 22 is a diagram of selected hardware processing components of the receiver station shown in FIG. 1.

FIG. 22 is a detailed illustration of a preferred implementation of the receiver station 106 shown in FIG. 1. As shown, the receiver station 106 includes the reception antenna 124, the LNB 126, and the PC 128. The PC 128 includes the monitor 130 and the computing unit 132, which may have a modem connection via the PSTN to the network 122. The computing unit 132 includes, inter alia, a satellite receiver card 418, a video/audio decoder card 420, which may be integrated with the receiver card 418, a conditional access card 422, a mass memory such as a hard disk (not shown), and processing/control capabilities such as a PC motherboard 424. The satellite receiver card 418 includes a tuner 426, a demodulator 428, a forward error correction (FEC) decoder 430, and a transport functional processing block 432. The video/audio decoder card 420 includes a video/audio decoder 434, an optional NTSC and/or ATSC output driver 438, and a VGA output driver 436. The satellite receiver card 418 and video/audio circuits (e.g., video/audio decoder card 420) perform the functions of receiving and decoding the signal received from the LNB 126. The incoming signal is received by a satellite receiver card 418 and passed through a series of initial processing operations including the tuner 426, the demodulator 428, and the forward error correction decoder 430, before passing to the actual transport functional processing block 432. Although the functional circuits within the transport functional processing block 432 are not illustrated, they are identical to the channel demultiplexing, decryption, and access determination circuit blocks of a standard transport decoder. For example, the transport functional processing block 432 receives the transport stream or bitstream of digitized data packets containing video, audio, scheduling information, and other data. The digital packet information contains identifying headers as part of its overhead data. Under control of the PC's main processor/controller (typically located on the PC motherboard 424), the transport functional processing block 432 filters out received data packets that are not currently of interest. Received data packets that are of interest are routed through decryption and access control operations within the conditional access card 422. Access control may be provided by any known means. For example, access control may be achieved by requiring a data packet to have a proper authorization code in order to be passed to the video/audio decoder card 420.

The transport functional processing block 432 passes the data to the video/audio decoder 434 of the video/audio decoder card 420. The authorized data of interest are stored in system RAM (not shown) for buffering, and the video/audio decoder 434 retrieves the data from RAM as needed.

The allocation of memory and control functions may be arbitrarily divided between the PC system's function cards (e.g., the satellite receiver card 418, the video/audio decoder card 420, etc.). Thus, a substantial amount, or possibly all, of the control and memory functions for operation of the present invention may be integrated within a single card, or alternatively, may be incorporated within the PC motherboard 424. When needed, the data is routed to the video/audio decoder 434, which includes display circuitry. For video data, the video/audio decoder 434 reads in the compressed video data from its RAM, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the video decoder's RAM. At a later time, the image is read out of the frame buffer and passed through the display circuitry to the VGA output driver 436 and optionally, to the NTSC and/or ATSC output driver 438. The display circuitry also generates the graphics that allow text such as the GUI electronic program guide data to be displayed.

D. Receiver Station Architecture

Figure 23:
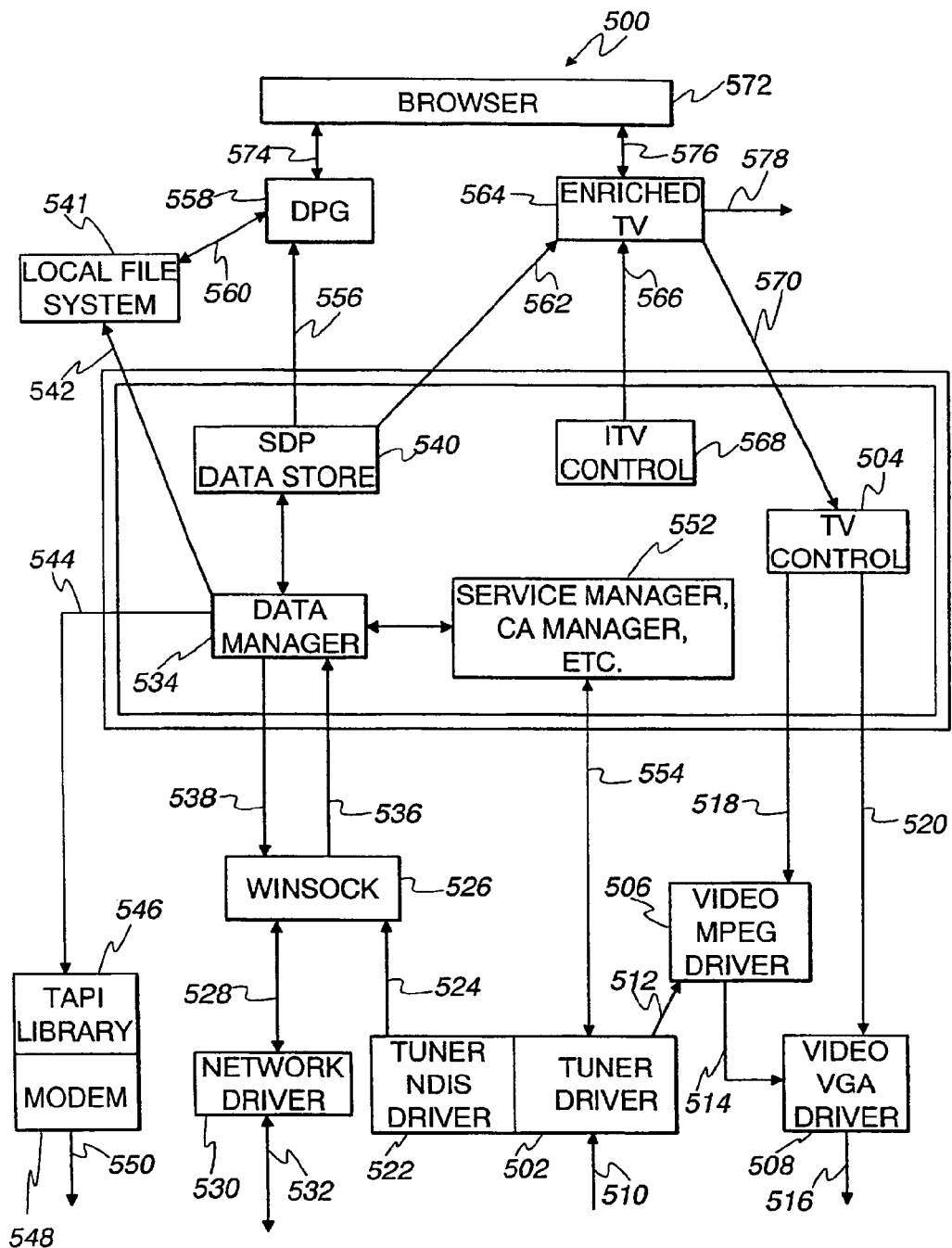
FIG. 23 is a block diagram illustrating one possible system architecture within which aspects of the present invention may be used.

Illustrated in FIG. 23 is a system architecture block diagram 500 depicting, by way of example only, a preferred organization of the PC's computing unit hardware and software which may implement aspects of the present invention. A tuner driver 502, a TV control block 504, a video MPEG driver 506, and a video VGA driver 508 provide the major functions of a conventional integrated receiver decoder (IRD). The tuner driver 502 receives a digital signal modulated on an RF carrier (e.g., a digital satellite downlink signal) on line 510, and performs known IRD functions to parse out and selectively control the flow of conditional access, video/audio, and MPT data streams. The tuner driver 502 passes selected video/audio data packets to the video MPEG driver 506 on line 512. The MPEG driver 506 controls the MPEG decoding hardware, synchronizes video and audio data, and manages the buffering of video and audio data to be displayed. The MPEG driver 506 passes decoded video information to the video VGA driver 508 via line 516. The VGA driver 508 processes the decoded video information 514 and provides a display signal that may be, for example, a standard RGB output on line 516. The TV control block 504 controls the size and location of the video window via an MPEG decode control signal on line 518 and a VGA window display control signal on line 520 that are passed to the video MPEG driver 506 and the video VGA driver 508 respectively.

With respect to file data, the tuner driver 502 passes file data (e.g., websites, software, etc.) as MPT data packets to a tuner NDIS driver 522. The NDIS driver 522 strips the MPT header and passes standard IP data packets 524 using Microsoft® NDIS protocol to a standard Windows® Winsock® interface 526. File data 528 may alternatively be passed to the Winsock® interface 526 as IP data packets via a network driver 530 that exchanges information with a network connection 532 that may, for example, be an Ethernet, ISDN, or POTS connection.

A data manager 534 functions as a data distributor or data hub. The data manager 534 receives and interprets file data from line 536. The data manager 534 further provides an optional HTTP proxy service via line 538, uses an SDP+ data store 540, and schedules data-related tuning requirements. The data manager 534 may store data files (e.g., HTML, GIF, etc.) on a local file system 541 (e.g., a hard disk) via a fifth data path 542.

The data manager 534 may use a TAPI library block 546 to communicate via a telephony application programming interface (TAPI) via line 544. The TAPI library block 546 is in direct communication with a modem 548 having a POTS phone line connection 550. In this way, the data manager 534 can report to a service provider which advertisements a particular user has viewed or selected (i.e., advertisement tracking). In addition, the data manager 534 communicates with a service/CA manager 552, which sets tuning priorities/controls, manages conditional access messages, and resolves messages relating to program tuning information that are exchanged via a third data path 554 to/from the tuner driver block 502.

The SDP+ data store 540 is a database that contains all the current SDP+ record information. The SDP+ data store 540 passes DPG data store queries for data item description and display formatting information to a data program guide block 558 on line 556. The data program guide block 558 contains the dynamic HTML pages, including graphic content, that is currently being broadcast by the satellite communication system 100. The data program guide block 558 may retrieve files from the local file system 541 via a fourth data path 560. The SDP+ data store 540 may also pass enriched TV data store queries 562 to an enriched TV function 564 that serves to map a channel to an IP address and a port. The enriched TV function 564 may further receive tuning control information, via line 566, from a tuning control interface 504 and may, accordingly, pass screen formatting information to the TV control block 504 on line 570. The enriched TV function 564 and the data program guide block 558 may exchange information with a browser application 572 along a first data path 574 and a second data path 576, respectively.

As described in section IV.B.3.b. of this disclosure, a user may interact with the GUI to schedule the download of file data. The GUI utilizes SDP+ records to perform this task. The SDP+ records are stored in the SDP+ data store 540. At the scheduled time of reception, the data manager 534, which holds schedule information, examines the records in the SDP+ data store 540 to determine the multicast IP address on which the download will be broadcast. After the data manager 534 has determined the multicast IP address, the service manager 552 looks to the BARP table, which may be stored on the local file system 541, to determine tuning information for the multicast IP address found in the SDP+ record. For example, a broadcast of Quicken '98™ software may be broadcast on multicast IP address 1.2.3.4 and that multicast IP address may correspond to tuning information indicating transponder two SCID five, according to the BARP table. Once the tuning information is determined, it is passed to the service/CA manager 552, which tunes the tuner driver 502 to, for example, transponder two, SCID five.

File information received by the tuner 502 is passed to the tuner NDIS driver 522, where it is converted into IP data and passed to the Winsock® 526, via line 524. The Winsock®, in turn, passes the IP data to the data manager 534, which performs the BFDP function on the IP data to recover the data for Quicken '98™. The data associated with Quicken '98™ is stored on the local file system 541 for later use. Any data determined by BFDP to be missing from the received Quicken '98™ file will be obtained on subsequent broadcasts of the file. When the complete file has been stored on the local file system 541, Quicken '98™ is complete and ready to run.

E. Data Packets

Figure 24:
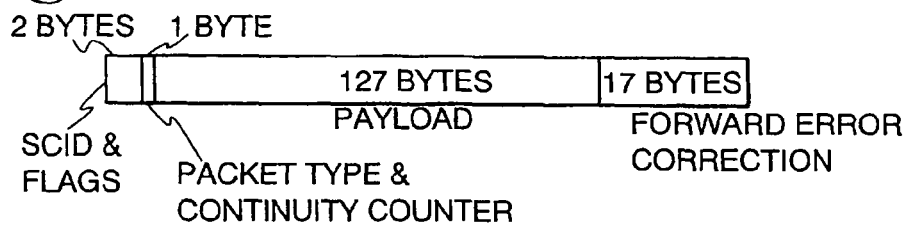
FIG. 24 is a diagram illustrating a type of transport data packet that may be transmitted via the system shown in FIGS. 1 and 2.

FIG. 24 is a diagram illustrating a preferred type of transport data packet that may be transmitted via the system 100 shown in FIG. 1 and processed by the receiver station 106 shown in FIGS. 22 and 23. More specifically, the data packet may be coupled to the receiver station shown in FIG. 23 via line 510. The preferred data packet shown in FIG. 24 is in the format and of the type used in the DirecTV® digital broadcast system. As shown, each data packet may be, for example, 147 bytes long. The first two bytes (a byte is made up of 8 bits) of information contain the SCID and flags. As previously stated, the SCID (service channel ID) is a unique 12-bit number that uniquely identifies the packet's service channel. The flags are made up of four bits used primarily to control whether or not the packet is encrypted and, if encrypted, which key to use to decrypt the packet. The third byte of information is made up of a four-bit packet type indicator and a four-bit continuity counter. The next 127 bytes of information consists of the "payload" data, which is the actual usable information sent from the program provider. The payload can be any of the various types of data sent over the airline, including video, audio, conventional program guide data, data related to the layout/format/content of the user interface display pages of the present invention, conditional access data, webcasting data, software download data, etc.

F. Audio/Video Processing

The architecture shown in FIG. 23 may be used to receive audio and video signals associated with television programming. When a user desires to watch television programming, the service/CA manager 552 tunes the tuner driver 502 to the appropriate transponder and SCID or SCIDs to receive the appropriate programming signals. The received signals are passed to the MPEG video driver 506 via line 512. The MPEG video driver 506 appropriately processes the received signals to obtain audio and video signals that are passed to the video VGA driver 508, which, in turn, passes the signals to a monitor for display.

G. Data Processing

1. Protocol Stack/Broadcast File Download Protocol (BFDP)

As discussed in section IV.A. of this disclosure, the GUI of the present invention requires the presence of appropriate data at the receiver station 106. Although a variety of data processing techniques could be used in conjunction with the GUI of the present invention, BFDP, BARP, and SDP+ are exemplary of preferred data processing methods. Respectively, these methods provide a way of reliably transferring file data in a one-way communication channel, resolving IP addresses into physical addresses, and announcing to the receiver station 106 how to display available data streams for selection, and when and how to tune to data streams selected by the user.

Figure 25:
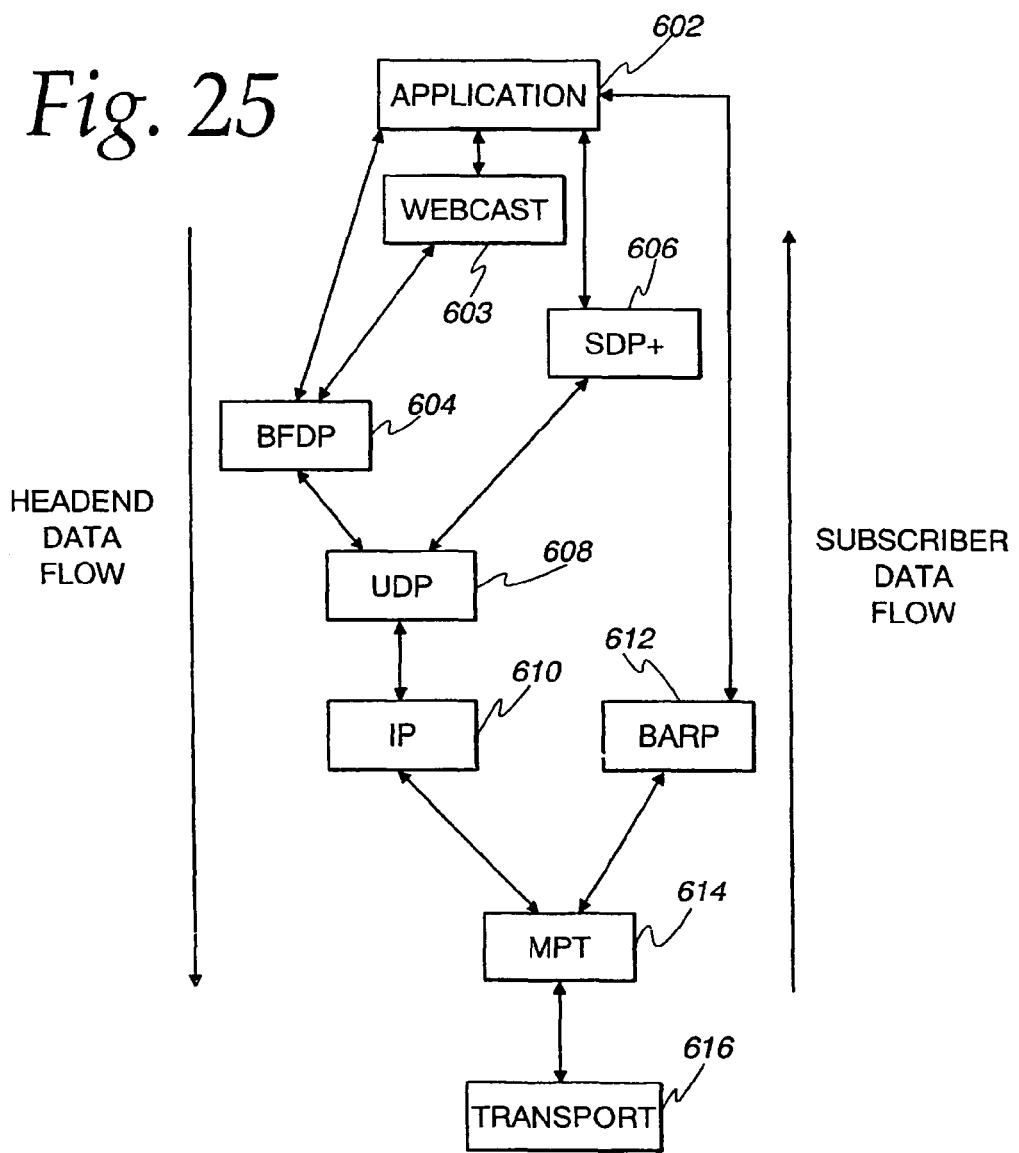
FIG. 25 is a block diagram illustrating a preferred data flow through a protocol stack for use with the present invention.

Illustrated in FIG. 25, is a preferred data flow through a protocol stack that utilizes the BFDP, BARP, and SDP+ data processing methods. The transmission station 102 (or "headend") builds transport data packets for transmission in accordance with the headend data flow arrow. There are four primary data flow paths through the protocol stack at the transmission station 102. File data begins at an application layer 602 and is passed down through a BFDP layer 604, a UDP layer 608, an IP layer 610, and is encapsulated for transmission to the receiver station 106 by an MPT layer 614 and a transport layer 616. Webcast data begins at the application layer 602 and is passed down through a webcast layer 603, the BFDP layer 604, the UDP layer 608, the IP layer 610, the MPT layer 614, and the transport layer 616. SDP+ records begin at the application layer 602 and are passed down through an SDP+ layer 606, the UDP layer 608, the IP layer 610, the MPT layer 614 and the transport layer 616. BARP information begins at the application layer 602 and is passed down through a BARP layer 612, the MPT layer 614 and the transport layer 616. Transport packets received at the receiver station 106 (or "subscriber") are resolved into BARP information, SDP+ records, webcast information, and file data by passing the received packets up through the protocol stack in the direction indicated by the subscriber data flow arrow.

Figure 26:
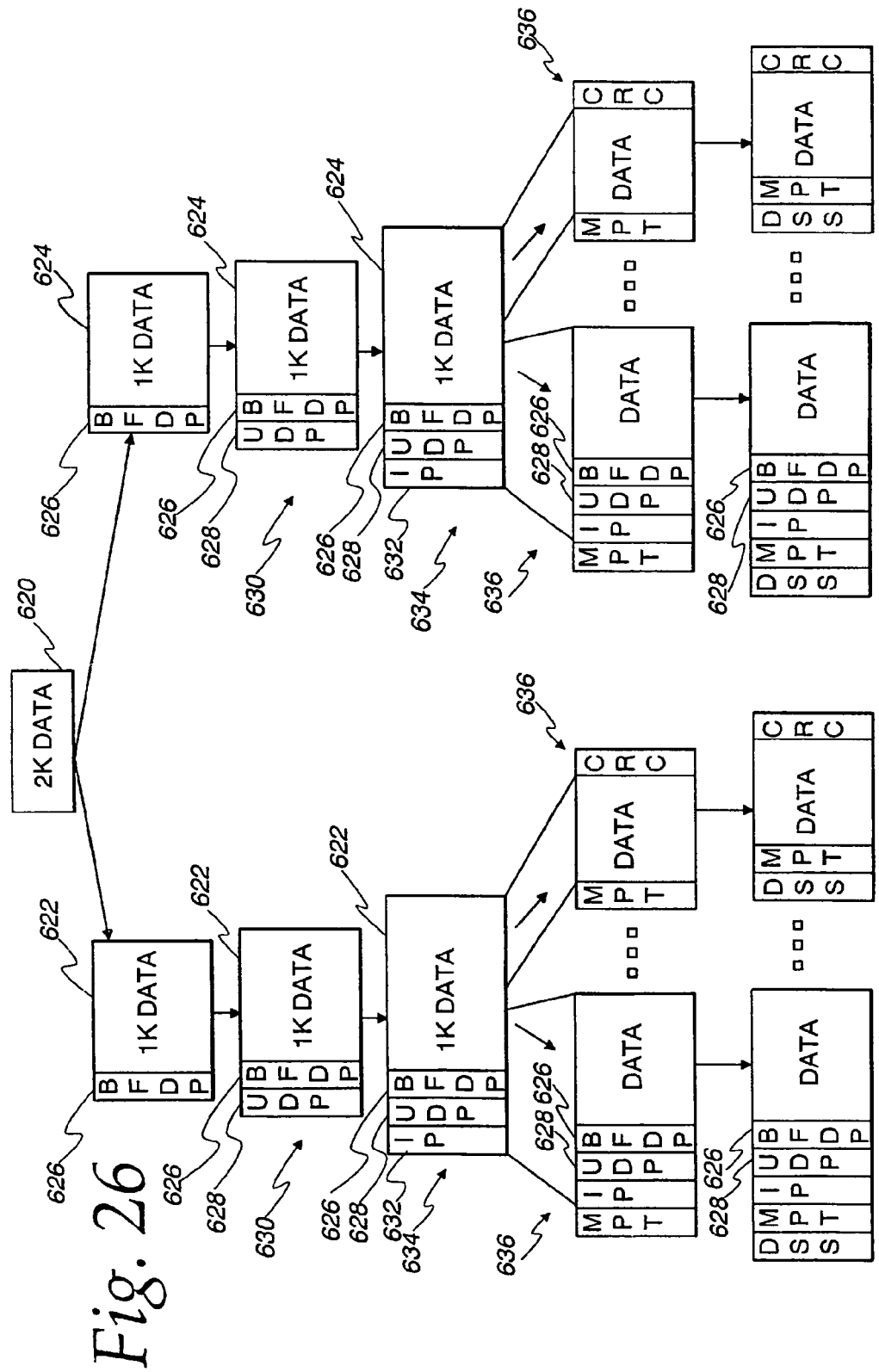
FIG. 26 is a block diagram illustrating a preferred method of processing a data packet for use with the above-referenced protocol stack.

Illustrated in FIG. 26 is an exemplary method of processing a data packet using the protocol stack shown in FIG. 25. FIGS. 25 and 26 are described is more detail below in connection with in-depth discussions regarding the BFDP, BARP, and SDP+ data processing methods.

As discussed earlier in section IV.B. of this disclosure, the GUI of the present invention facilitates the organization, selection, and display of audio/video information, file data (e.g., software, websites, etc.), and streaming data (e.g., data tickers). For example, the Software Downloads data service 240 (shown in FIG. 8) allows a user to schedule automatic downloads of software titles to the PC 128, and the BOW data service 200 (shown in FIG. 4) allows a user to select websites for periodic/regular downloading to the PC 128.

Downloading file data is especially difficult within the DTH system 100 (shown in FIG. 1) because the DTH system 100 does not provide a backchannel communication path from the receiver station 106 to the transmission station 102 (i.e., the communication path is a one-way path to the receiver station 106). The absence of a backchannel makes it impossible for the receiver station 106 to acknowledge to the transmission station 102 that a software file was completely received and error free. Additionally, the absence of a backchannel prevents the receiver station 106 from requesting rebroadcast of missing data from the transmission station 102. Although the communication channel associated with the DTH system 100 has a very low bit error rate, relatively long periods of signal interruption may occur. For example, snow or rain, either at the transmission station 102 or the receiver station 106 may cause the communication channels of the system 100 to fade, thereby causing received signal errors. Additionally, user activity, such as receiver station tuning or deactivation, may cause signal interruptions. If signal interruptions occur during the download of file data, the file data will be incomplete and inoperable.

One preferred method of addressing the difficulty associated with transmitting file data along a one-way communication path, such as that used by the GUI of the present invention, uses data carousels at the transmission station 102 that repeatedly broadcast the same file data to the receiver station 106 in conjunction with a data transfer protocol such as, for example, the broadcast file download protocol, which is described in greater detail herein. The Broadcast File Download Protocol (BFDP) prepends a header to the file before transmission of the data packets. This header allows a download file to be reassembled from information received during one or more broadcasts of the same download file. Thus, if some file data is lost or corrupted during a first broadcast of the download file, BFDP allows the receiver station 106 to "fill in" any missing or corrupted file data with file data received during a subsequent broadcast of the same download file, thereby avoiding the constraint of having to receive an entire file without corruption/interruption during a single broadcast.

The details of BFDP will now be explained with reference to FIGS. 25 and 26. If a file (e.g., a website, a software file, etc.) is to be broadcast from the transmission station 102 to the receiver station 106, data from the application layer 602, such as webcast, is passed to the BFDP layer 604. For purposes of explanation of the BFDP, it will be assumed that a data file 620 having 2 kilobytes (2K) of data is to be transmitted. The data file 620 is received by the BFDP layer 604, which if necessary, breaks the data file 620 into smaller data fragments 622 and 624. For purposes of explanation it is assumed that the data file 620 is split into two 1K data fragments 622, 624 and that a BFDP header 626 is pretended to each of the data fragments 622, 624. The size of the fragments is a tradeoff between overhead and the probability of data loss. If low overhead is desired, the size of the data packet will be large with respect to the BFDP header on the data. However, if the probability of data loss is high, the size of the data packets should be made small to minimize the data lost if a single packet is lost. Typically, the probability of data loss is determined by channel characteristics. The remainder of the processing for each fragment is identical. A sample format for the BFDP header 626 is shown in FIG. 27.

The eight fields of the sample BFDP header 626 provide information concerning the number and order of the data fragments 622, 624 that are broadcast to make up the data file 620. Each field in the sample BFDP header 626 is represented by four bytes, except for filename, which is represented by sixty-four bytes. The Sync. field contains information that may be used to assist in identifying the header. An ID field is a representation of the object ID for the file being broadcast. The object ID may be used for data filtering at the receiver station 106. The Version field indicates the version of the BFDP used to create the present packet. Filename is sixty-four bytes of information used to indicate the filename and path where the data fragment is to be stored on the receiver station 106 (e.g., C:\downloads\xyz). Preferably, the filename field is used only for special files and is not generally used. For example, when webcast information is transferred, a HTTP header is used and the filename field is ignored. The Modified field denotes the last time the fragment was modified. Preferably, this representation is in UNIX time_t format. Count, Number, and Size fields refer to the number of fragments used to make up the original file data that is broadcast, the number of this fragment, and the size of this fragment, respectively. The count, number, and size fields are key pieces of information that allow BFDP to reconstruct a complete data file from multiple broadcasts of the data file. For example, a data file may be broken into 10 fragments and, during transmission, fragments 1-5 and 8-10 were received by the receiver station 106. On subsequent broadcasts of the data file, the receiver station 106 examines all of the BFDP headers on the received fragments and only stores the data packets indicated as fragments 6 and 7 in their BFDP headers, thereby filling in the received data file.

As shown in FIGS. 25 and 26, after the processing is complete at the BFDP layer 604, the resulting data packet is transferred to a UDP layer 608, which prepends a UDP header 628 to the packet. The UDP header 628, which is standard and well known in the art, is shown in FIG. 28. The UPD header 628 includes fields that denote source and destination ports for the data. That is, UDP header fields contain information indicating the application that is providing the data (source port) and the application that is to receive the data (destination port). At this point in the processing, the data packet is referred to as a UDP packet 630.

Data transferred to a computer through a connection is typically in an Internet protocol (IP) format, which is well known to those skilled in the art. Accordingly, the UDP packet 630 is passed to the IP layer 610, which in a well known manner, prepends an IP header 632 onto the UDP packet 630, thereby creating an IP packet 634. The IP header 632, which is shown in FIG. 29 denotes, inter alia, the IP addresses of the data source and destination computers. Information that is broadcast to a number of users preferably uses a multicast IP address. Alternatively, information may be addressed to specific users via a standard IP address.

After the UDP packet 630 has been properly processed by the IP layer 610 to create the IP packet 634, the IP packet 634 is passed to an MPT layer 614. The MPT layer 614 processes the IP packet 634 to create an appropriate number of MPT packets 636. For example, in digital video broadcasts (DVB) the size of the MPT packets may be 185 bytes. Alternatively, the MPT packets may be 127 bytes long for other direct to home (DTH) applications. For use in the present system 20, each the MPT packets 636 is 127 bytes long including a header and data. The MPT layer uses a number of packet configurations, shown in FIGS. 30A-30D, to create the 127 byte packets. If the IP packet 634 contains 114 bytes or less, only one MPT packet referred to as an "Only Packet" 760 needs to be created. The preferred format of the Only MPT packet 760 is shown in FIG. 30D. The Only packet 760 includes: a six bit flag field that is preferably reserved and set to all zeros, a one bit start of frame (SOF) field that indicates that this packet is the start of the frame, a one bit end of frame (EOF) field that indicates that this packet is the end of the frame. If the IP packet 634 contains 114 bytes or less, only one MPT packet 636 will be sent, therefore the Only packet header indicates that the Only packet 760 is the start of the frame and the end of the frame. The Only packet 760 may also include a field indicating the sub-SCID address of the packet, which preferably includes a two byte type code and a four byte type-dependent code. Preferably, the type code is 0x0100, which signifies that the last four bytes are the multicast group address to which this frame belongs. The Only packet 760 may also include a frame type field, which identifies the type of content in the MPT frame. Preferably, this field is used to indicate whether the frame is an IP frame or a BARP frame. Preferably, the frame type field is filled using Internet Assigned Number Authority (IANA) standard numbers. Further, the Only packet 760 may include a cyclic redundancy check (CRC), which is a 32-bit number computed over the entire MPT frame.

If the IP packet 634 is to be processed by the MPT layer 614 is longer than 114 bytes, Start 730, Middle 740, and End 750 MPT packets shown in FIGS. 30A-30D are preferably used to process the IP packet 634. The headers of these packets use all combinations of the fields described in conjunction with the Only packet 760. As shown in FIG. 26, the first 118 bytes of the IP packet 634 are loaded into the MPT Start packet 730.

The start header of the MPT packet denotes a MPT packet as the start of the frame by setting the SOF bit. If the IP packet 634 is larger than 244 bytes the appropriate number of Middle packets 740 will be filled with 126 byte sections of data from the IP packet 634. The SOF and EOF bits will not be set because the MPT packet is a middle packet. Numerous middle packets will be filled with the IP data until there is less than 122 bytes of data remaining in the IP packet 634. At this point an End packet 750, is filled with the last bytes of information and appended with a CRC. This method of using Only, Start, Middle, and End packets yields MPT packets that are all exactly 127 bytes long.

After each IP packet 634 has been converted to one of the MPT packets 636, each of the MPT packets 636 is passed to the transport layer 616. The transport layer 616 places each 127 byte packet into the 127 byte payload section of a transport data packet (shown in FIG. 24). The complete transport data packet is passed to the uplink frequency converter 118 of FIG. 1 and broadcast to the receiver station 106.

As the receiver station 106, which is tuned to a particular transponder and SCID, receives packets of information, the data packets traverse up through the protocol stack as indicated by the subscriber data flow indicated on FIG. 25. The transport layer removes the payload from each transport packet. After the appropriate processing, the payload is passed to the MPT layer 614, which strips the MPT header from the packet and assembles all relevant data from MPT packets to assemble the IP data frame. The IP layer 610 strips the IP header 632 from the data, performs well-known IP processing functions, and routes the data to the UDP layer 608. The UDP layer 608 strips off the UDP header 628 and routes the remaining information to the proper application (port) as denoted by the UDP header. The BFDP layer 604 strips the BFDP header 626 from the data packets and, using the information in the headers, reassembles the data contained in the BFDP packets into the data file 620 as sent by the transmission station 102. Additionally, if necessary, the receiver station 106 denotes missing data packets through examination of the BFDP headers. Thus, the GUI of the present invention may reassemble the original data file in accordance with the BFDP header fields at the receiver station 106 after multiple broadcasts of the original data file. That is, any missing data after the data is broadcast will be "filled in" with the appropriate data from subsequent broadcasts of the original data file. For example, if a 1 megabyte (MB) file is broadcast and the receiver station 106 successfully acquires all but 1 kilobyte (KB) of the broadcast information, instead of having to reacquire all of the data that the receiver station 106 has already received, the receiver station 106 simply waits for and acquires the 1 KB of data that it needs to complete the 1 MB file.

2. Broadcast Address Resolution Protocol (BARP)

As referenced earlier, the broadcast address resolution protocol (BARP) layer 612 is required to resolve IP addresses into physical (i.e., satellite transport) addresses. The BARP layer is coupled to the MPT layer 614 and is used to map a multicast source IP address to transport-specific tuning information. That is, BARP is a map that tells a receiver station 106 on which transponder or transponders and SCID or SCIDs, information from a particular source IP address may be found. For example, when a user selects information from the GUI, the receiver station 106 uses BARP to determine tuning parameters (e.g., transponder and SCID) for the information selected by the user. Preferably, BARP information is periodically sent on as many transponders as possible so that users have easy access to the most current BARP information.

BARP consists of a header followed by zero or more address records. BARP preferably uses MPT frame type 0x0806. FIGS. 31A and 31B represent the format of a BARP header and a BARP address record, respectively. The BARP header includes version, change number, record count and reserved fields. In this example, version is a 1 byte field that represents the version of the BARP format used to create the header and address record. Change number is a 1 byte field that is incremented each time anything in the header or any of the address records change. Record count is a 2 byte field that indicates the number of address records that follow this BARP header. The reserved field is a four byte field that may be used to provide system flexibility in the future.

The BARP address record, as shown in FIG. 31B, includes six fields. An IP address field contains a four byte representation of an IP address. Transponder is a bitmap field identifying the transponders on which the previously-noted IP address can be found. Each bit in the transponder field corresponds to a transponder. Set bits in the transponder field indicate the presence of the IP address on that transponder. For example, if the first bit is set (1) and the rest of the bits are clear (0) then the IP address listed in the IP address field is present only on the first transponder of the system. The SCID field denotes the 12 bit SCID that contains the information provided by the IP address listed in the first field of the header. Preferably, the four most significant bits are reserved. Channel is 10-bit channel number that is associated with the this SCID and transponder. For example, transponder two, SCID nine may correspond to channel 105. Preferably, the most significant 6 bits of the channel field are reserved for future use. Service type is the type and paradigm of the channel associated with the transponder and SCID in the address record. The reserved field is 3 bytes long and is preferably reserved for future system use. Information for channel and service type fields are preferably supplied by the broadcaster to satisfy tuning requirements of subscriber units.

While the BARP and BFDP protocol layers represent one preferred way of transmitting the information related to the GUI of the present invention, other transmission systems and methods may be substituted without departing from the spirit of the invention.

H. SDP+ Records

Another difficulty faced in utilizing the wide variety and large amount of information transmitted within the DTH system 100 is providing a way for the GUI to efficiently find and process the various kinds of data that are available at various times within the multi-program data stream. One preferred method that allows the GUI of the present invention to efficiently find and process information for presentation to a user are "session description protocol plus" (SDP+) records.

An SDP+ record is an announcement mechanism that includes a number of fields, which are assembled into a single record or file to provide information on available services such as webcasts, downloads, and streaming data or other services. The SDP+ protocol is a combination of standard SDP fields and augmentations, or extensions, to the standard SDP protocol. Additional details regarding the standard SDP protocol may be found in RFC 2327. The standard fields of the SDP protocol that are used in the of the SDP+ protocol include, protocol version, the owner/creator and session identifier (i.e., the IP address of the creator of the SDP record), the name of the SDP session (i.e., the name of the SDP record), a brief description of the session (i.e., what the SDP record is for), the multicast address on which the session is being broadcast, the start and end times of the broadcast, the repeat times of the broadcast, a list of Internet webpages that can provide additional information on the item that is going to be broadcast, what the port of the broadcast is (i.e., the UDP port of the broadcast), the type of broadcast (e.g., BFDP, Stream, Webcast or Intercast), sorting and filtering information.

As noted, an SDP+ record may also contain information such as the time a particular service will be broadcast, the multicast IP address on which the service will be broadcast, the size of the file that will be broadcast, and information relevant to the GUI such as text or images that should be displayed to the user. Each download service (e.g., each webcast, each software download, etc.) has its own SDP+ record, which is broadcast to all subscribers to inform them of the information that is available for download. With reference to GUI information, SDP+ records are used by the PC 128 to build particular sections of pages using selected information resident within the PC 128 (e.g., the basic page template 180) and selected dynamic data that is received from a satellite in the form of SDP+ records. When the user launches the interface into another state or page, the GUI builds the destination page as instructed by the template 180 and by the SDP+ records. The page is then displayed on the user's PC monitor 130.

SDP+ records also allow users to pre-select download content from descriptions of the content, then filter for that information as it arrives in the one-way data stream of the DTH system 100. The descriptions of the content may include extended SDP records including protocol version, name, times of broadcast, IP address, mandatory download status, ID number, run command, category, file size, text messages, channel, images, keywords, etc.

As previously mentioned, SDP+ records also provide announcement information including content type, start time, duration, Internet address information, and actions to be taken on receipt of the information. Announcement management is critical to finding the data stream, discrete download or webcast information in the received transmission. SDP+ records can be rescinded and modified, once they are present on the user's PC 128. SDP+ records can be used to indicate mandatory download events such as software updates. The system user (client) uses SDP+ records to schedule program reception. After the client makes selections based on the SDP+ record information, the receiver station 106 properly tunes itself to receive the selected information.

SDP+ records are a combination of conventional SDP records and extensions to the conventional SDP records. Generally, the extensions to the standard SDP protocol consist of fields for linking different download services together, specifying if a download file is mandatory, archived or should be run upon download to the receiver station 106. The extensions also provide for specification and placement of graphics for the GUI, the notification of the user upon receipt of the SDP+ record, and the recession of previously sent SDP+ records. These unique extensions coupled with the standard SDP protocol yield the SDP+ protocol used in conjunction with the GUI of the present invention. The details of the conventional SDP fields and the unique extensions of the present invention are best described in conjunction with the exemplary SDP+ records shown in FIGS. 32A-32D.

Referring now to FIGS. 32A-32D, fields indicating version (v), record ID (o), multicast IP address (c), time (t), and port (m) are required for all SDP+ records of any kind. Additionally, for any BFDP download the object ID BFDP code (a=key:) is needed. The run command (a=run:) is required for all streaming data downloads. For all streams having an entry in the MPG a channel link (a=channel) is required. Additionally, for all webcasts a URI address field (u=<uri>) is required.

FIG. 32A is a sample SDP+ record for streaming data, which is commonly referred to as a ticker. The field "v=0" refers to the version of the SDP+ protocol used to produce this SDP+ record. The record ID, which is represented by "o," indicates the unique session ID for this particular record. Specifically, the session ID for this SDP+ record is 0001 and the version of this record is 17. The session ID is a way to refer to this particular SDP+ record and 17 indicates that there have been 16 previous versions of this SDP+ record before this version. The name of this session is represented by "s=Announcement Dump." However, it should be noted that the session name is arbitrary ASCII text that is used to identify the SDP+ record. The field "c" represents the multicast IP address of this session and "/1" indicates that the Time To Live (TTL) value, which indicates the number of "hops" that a packet may make before it expires. Multicast IP addresses denote the IP address on which the information corresponding to the SDP+ record will be broadcast. The multicast IP address is used in conjunction with the previously described BARP table to tune a subscriber's receiver station 106 to the appropriate transponder and SCID to receive the broadcast information. When a user makes a request to receive broadcast information using the GUI, the receiver station 106 determines the multicast IP address on which the information will be broadcast by looking to the SDP+ record corresponding to the selection. Once the multicast IP address is determined, the receiver station 106 uses the BARP table to correlate the multicast IP address to a transponder and SCID. The receiver then appropriately tunes itself to the proper transponder and SCID to receive the broadcast information. Since streaming data or tickers are always running, the start and end times represented by "t=0 0" indicate that the data service is constantly running and is permanent. The field "m=" indicates that the UDP port of the data is 3278 and the type of data is streaming data.

The SDP+ record shown in FIG. 32A includes "a=key:1," which indicates that the object ID for this SDP+ record is 1. The object ID may be used for sorting or other functions. The object ID in the SDP+ record matches the object ID sent in the BFDP header. The field "a=run: consoleticker" indicates that when the download is complete, an executable file named consoleticker should be started. The standard SDP field "a=keywds" is used to correlate SDP records to one another. For example, in the SDP+ record shown in FIG. 32A "tsetup" is used to correlate this SDP+ record with another SDP+ record, such as a client download file.

FIG. 32B is an example SDP+ record for a file download. Similar to the ticker SDP+ record of FIG. 32A, the file download SDP+ record a file download specifies the version of the SDP+ protocol used to produce the SDP+ record, the record ID, the name of the session, the multicast IP address of the session, and the object ID of the session. Additionally, the SDP+ record shown in FIG. 32B specifies download times using a "t=3079382400 3155745600," wherein the first number is the start time of the broadcast and the second number is the end time of the broadcast. The start and end times are specified in decimal network time protocol (NTP) format. The "r=10 m 10 m 0" specifies the broadcast repetition of the broadcasts, wherein the first number indicates the interval between broadcasts, the second number indicates the duration of the broadcasts and the third number indicates the time offset between the broadcasts. The field "m=" indicates that the UDP port of the data is 3335 and the type of data is BFDP data. The SDP+ record shown in FIG. 32B further specifies the size of the file that is to be downloaded using the "a=fsz" command. The example file download SDP+ record specifies a file size of 980K. The file download SDP+ record also specifies that this file is a mandatory download using the command "a=mandatory." That is, the receiver station must receive the data broadcast corresponding to this SDP+ record during one of the broadcast times. The field "a=run:catalog-install.exe" specifies that after the data associated with the SDP+ record is received, the file cataloginstall.exe must be executed.

FIG. 32C is an example of an SDP+ record that is used to specify information pertinent to a webcast. In addition to using the fields previously described in conjunction with the file download and ticker SDP+ records, the webcast SDP+ record may use the session description field denoted as "i=." This field is an ASCII text field that may be used to describe the content of a particular session or webpage. The session description field may be used as the preview description represented as horizontal lines in the child window 234 of FIG. 6. Alternatively, the session description field of the SDP+ record may be used in conjunction with SDP+ records other than webcast SDP+ records. For example, the session description field may be used in ticker SDP+ records to fill in the data channel description 308 as shown in FIG. 11. The webcast SDP+ record also includes a field denoting the URI of the webpage that is broadcast. The webcast SDP+ record also uses the standard SDP extension "a=cat," which is used for sorting and filtering the SDP+ records.

Figure 6:
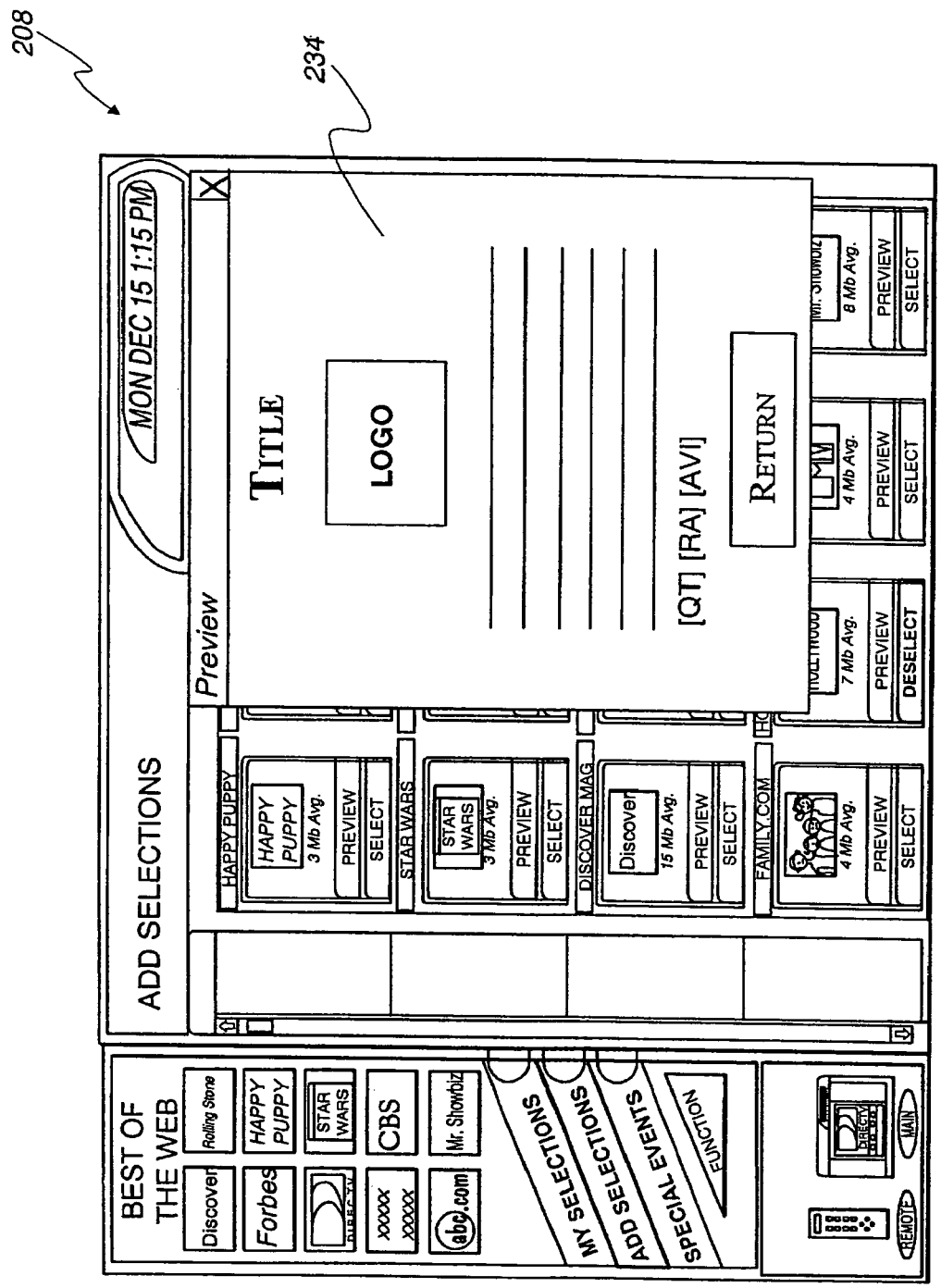
FIG. 6 illustrates another example of a Best-of-Web data service page, further showing a child window embodying aspects of the present invention.

The webcast SDP+ record uses the unique extension "a=display:type=" to indicate how the information content from the webcast will be displayed to the user. Additionally, the unique SDP+ field "a=img" is used to associate an image file (in this case cnn.gif) with a webcast. This image may be used as a thumbnail or any other representation of the content of the webcast. The image field and the display type field can work together to provide information for the GUI. Display type may be used to indicate on which page of the GUI the image specified in the image field must be placed. For example, type may be used to specify Top 10 Webcasts, normal, Top 5 Downloads, Special Events, Tickers, Software Hot Links or Software Specials, each of which may be represented by a number. As shown in FIG. 32C, type=1 is specified, which may correspond to Top 10 Webcasts. Accordingly the image cnn.gif will be placed on the control panel 184 of the GUI as shown in FIGS. 5-7. Alternatively, type may indicate Top 5 Downloads, which corresponds to the control panel 184 shown on the Software Downloads page in FIG. 9. The specification of priority=8 denotes the particular location in which the cnn.gif image will be placed on the control panel 184. Referring to the control panel 184 shown in FIGS. 5-7, different priorities correspond to different locations in the arrangement of the 10 Best-of-Web images shown. For example, Discover is priority 1, Rolling Stone is priority 2, Forbes is priority 3, etc.

FIG. 32D is an example of an SDP+ record that may be used to represent enriched TV. In addition to the field discussed in conjunction with the SDP+ records, this SDP+ record includes the field "a=channel." This field contains a 32-bit channel number that associates the data contained in the enriched video to channel content of a channel located in the program guide. The information contained in the enriched TV may be associated through a number of program guide channels.

I. Webcast

As previously noted, the DTH system 100 broadcasts discrete downloads. These downloads are data items that have well-defined broadcast schedules and require detailed announcement information to locate the items in the received data. Examples of discrete downloads include software applications, such as spreadsheets, word processors or games. Webcasting is a special case of the discrete download. A webcast is an ongoing and repeating download of specially selected web content. The content is usually grouped by domain. Minimal scheduling is required for downloading webcast information. Multiple groups of content may be identified by the same identifier, thereby creating a one-to-many relationship among the items of interest. The system 100 may archive webpages pages on a the PC 128 for later viewing.

As webpage information is received by the subscriber unit it is stored for later use. In the preferred embodiment, webpage information is received in a compressed format and is stored directly (i.e., without extraction) by the subscriber unit. Preferably, the present invention uses an archiving scheme based on the PKWare™ PKZIP™ format. However, other alternative archiving formats may be used. If the archived files are compressed, the files are preferably extracted on demand using a PKWare™ extractor. If, however, the files are not compressed, any ZIP extractor may be used to extract and view the files. Preferably, the filenames used in the webcast archive are actually the uniform resource identifier (URI).

Preferably, webcast archive files have a dedicated filename extension. On any given data carousel, the contents of which is repeatedly broadcast, there must be exactly one main file for each webcast. Preferably, this file contains a snapshot of the entire website or website subset as selected for broadcast. Update archive files may be used to replace portions of the main file on the carousel. The subscriber unit stores all archive files in a subdirectory corresponding to the session ID of the webcast. Preferably, when a main file is received that is newer than the current main file in that directory, all other files in that directory will be removed and any links in the proxy server's cache map file for this webcast will be replaced with the URIs in the new main file.

In accordance with the present invention, the subscriber unit preferably maps uniform resource locators (URIs) to archive files. The map allows the subscriber unit to locate the archive file containing a URI that the user desires to view. When the subscriber unit receives the main file, the subscriber unit removes all files and cache map file links to the associated session prior to the receipt of the new main file. When the user requests a webpage, the subscriber unit extracts and decompresses the appropriate archive file data to a socket. This extraction is done in real time rather than extracting the entire archive file to disk. The subscriber unit also preferably has the capability to save partially downloaded files and acquire missing portions of the files on the next broadcast of the files as with all BFDP deliveries.

In accordance with the present invention, the headend unit is capable of manipulating the archived files using functions that archive files, determine the number of files in an archive file, return the name of a particular entry in an archive file, remove entries from an archive file, and merge a number of archive files into one archive file. The function that puts entries into an archive file includes a field denoting the file or files to be archived. Preferably, wildcard indicators may be used to specify a number of filenames for entry into the archive file. The archive function also preferably allows for a specification of a location to which the archive file should be written (e.g., a path name). In a preferred embodiment the archive function allows for specification of compression or no compression for the archived file. The archive function parses the specified files, reads the hypertext transport protocol (HTTP) header, and archives the specified files to an output file using the URI found in the HTTP header.

A function that counts the number of files in an archive is also preferably implemented at the headend unit. This function allows for a specification of an archive filename and returns the number of files stored in the archive file. Another desirable function is that of a function that returns the name of a file located in an archive file. This function allows for specification of an archive filename, the index or location of the file in question, the name of a buffer that will be filled with the name of the file in question, and the size of the specified buffer. Based on the inputs specified this function preferably returns the name of the file located in the specified index position in the specified archive file, the size of the file, and the length of the character string returned in the buffer size.

A function that erases portions of an archive file is also desirable. This erasing function allows for the specification of the archive file in question, the array index or indices to be erased from the archive file, and the number of elements specified in the index or indices to be erased. Preferably, a function is included that allows for the merging of two archive files. This merging function allows for the specification of two archive file names. One of the archive filenames is the file that is to be merged into the archive file bearing the other specified filename.

J. Conclusion

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method for tuning used in a broadcast data system having a receiver station with a memory, wherein the receiver station receives file data and real-time data, the method comprising the steps of:
    storing in the memory a table giving tuning information corresponding to a plurality of IP addresses and ports;
    receiving a download request based on user input;
    using the download request to identify download information including an Internet Protocol (IP) address and port;
    using the identified IP address and port to open a connection to a socket;
    using the table to determine tuning information corresponding to the identified IP address and port; and
    using the tuning information to tune the receiver station to the identified IP address and port.

2. The method of claim 1, wherein the table comprises a plurality of address records having tuning information and download information.

3. The method of claim 2, wherein the download information comprises an IP address.

4. The method of claim 3, wherein the IP address comprises a multicast IP address.

5. The method of claim 2, wherein the download information comprises a port.

6. The method of claim 2, wherein the download information comprises a software title.

7. The method of claim 2, wherein the tuning information comprises a transponder.

8. The method of claim 2, wherein the tuning information comprises a service channel identifier (SCID) number.

9. The method of claim 1, wherein the step of storing in the memory a table having tuning information corresponding to a plurality of IP addresses and ports includes the step of storing in the memory a table having a plurality of transponders and service channel identifier (SCID) numbers corresponding to the plurality of IP addresses and ports.

10. The method of claim 9, wherein the step of using the table to determine tuning information corresponding to the identified IP address and port includes the step of using the table to determine a transponder and a SCID number corresponding to the identified IP address and port.

11. The method of claim 10, wherein the step of using the tuning information to tune the receiver station to the identified IP address and port includes the step of using the transponder and the SCID number to tune the receiver station to the identified IP address and port.

12. A tuning system for use in a broadcast data system having a receiver station that receives file data and real-time data, wherein the receiver station includes a processor and a memory adapted to store a table having tuning information corresponding to a plurality of Internet Protocol (IP) addresses and ports, the system comprising:
    a computer readable medium and
    a plurality of routines stored on the computer readable medium and adapted to be executed by the processor, wherein the plurality of routines comprises:
    a first routine that is adapted to receive a download request based a user input;
    a second routine that is adapted to use the download request to identify download information including an IP address and a port;
    a third routine that is adapted to use the identified IP address and port to open a connection to a socket;
    a fourth routine that is adapted to use the table to determine tuning information corresponding to the identified IP address and port; and
    a fifth routine that is adapted to use the tuning information to tune the receiver station to the identified IP address and the port.

13. The system of claim 12, wherein the table comprises a plurality of address records having tuning information and download information.

14. The system of claim 13, wherein the download information comprises an IP address.

15. The system of claim 14, wherein the IP address comprises a multicast IP address.

16. The system of claim 13, wherein the download information comprises a port.

17. The system of claim 13, wherein the download information comprises a software title.

18. The system of claim 13, wherein the tuning information comprises a transponder.

19. The system of claim 13, wherein the tuning information comprises a service channel identifier (SCID) number.

20. The system of claim 13, wherein the memory comprises a memory adapted to store a table having a plurality a transponders and service channel identifier (SCID) numbers corresponding to the plurality of IP address and ports, and wherein the fourth routine is further adapted to use the table to determine a transponder and a SCID number corresponding to the identified IP address and port.

21. The system of claim 20, wherein the fifth routine is further adapted to use the transponder and the SCID number to tune the receiver station to the identified IP address and port.

22. The system of claim 13, wherein the medium comprises one of a programmable gate array, application specific integrated circuit erasable programmable read only memory, read only memory, random access memory, magnetic media, and optical media.

23. A tuning system for use in a broadcast data system having a user input device and a receiver station that receives file data and real-time data, the system comprising:
- a memory adapted to store a table having tuning information corresponding to a plurality of IP addresses and ports;
- a processor coupled to the memory, wherein the processor is adapted. To receive a download request based on the user input from a user input device, to use the download request to identify download information including an Internet Protocol (IP) address and a port, to use the identified IP address and port to open a connection to socket, and to se the table to determine tuning information corresponding to the identified IP address and port; and
- a tuner coupled to the processor, wherein the tuner is adapted to use the tuning information to tune the receiver station to the identified IP address and port.

24. The system of claim 23, wherein the table comprises a plurality of address records having tuning information and download information.

25. The system of claim 24, wherein the download information comprises and IP address.

26. The system of claim 25, wherein the IP address comprises a multicast IP address.

27. The system of claim 24, wherein the download information comprises a port.

28. The system of claim 24, wherein the download information comprises a software title.

29. The system of claim 24, wherein the tuning information comprises a transponder.

30. The system of claim 24, wherein the tuning information comprises a service channel identifier (SCID) number.

31. The system of claim 23, wherein the memory comprises a memory adapted to store a table having a plurality of transponders and service channel identifier (SCID) numbers corresponding to the plurality of IP address and ports.

32. The system of claim 31, wherein the processor comprises a processor adapted to use the table to determine a transponder and a SCID number corresponding to the identified IP address and port.

33. The system of claim 32, wherein the processor comprises a processor adapted to use the transponder and the SCID number to tune the receiver station to the identified IP address and port.

34. The system of claim 23, wherein the user input device includes a keyboard.

35. The system of claim 23, wherein the user input device includes a mouse.

* * * * *